Figure 1:
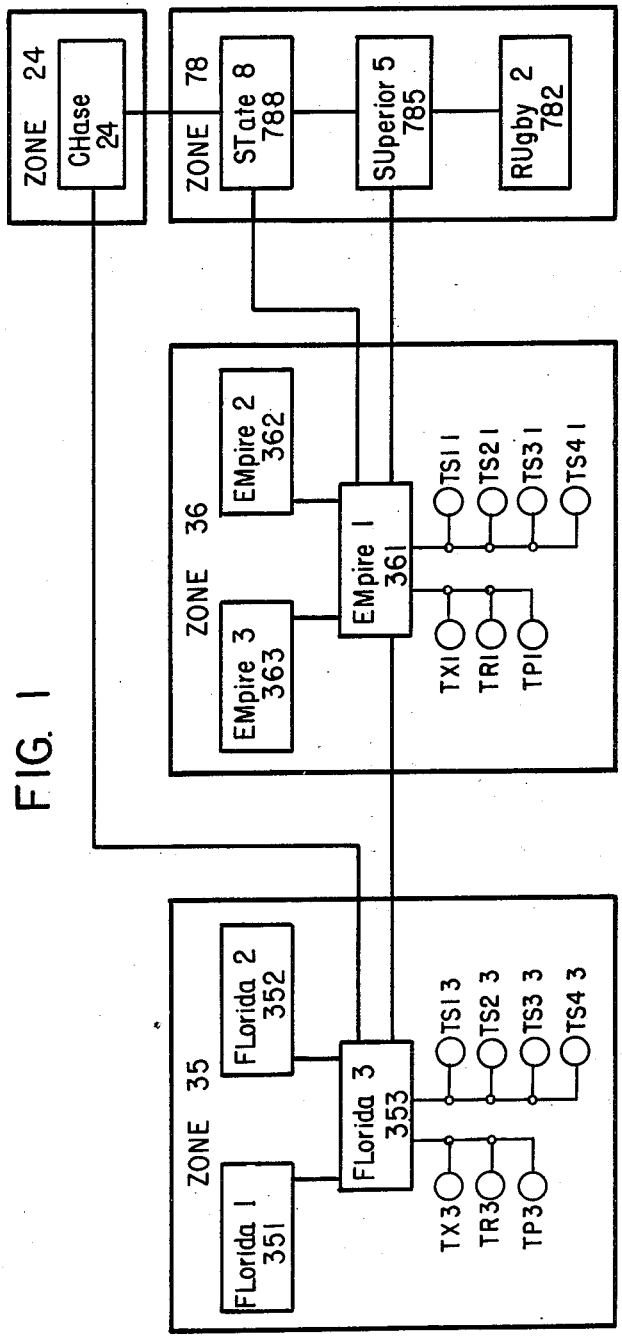

May 20, 1952 T. G. WALSH 2,597,209
TELEPHONE SYSTEM
Filed Feb. 11, 1950 17 Sheets-Sheet 1

INVENTOR.
Thomas G. Walsh
BY
Smith, Olsen & Baird
Attys.

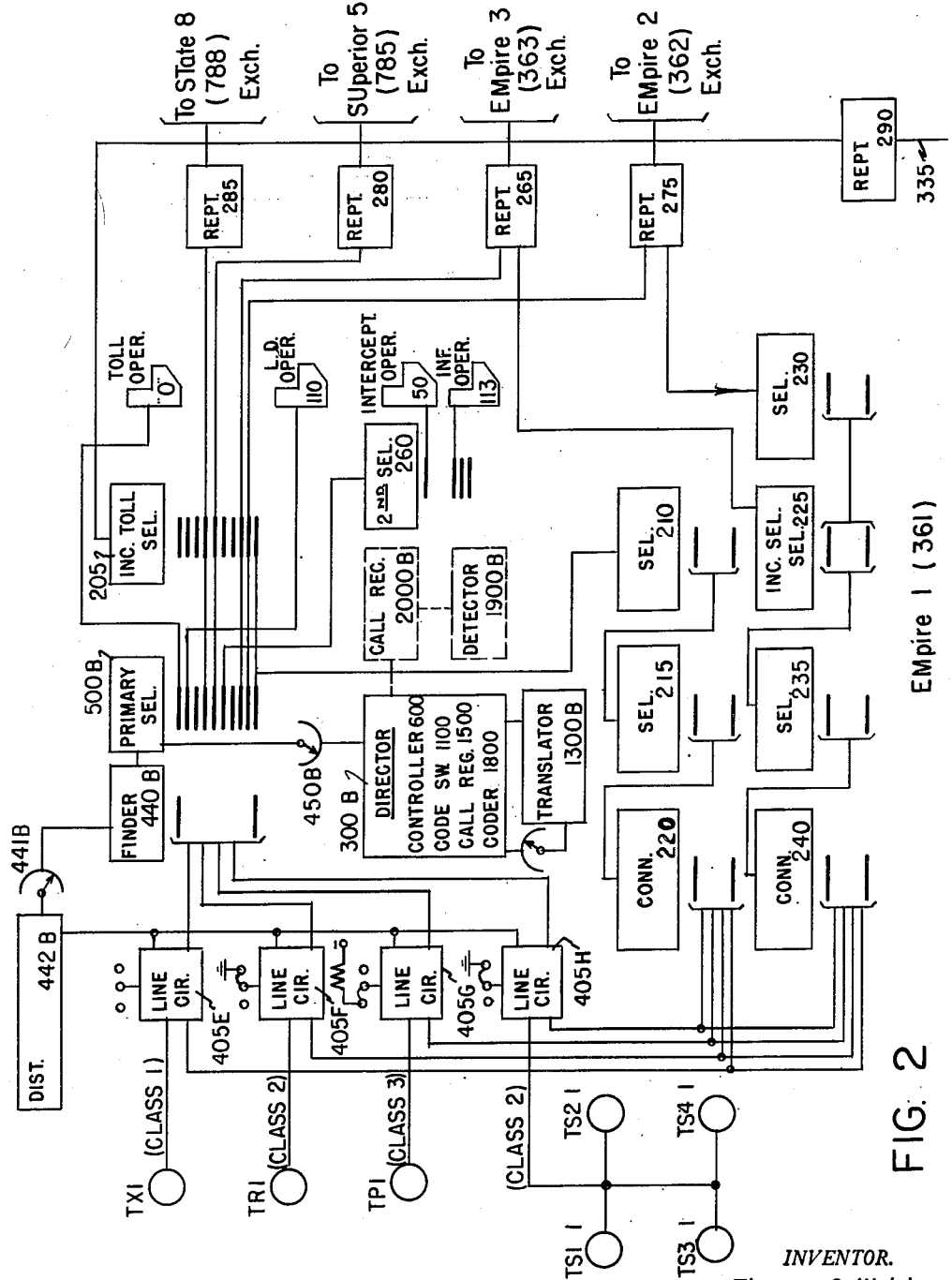

May 20, 1952 T. G. WALSH 2,597,209
TELEPHONE SYSTEM
Filed Feb. 11, 1950 17 Sheets-Sheet 3

INVENTOR.
Thomas G. Walsh
BY
Smith, Olsen & Baird
Attys.

May 20, 1952     T. G. WALSH     2,597,209
TELEPHONE SYSTEM

Filed Feb. 11, 1950     17 Sheets-Sheet 7

INVENTOR.
Thomas G. Walsh
BY
Smith, Olsen & Baird
Attys.

INVENTOR.
Thomas G. Walsh

INVENTOR.
Thomas G. Walsh

INVENTOR.
Thomas G. Walsh

INVENTOR.
Thomas G. Walsh

Patented May 20, 1952

2,597,209

UNITED STATES PATENT OFFICE 2,597,209

TELEPHONE SYSTEM

Thomas G. Walsh, San Fernando, Calif., assignor to Automatic Electric Laboratories, Inc., Chicago, Ill., a corporation of Delaware Application February 11, 1950, Serial No. 143,736

17 Claims. (Cl. 179—18)

The present invention relates to automatic telephone systems and is, more particularly, concerned with automatic telephone systems employing register sender or director apparatus for controlling the operation of automatic switches. More particularly, the present invention relates to improvements in register sender or director apparatus employed in a telephone system of the character disclosed in the application of John E. Ostline, Serial No. 75,985, filed February 12, 1949.

In a telephone system serving a large metropolitan area and the adjacent suburban areas, it is usually desirable to divide the system into a plurality of zones and to handle calls between the exchanges in the different zones as short haul toll calls. Short haul telephone calls are normally charged against the calling subscriber in accordance with the distance between the exchanges in the calling and called zones or the distance between the calling and called exchanges in the same zones, and in accordance with the time duration of the conversational connection.

In an automatic toll ticketing telephone system of the type disclosed in the above mentioned Ostline application, the telephone connections are automatically completed from a calling subscriber to a desired called subscriber under the control of a register sender apparatus provided in the originating exchange. In extending a connection the calling subscriber merely operates his calling device in accordance with the letters and digits corresponding to the directory number of the desired called subscriber. Usually, the directory numbers of called subscribers include a code portion comprising two letters and a digit designating the called exchange and a numerical portion comprising four digits designating the called subscriber substation in the particular called exchange. In some telephone networks, connections to desired called subscribers may be established without translation of any of the digits in the called number but in more complicated metropolitan networks, it is necessary to translate one or more of the digits of the code portion of a directory number, designating the desired called exchange, into appropriate routing digits. In the above mentioned Ostline application, the first three digits corresponding to the code of a called exchange are translated into one or more routing digits and the routing digits, as well as one or more of the called exchange code digits and the numerical portion of the directory number, are transmitted by a register sender in order to complete a connection from a calling subscriber to a desired called subscriber.

In the previously mentioned Ostline application, an idle register sender is automatically associated with the calling subscriber line and the seven digits of a called subscriber directory number, dialled by the calling subscriber, are registered therein. The register sender will automatically associate a common translator mechanism with the calling register sender and the translator mechanism in turn will translate one or more of the called exchange code digits into one or more routing digits and it will register the routing digits in the register sender. Thereafter, the register sender will first transmit the routing digits registered therein followed by certain of the digits of the called exchange code and finally the four digits of the numerical portion of the called subscriber directory number in order to complete a connection. During the setting up of the above mentioned connection, various items of record information, such as the calling subscriber directory number, the called subscriber directory number, the rate of charge for a call, as well as other pertinent items of information, are temporarily registered so that a record may be made of the telephone connection and charged against the calling subscriber.

During the setting up of the telephone connection, under control of the register sender, an idle toll ticket repeater will be included in the connection for the purpose of registering and storing the items of information which have been temporarily stored in the register sender and in a call recorder. The inclusion of the toll ticket repeater in the connection will signal the register sender and cause it to transmit coded signals corresponding to the various items of record information registered therein to the toll ticket repeater whereby the calling subscriber directory number, the called subscriber directory number, the class of service of the calling subscriber, the rate of charge applicable to the connection and the identity of the register sender involved in the established connection will be temporarily stored in the toll ticket repeater. The toll ticket repeater also times the established connection and, upon release thereof, it will store the total elapsed conversation time of the particular telephone connection. Following the release of the connection, the toll ticket repeater will be associated with an idle tabulator and it will transfer all of the stored items of information pertaining to the connection as well as the identity of the particular toll ticket repeater to the associated tabulator. Finally, the tabulator will control a digit tape punch mechanism and a record tape punch mechanism to produce an individual record and a common record of the completed short haul toll call. These records may be used by the operating telephone company to control appropriate business machines to produce printed records for each completed call.

Facilities were also provided in the above mentioned Ostline application for calling in the common translator each time a single digit or a three digit special service call was registered in a register sender. The translator translated the single digit or the three digits of special calls into one or more appropriate routing digits whereby the register sender routed the call to the proper destination in accordance with the established routing digits. The single digit call, mentioned above, is a so called "0" operator call and it has been found that in busy metropolitan exchanges serving a large telephone network, as many as eight thousand "0" operator calls are made each day. In a system of the type disclosed in the above mentioned Ostline application, the common translator is associated with a calling register sender by means of a translator assigner. The assigner functions to assign the common translator to the exclusive use of each calling register sender, one at a time. Since as many as eight thousand "0" operator calls are made per day, the translator assigner and the translator will operate several million times each year in translating the "0" operator calls.

Accordingly, it is the principal object of the present invention to further improve an automatic toll ticketing system of the type noted above by providing a register sender which will automatically complete a connection to a "0" operator position, in response to the registration therein of the single digit 0, without requiring any operation of either the translator assigner or the common translator, and which will call upon the translator assigner and the translator to translate all special service three digit calls and six or seven digit subscriber calls.

It is a further object of the invention to automatically register in the routing digit registers of the register sender, a rounting digit which will control the register sender to extend a connection to a "0" operator position, each time a calling subscriber dials the single digit 0, without associating the common translator with the register sender.

It is a still further object of the present invention to provide an improved register sender which utilizes a translator assigner and a common translator in order to translate certain calls registered therein for routing purposes and which translates certain other calls registered therein without utilizing either the translator assigner or the common translator.

Further features of the invention pertain to the particular arrangement of the circuit elements of the register sender whereby the above-outlined and additional operating features are attained.

Figure 4:
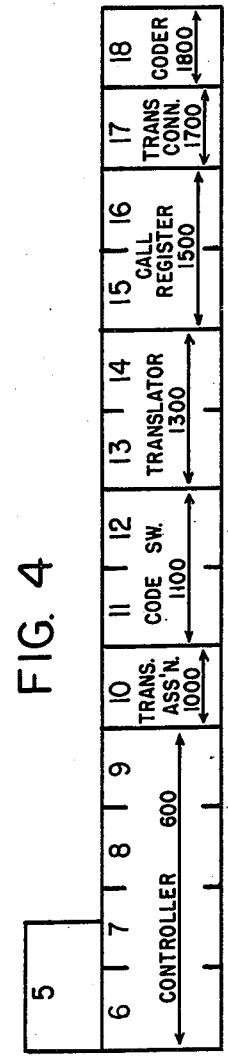
Figure 3:
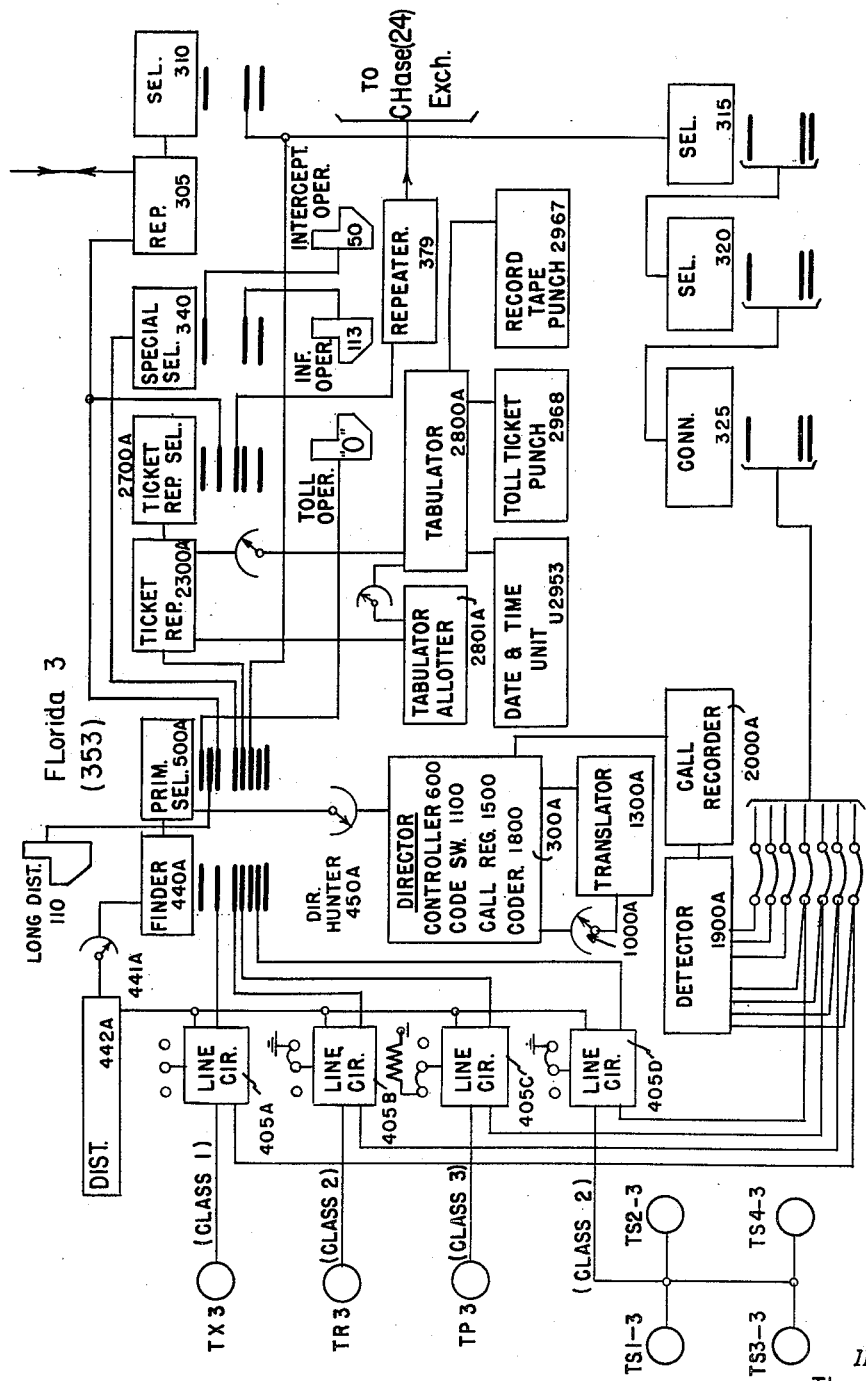

The invention, both as to its organization and method of operation, together with further objects and advantages thereof will best be understood by reference to the following specification taken in connection with the accompanying drawings, in which Fig. 1 is a schematic diagram of the area served by the telephone system embodying the present invention; Figs. 2 and 3 taken together, with Fig. 2 placed above Fig. 3, illustrates the general arrangement of the apparatus incorporated in the EMpire 1 exchange in zone 36 and the FLorida 3 exchange in zone 35 included in the telephone system; Fig. 4 illustrates the mode of combining Figs. 5 to 18, inclusive, to form a unified switching system for the FLorida 3 exchange; and Figs. 5 to 18, inclusive, taken together, illustrate the details of the switching apparatus incorporated in the FLorida 3 exchange in zone 35 of the telephone system, which apparatus has incorporated therein, the features of the invention as briefly outlined above.

Figure 5:
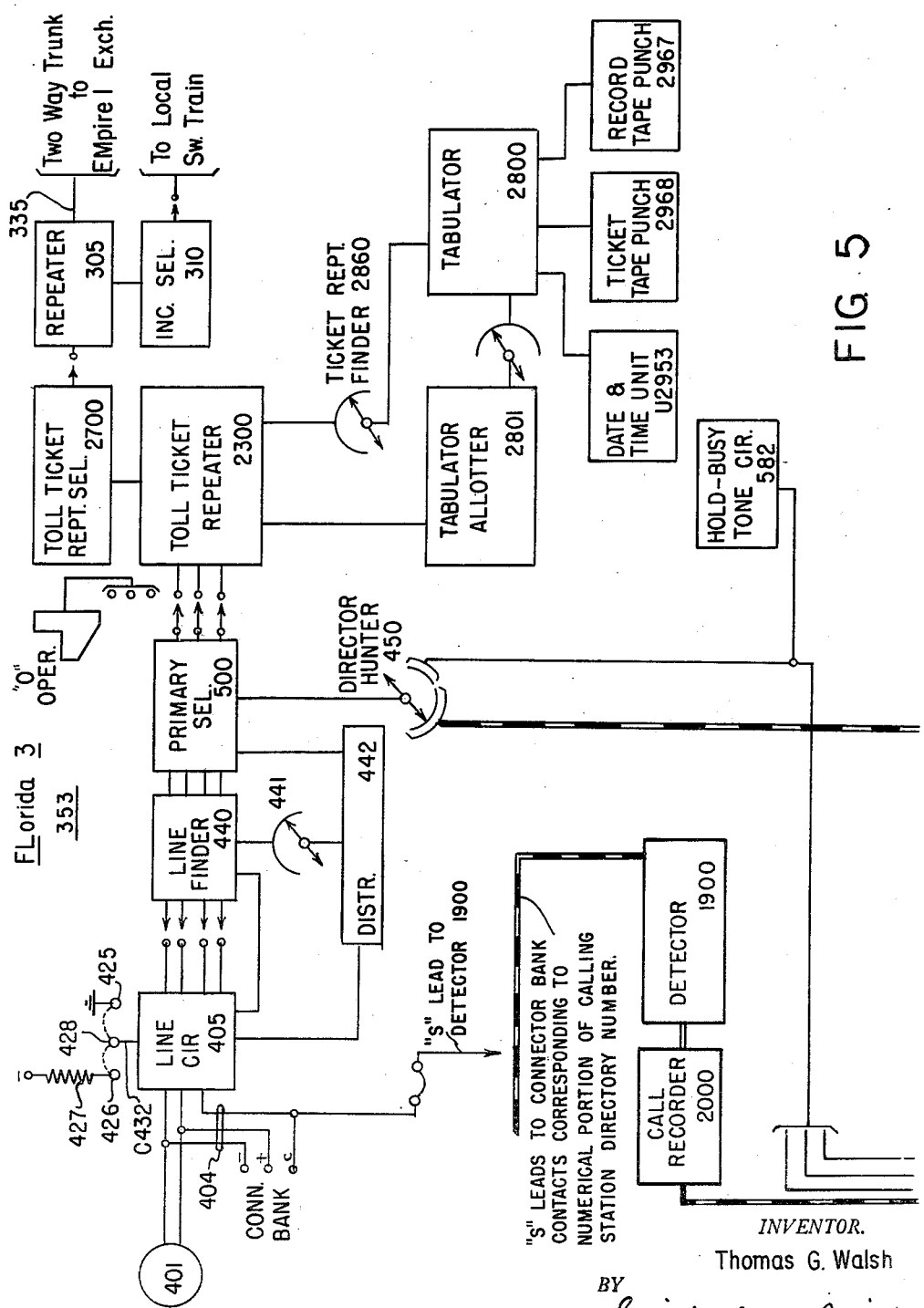

More particularly, Fig. 5 schematically illustrates a subscriber substation 401, a line circuit 405, a line finder 440, a distributor 442, a primary selector 590 and a director hunter 450. In addition to the foregoing, Fig. 5 also schematically illustrates a toll ticket repeater 2300 and associated toll ticket repeater selector 2700 and a repeater 395 terminating a two-way trunk line interconnecting the FLorida 3 exchange and the EMpire 1 exchange. The incoming selector 310, is individually associated with the repeater 305 and is utilized in combination with repeater 305 to complete incoming calls from the EMpire 1 exchange to local called subscriber substations, such as the substation 401, via a local switch train in the FLorida 3 exchange. Fig. 5 also schematically illustrates the apparatus provided in the FLorida 3 exchange for producing a record of each toll call completed via the toll ticket repeater 2300. This apparatus includes a tabulator allotter 2801, a ticket repeater finder 2860, a tabulator 2800, a date and time unit U2953, a record tape punch 2967 and a ticket tape punch 2968. The record and ticket tape punch mechanisms are automatically controlled to produce perforated tapes containing all of the items of record information necessary to produce both a common record and an individual record containing the various items of information pertaining to a short haul toll call. Finally, Fig. 5 schematically illustrates a call recorder 2000 and a common detector 1900 which are utilized in connection with recorded calls in order to ascertain the directory number of a calling subscriber in the FLorida 3 exchange. All of the apparatus schematically illustrated in Fig. 5 is shown and described in detail in the above mentioned Ostline application.

Figure 8:
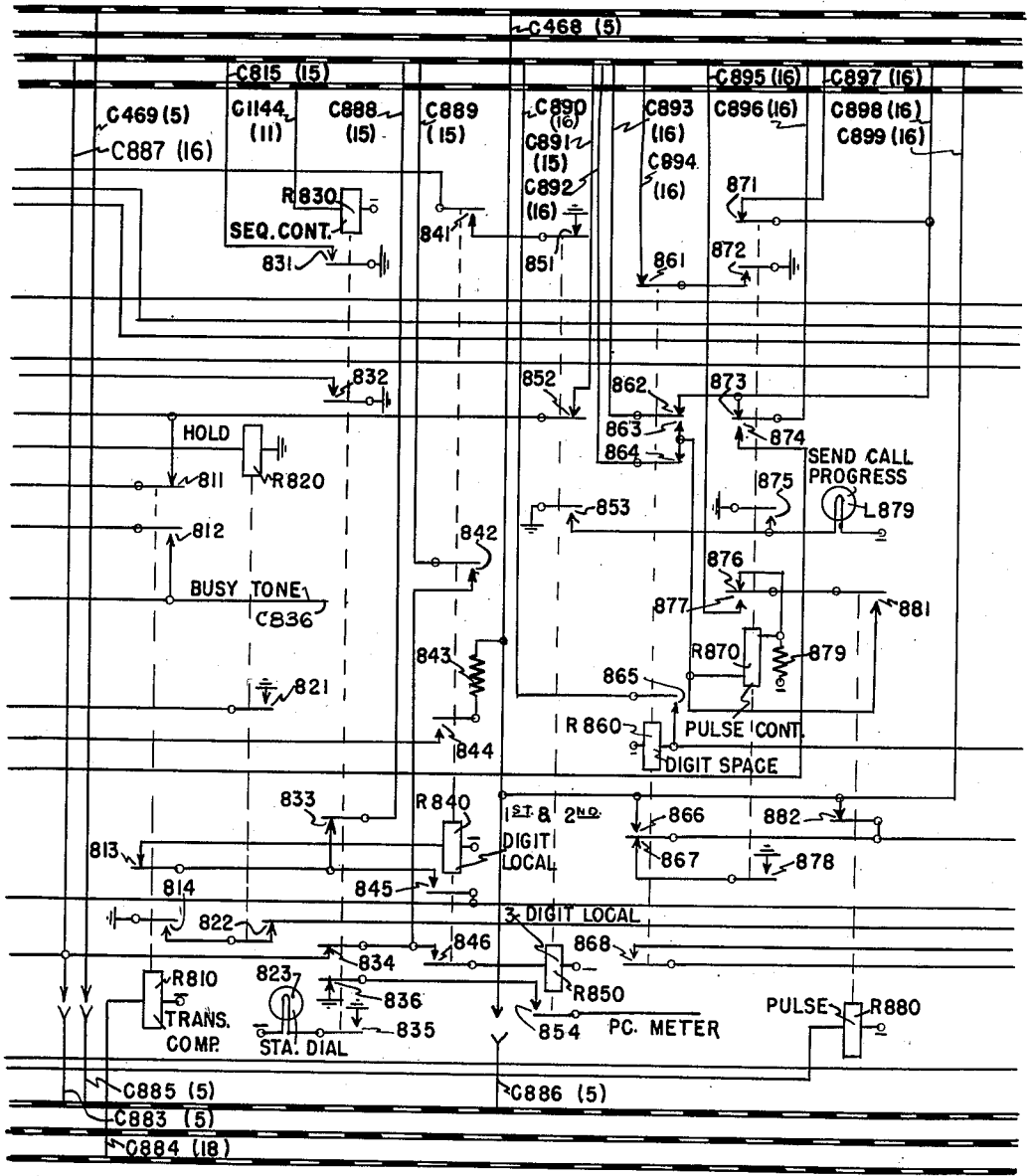
Figure 9:
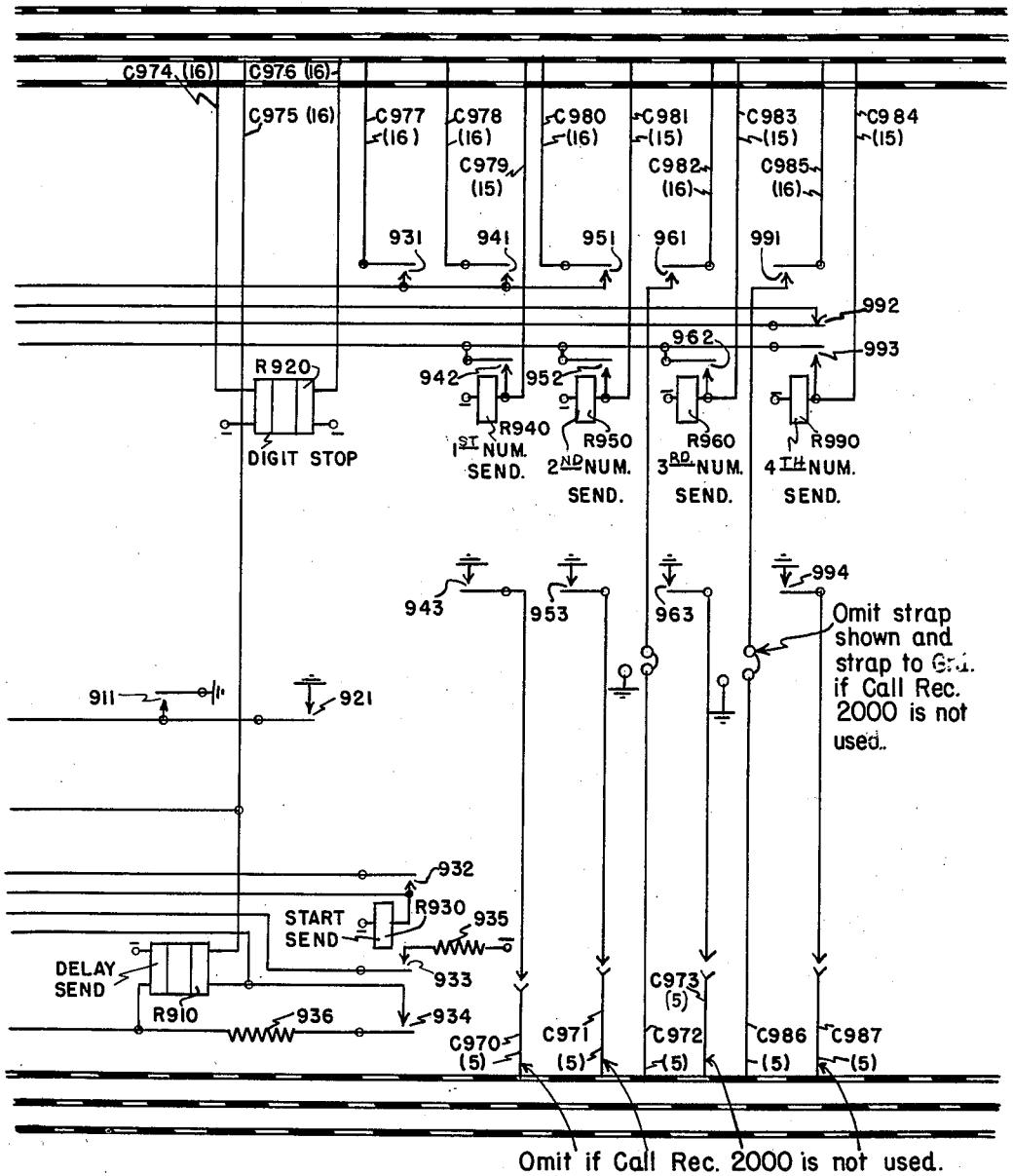
Figure 10:
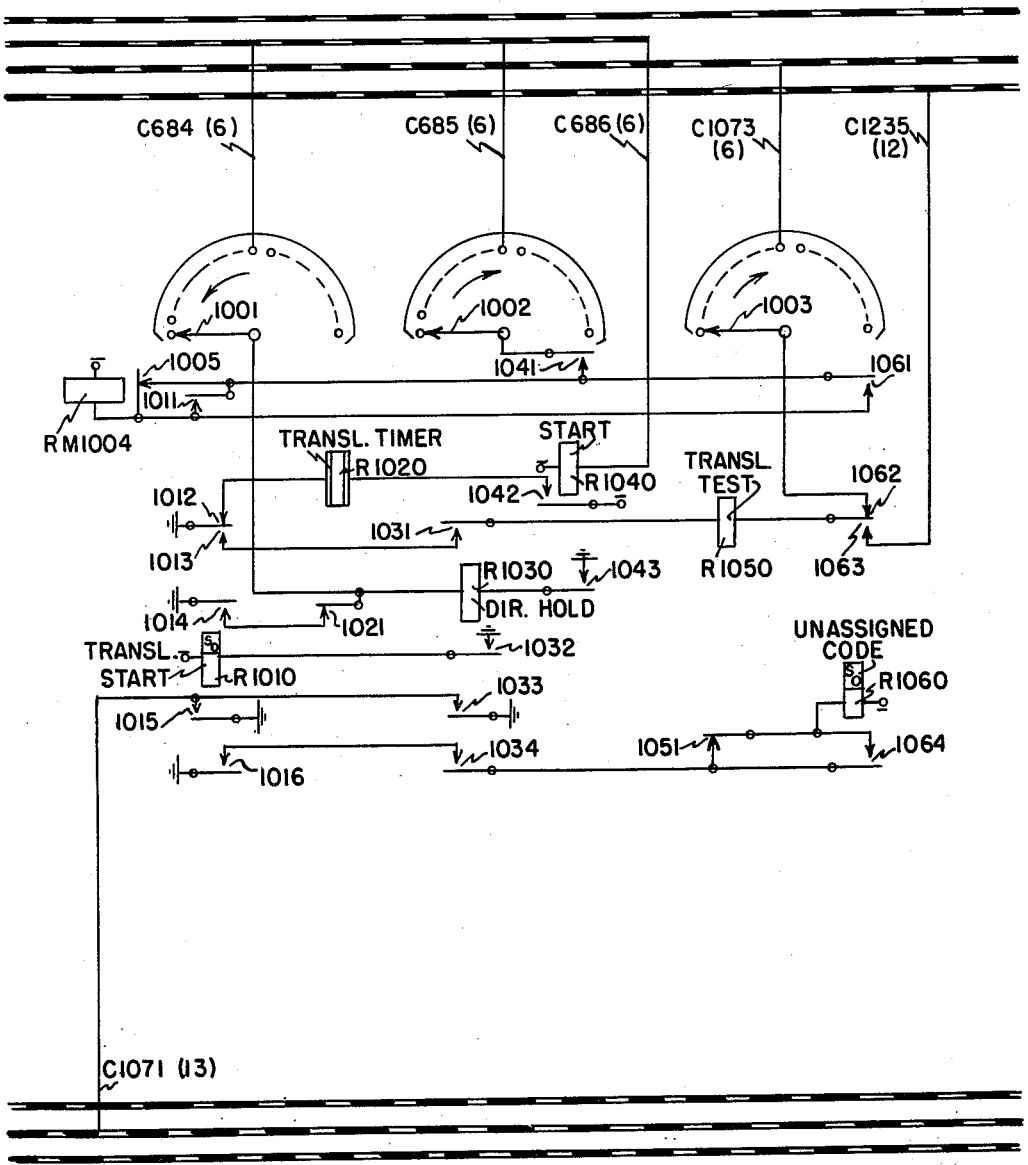
Figure 11:
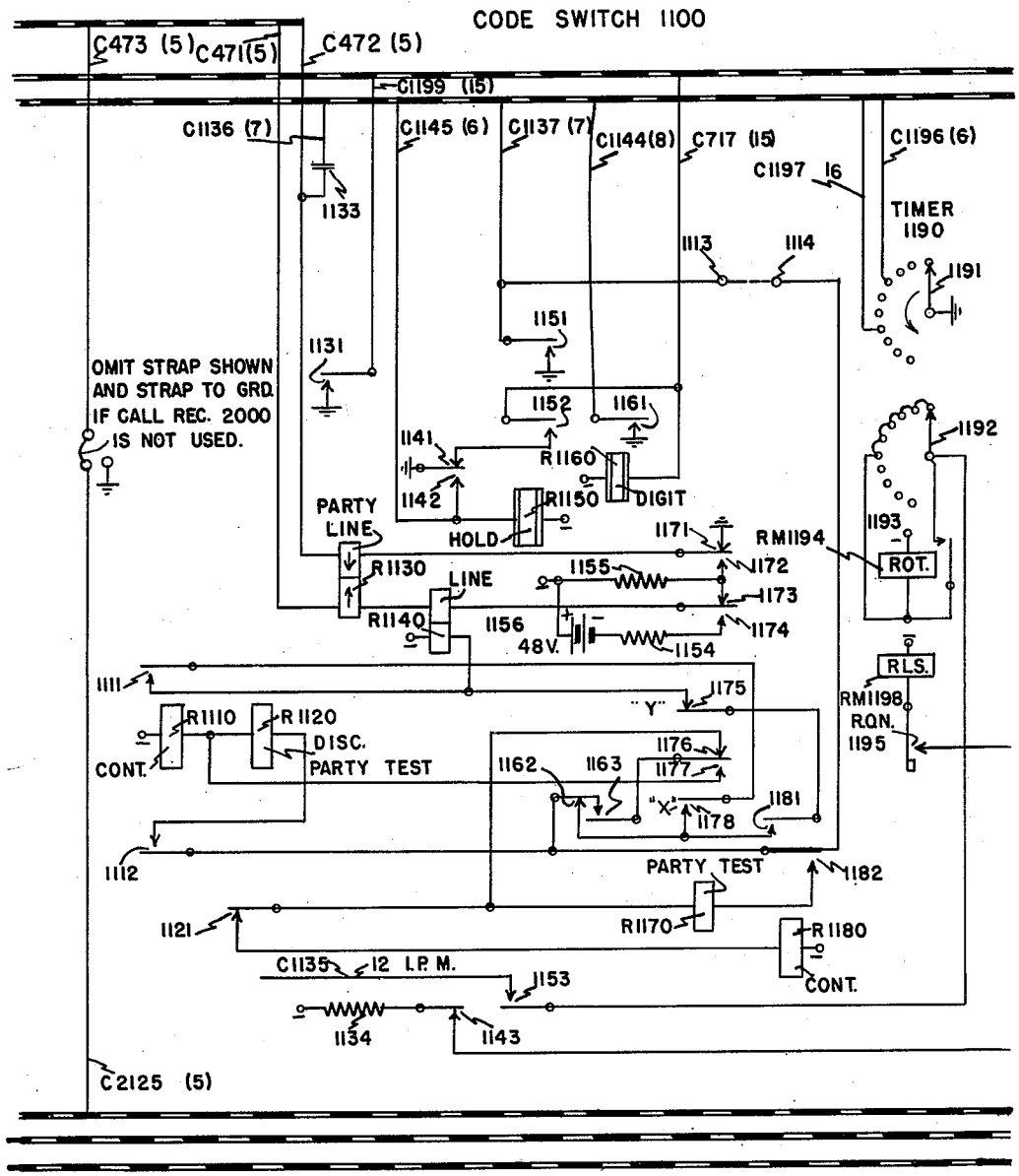
Figure 13:
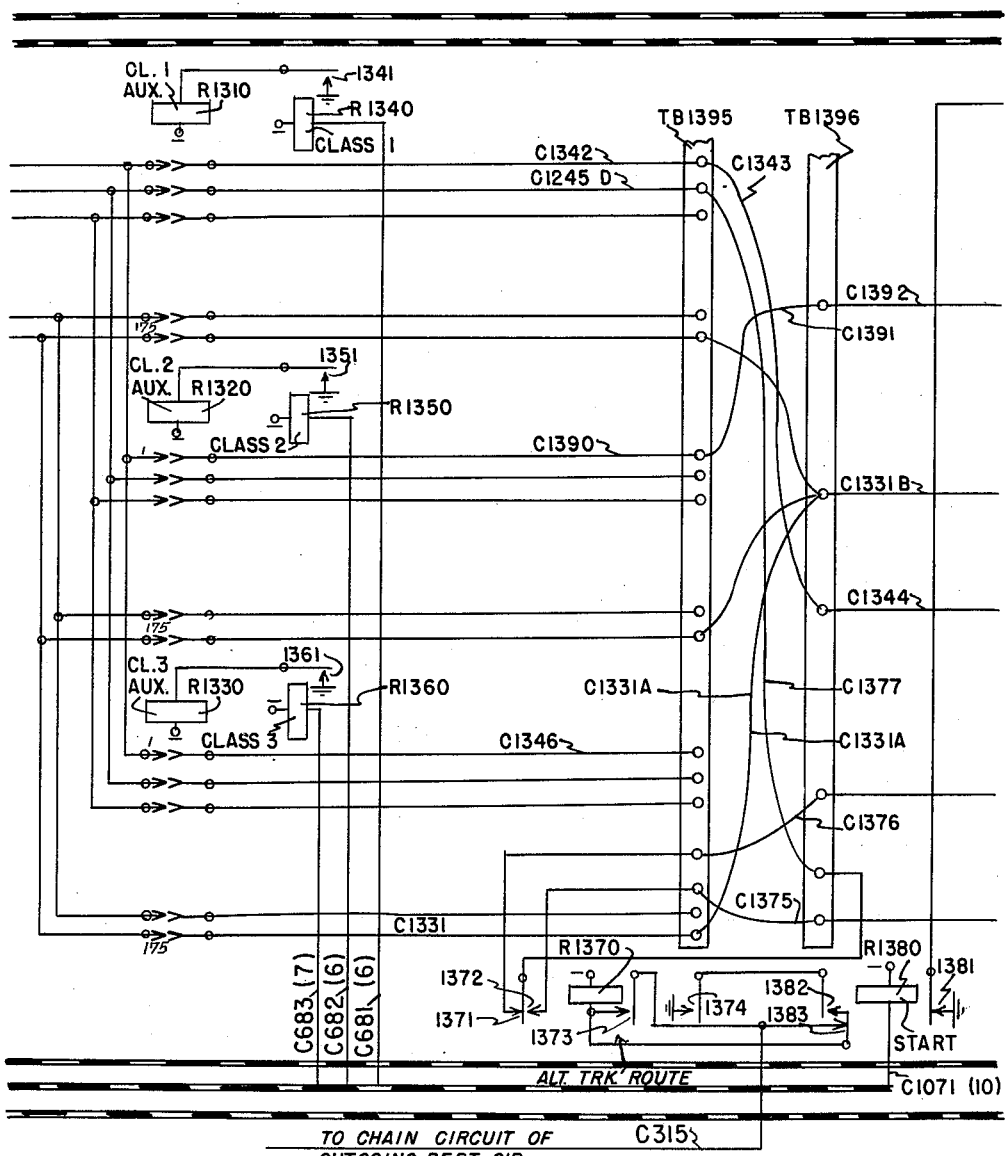
Figure 14:
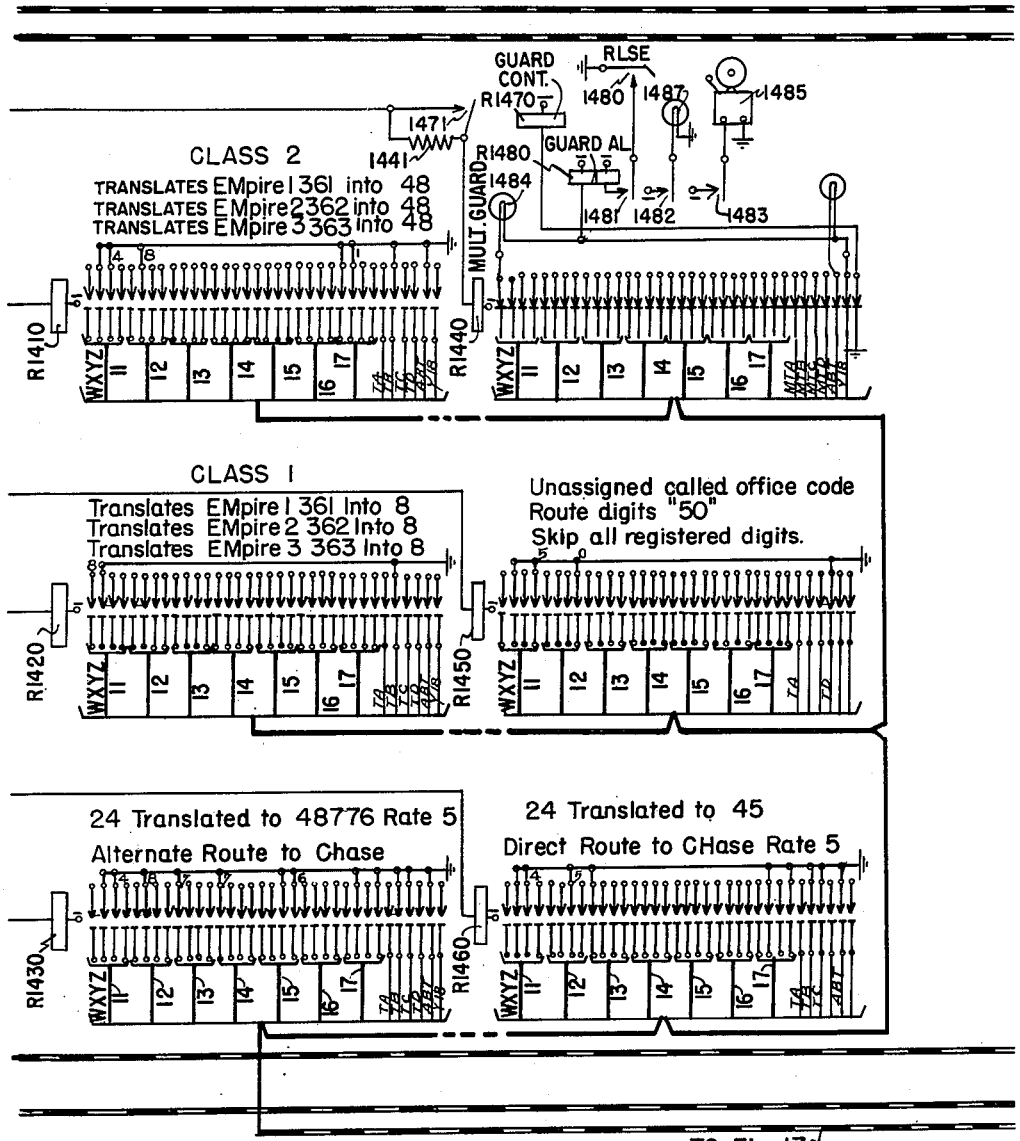

Figs. 6 to 9, inclusive, 11 and 12 and 15 to 18, inclusive, illustrate the details of one of a plurality of the register senders or directors provided in the FLorida 3 exchange. It should be understood, that in the present system the term "director" is synonymous with such terms as "register sender," "register translator" and "register controller." Each director provided in the exchange includes a controller 600, Figs. 6 to 9, inclusive, which is used primarily to determine the various operations of the other units of apparatus comprising the director, including the transmission switch setting impulses and code registering impulses; a code switch 1100, Figs. 11 and 12, which is employed primarily to receive the various impulses of the digits dialled by a calling subscriber and to selectively control the operation of the common translator 1300 for the purpose of determining the routing digit or digits to be employed by the director in setting up a connection to a desired destination; a call register 1500, Figs. 15 and 16, which is used primarily for registering the digit or digits dialled by a calling subscriber and for determining the order in which the routing digit or digits and the registered dialled digits are to be transmitted by the director in setting up a telephone connection; a translator connector 1700, Fig. 17, which is utilized to interconnect the common translator 1300 and the coder 1800 portion of the director; and a coder 1800, Fig. 18, which is used primarily to receive and register the routing digit or digits, to register the rate of charge for the call and to register the various control operations to be performed by the director, all in accordance with the selective operation of the translator 1300. Fig. 10 discloses the details of the translator assigner 1000 which is utilized to associate the common translator 1300 with a calling one of the plurality of directors and for limiting the time interval that the common translator 1300 may be associated with any calling director. Figs. 13 and 14 disclose the details of the translator 1300 which is common to all of the directors provided in the FLorida 3 exchange and which is temporarily associated with a calling director to register in the coder 1800 the particular routing digit or digits, the rate of charge for the call and certain other control information, and to initiate the operation of the call recorder 2000, if required, all in accordance with the code digits designating the called exchange and the class of the calling line as registered in the call register 1500 portion of the director. The translator 1300 is provided with as many individual translator relays as there are trunking points to which calls may be extended from the FLorida 3 exchange and each of the translator relays is permanently wired in accordance with one or more routing digits for routing a call to a particular trunking point. Furthermore, additional individual translator relays are provided for the various special service calls and these relays are permanently wired to route such calls to the special service destinations.

*The general arrangement of the telephone system*

The telephone system disclosed in the drawings is substantially the same as the system disclosed in the previously mentioned Ostline application and it serves a large metropolitan area and the adjacent suburban areas which are divided into a plurality of zones designated 24, 35, 36 and 78 each having one or more exchanges. The telephone network is schematically illustrated in Fig. 1 and the trunking arrangement for the EMpire 1 exchange in zone 36 and the FLorida 3 exchange in zone 35 are shown in greater detail in Figs. 2 and 3. Each of the telephone exchanges in the various zones serves ten thousand subscriber lines except the CHase exchange in zone 24 which serves one thousand subscriber lines. Furthermore, the subscriber lines terminating in each exchange in each of the zones include private subscriber lines, party subscriber lines and paystation lines. The private subscriber lines include both local subscriber lines, which have limited service to other subscribers in the same exchange and in some cases to other subscribers in exchanges located in the zone of the calling subscriber, and extended service subscriber lines, which have free toll service to called subscriber lines located in adjacent or nearby zones as well as the service to local subscribers in the zone of the calling subscriber. The party lines are of the four-party type and they are wired on a terminal-per-station basis so that each substation on a party line is provided with a different directory number. Finally, the paystation subscriber lines are rendered automatic local service, provided the necessary coin has been deposited in the paystation telephone instrument, and all toll calls originating at such stations must be completed by the "0" operator if they are for subscribers located within the telephone network and they must be completed by the long distance operator if they are for subscribers located outside the telephone network.

The various exchanges included in each of the zones are interconnected by suitable groups of trunk lines and at least one exchange in each zone is interconnected with certain of the exchanges in the other zone by suitable groups of toll lines as is clearly indicated in Figs. 1, 2 and 3.

In order to facilitate the setting up of various telephone connections, a universal numbering scheme is utilized in the telephone network whereby all called subscriber substations in the various exchanges, except the CHase exchange, are dialled in accordance with a seven digit directory number comprising two digits corresponding to the first two letters of the exchange name, a third digit corresponding to the numerical identification of the number of the exchange and a four digit number corresponding to the numerical portion of the called subscriber directory number. The CHase exchange subscribers have directory numbers comprising six digits including two digits corresponding to the first two letters of the exchange name and four digits corresponding to the numerical portion of the subscriber directory number. In view of the foregoing, it should be understood that the directory number of each subscriber substation in the telephone network comprises a code portion, including either two or three digits identifying the called exchange, and a numerical portion, including four digits identifying the called station. In any event, the first three digits dialled by a calling subscriber are the digits which are utilized by the director to control the translator in order to determine the routing digits which are to be employed in setting up a connection to a desired called subscriber.

At this point it may be well to note that the subscriber dial at each of the subscriber substations is arranged, in the conventional manner, in accordance with ten finger holes corresponding respectively to the digits "1" to "9" and "0" and that each of the digits have corresponding letters which may be dialled in accordance with the first two letters of any called exchange name. It should also be understood, however, that if the telephone system is arranged so that the code of the called exchange includes three letters, instead of the previously mentioned two letters and a digit, the called office code digits will correspond to the first three letters of the called exchange name. The ten digits of the dial and the corresponding letters applicable to each of the digits are as follows:

| Digits | Letters |
| --- | --- |
| 1 | |
| 2 | ABC |
| 3 | DEF |
| 4 | GHI |
| 5 | JKL |
| 6 | MNO |
| 7 | PRS |
| 8 | TUV |
| 9 | WXY |
| 0 | Z (Operator) |

*The apparatus incorporated in the FLorida 3 exchange*

Preferably, each exchange of the telephone system comprises apparatus substantially identical to that provided in the FLorida 3 exchange which apparatus includes automatic switching equipment serving a maximum of ten thousand terminals as is best illustrated in Fig. 3. Three of the terminals respectively terminate the private subscriber lines TX3 and TR3 and the paystation line TP3. Four terminals commonly terminate the party subscriber line which serves the substation TS1—3 to TS4—3, inclusive. The switching equipment included in the FLorida 3 exchange comprises a number of line circuits individually associated with the above identified subscriber lines, the line circuits 405A, 405B, 405C and 405D being respectively associated with the above-named subscriber substations. It should be noted that the private subscriber substation TX3 is rendered extended service facilities and is of the class 1 type. The private subscriber station TR3 and the four-party line subscriber substations TS1—3 to TS4—3 are rendered free local service and are of the class 3 type. The paystation TP3 is of the class 3 type and is denied automatic toll service.

More particularly, the extended service subscribers of the class 1 type are rendered free automatic local service and free automatic toll service to certain exchanges in adjacent zones and automatic toll ticketing service to other exchanges in the various zones. The ordinary private subscriber substations and the party subscriber substations of the class 2 type are rendered free automatic local service to all subscriber substations terminating in the FLorida 1, FLorida 2 and FLorida 3 exchanges in zone 35 and they are also rendered automatic toll ticketing service to all other subscriber substations terminating in exchanges in the various remaining zones of the system. Finally, the paystation lines of the class 3 type are rendered automatic local service provided the necessary coin has been deposited in the paystation instrument and they are rendered toll service to exchanges in the metropolitan area with the aid of the "0" operator.

The various line circuits individual to the subscriber substations may be arranged in a common group and each line circuit may be individually strapped to provide the associated subscriber substation with the specific class of service to which the substation is entitled, in the manner described in the previously mentioned Ostline application. The FLorida 3 exchange is also provided with a group of directors, such as the schematically illustrated director 300A in Fig. 3, which are accessible to the various primary selectors, such as the primary selector 500A, by means of a director hunter, such as the director hunter 450A. Each director in the exchange comprises a controller 600, a code switch 1100, a call register 1500 and a coder 1800 which function to provide all of the necessary operating facilities for the director 300A.

The FLorida 3 exchange is also provided with a common translator 1300A which may be associated with any calling director under control of a translator assigner 1000A.

All of the remaining apparatus included in the FLorida 3 exchange, such as the distributor 442A, the finder 440A, the primary selector 500A, the ticket repeater 2300A, the ticket repeater selector 2700A, the tabulator allotter 2801A, the tabulator 2800A, the date and time unit U2953, the ticket repeater 2300A, the ticket repeater tape punch mechanism 2967, the call recorder 2000A and the detector 1900A, are arranged in the manner disclosed and described in detail in the previously mentioned Ostline application.

The director 300A controls the switching apparatus to set up a connection in accordance with the directory number of the called subscriber substation and it also functions, in combination with the individually associated call recorder 2000A and the common detector 1900A, to accumulate certain items of record information which are to be recorded incident to the completion of the telephone connection. These items of record information are transferred to the ticket repeater 2300A by means of code impulses and are stored therein during the time the connection is retained by the subscribers and at the termination of the connection, the stored items of record information are transferred to the tabulator 2800A and recorded by the punch mechanisms 2967 and 2968.

The EMpire 1 exchange illustrated in Fig. 2 is substantially the same as the FLorida 3 exchange. The principal difference resides in the fact that automatic recording of toll calls is not initially provided therein. Consequently, certain operations required in the FLorida 3 exchange are omitted in the EMpire 1 exchange. To permit the subsequent addition of recording apparatus in the EMpire 1 exchange, the director 300B and the translator 1300B are substantially the same as the corresponding apparatus provided in the FLorida 3 exchange. Consequently, the toll ticketing functions of the director and the translator in the EMpire 1 exchange, while provided therein, are not required during the operation of the equipment to set up connections which originate in the EMpire 1 exchange.

It should be noted that in the present telephone system code storage registering apparatus and code marking conductors are employed for the purpose of registering various digits and transferring such registered digits from one unit of equipment to another. The combinational code employed is generally referred to as a WXYZ code and is of the type wherein any digit from "1" to "9," inclusive, and "0" may be registered and transmitted by operating ony one or any two of four WXYZ register relays or by marking any one or any two of four WXYZ code marking conductors in accordance with the following code:

| Digit | Code |
| --- | --- |
| 1 | WX |
| 2 | WY |
| 3 | WZ |
| 4 | XY |
| 5 | XZ |
| 6 | YZ |
| 7 | W |
| 8 | X |
| 9 | Y |
| 0 | Z |

*Initiation of a call by a subscriber in the FLorida 3 exchange*

In order to describe the operation of the apparatus included in the telephone system, it will be assumed that a call is initiated by the subscriber at substation 401, shown in Fig. 5, in the FLorida 3 exchange. When the calling subscriber at substation 401 removes his receiver, the usual loop circuit is completed for operating the line circuit 405, whereupon the line circuit 405 initiates the operation of the distributor 442 and it marks the terminals of the calling subscriber line in the bank contacts accessible to the line finders in the group including the line finder 440. The distributor 442, by means of the associated rotary switch 441, selects an idle line finder, for example the line finder 440, and it will cause the selected line finder to operate its wipers in the well known manner to find and connect with the terminals marked by the line circuit individual to the calling subscriber line. When the line finder 440 finds the calling subscriber line, the distributor 442 is dismissed and rendered available for other calls. As a further result of a line finder 440 finding the calling subscriber line, a circuit is completed for marking the calling line busy to all calls which may be extended thereto by way of the bank contacts of the connector switches included in the local switch train. Also the line finder 440 completes an operating circuit for the primary selector 500 which is individually associated with the line finder 440. As soon as the primary selector 500 is operated, it initiates the hunting operation of the director hunter 450 for the purpose of finding an idle director which may be utilized by the calling subscriber to control the setting up of the connection. It will be assumed that the director hunter 450 is searching for an idle director, finds and connects with the director illustrated in the drawings.

As a result of the foregoing operation, the calling subscriber at substation 401 is now connected by way of the line circuit 405, the line finder 440, the primary selector 500 and the director hunter 450 to the code switch 1100 portion of the director illustrated in the drawings. The operation of the above mentioned apparatus is described in detail in the previously mentioned Ostline application. Accordingly, it will be assumed that the director is seized by the director hunter 450 over the conductors C468 to C475, inclusive, included in the cable C301. The conductors C471 and C472 connect the calling subscriber loop circuit to the code switch 1100 (Fig. 11) and then by way of the windings of the party line relay R1130, the upper winding of the line relay R1140, the contacts 1171 and 1173 and the resistor 1155, to battery and ground respectively. The terminal shown to the left of the resistor 1155 is marked with a negative (—) symbol to indicate the negative terminal of the 48 volt exchange battery. The line relay R1140 operates over the loop circuit but the party line relay R1130 does not operate due to the fact that the relay is differentially wound. As a result of the operation of the line relay R1140, a circuit is completed, at its contacts 1142, for operating the hold relay R1150 and the latter relay, at its contacts 1151, applies ground potential to the conductor C1137 extending to Fig. 7, in order to complete an operating circuit for the seizure relay R750 in the controller 600 portion of the director. Also, at its contacts 1153, the relay R1150 connects the impulse conductor C1135 by way of the wiper 1192 to the magnet RM1194 of the timer 1190. The conductor C1135 is connected to a time pulse generator which transmits twelve ground impulses per minute to the magnet of the timer 1190. The operations which take place incident to the stepping of the timer 1190 under control of the time pulses will be described hereinafter.

Figure 15:
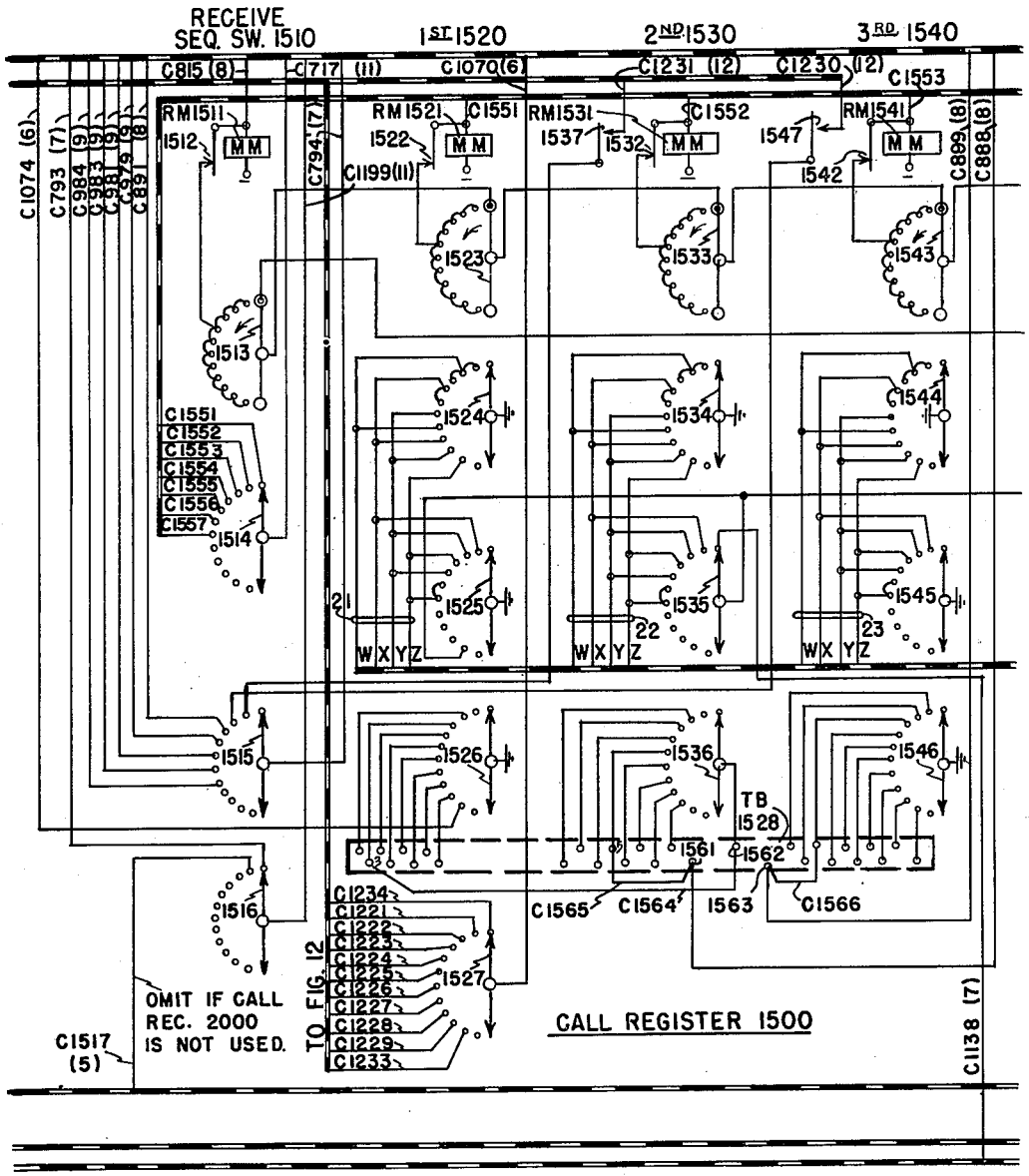
Figure 16:
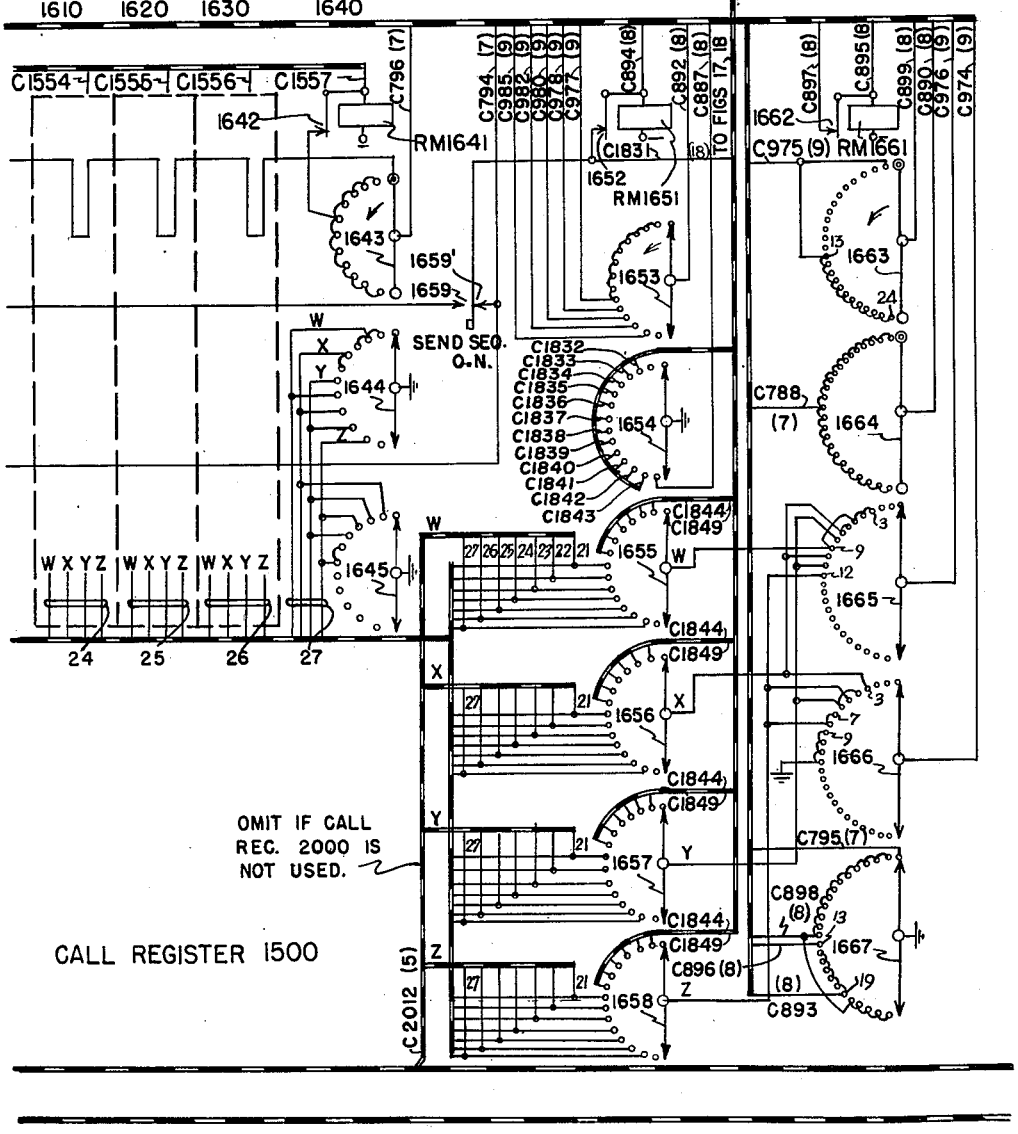
Figure 18:
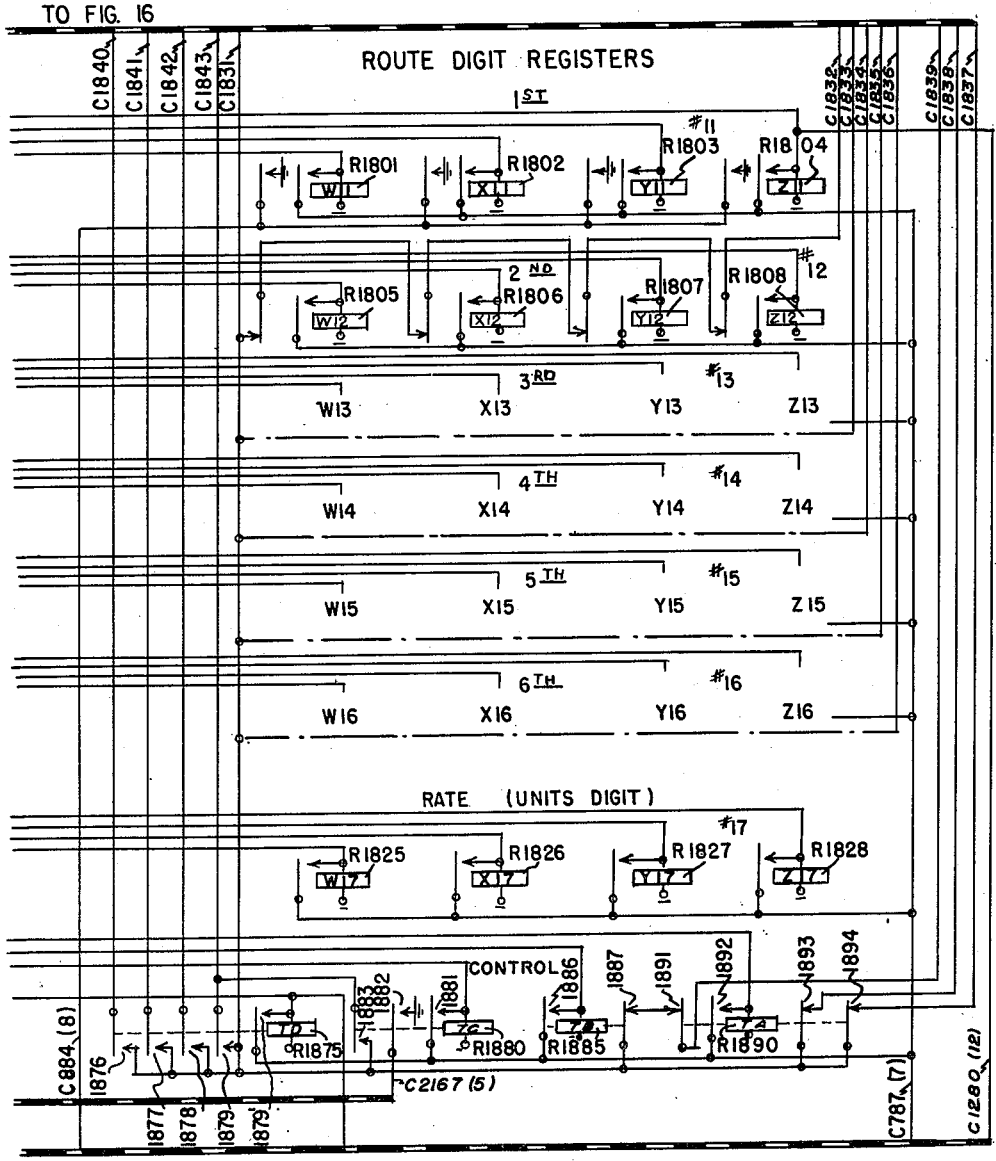

In response of the operation to the operation of the relay R750, at its contacts 751, it applies ground potential to the conductor C787 extending to Fig. 18 in order to provide a locking ground potential for the various relays in the coder 1800 and it also applies ground potential to the conductor C788 extending to Fig. 16 in order to provide a ground control potential at the bank contacts accessible to the wiper 1664 of the sender switch 1660. At its contacts 757, the relay R750 applies ground potential to the conductor C794' extending to Fig. 15 in order to provide a ground potential for the wiper 1515 of the receive sequence switch 1510 and it also applies ground potential to the conductor C725 extending to Fig. 5 in order to provide a locking ground potential for the call recorder 2000 individually associated with the director. It should be noted, however, that the call recorder 2000 and associated wiring may be omitted in the event that toll ticketing is not provided in the telephone system. At the contacts 755, the relay R750 completes an operating circuit for the hold relay R820 which circuit extends from ground and then by way of the winding of relay R820, the contacts 782 and 755 and the conductor C474 which has battery potential applied thereto from the primary selector 500 (Fig. 5). The manner in which battery potential is applied to conductor C474, is described in detail in the above mentioned Ostline application. At the contacts 753, the relay R750 completes a circuit including the resistor 615 for operating the director busy relay R610. At the contacts 751' and 752', the relay R750 interrupts points in the circuit for the director release relay R780 and, at its contacts 753', it completes a circuit for the left hand winding of the delay send relay R910 in order to bias the relay for subsequent operation.

The director busy relay R610 upon operating, at its contacts 611, applies ground potential to the conductor C475 in the cable 301 in order to mark the director busy to all director hunter switches having access thereto and, at its contacts 612, it completes a circuit for operating relay R606, whereby the normally operated relay R601 restores to normal and controls the hold and busy tone circuit 582, all in the manner described in the previously mentioned Ostline application.

In response to the operation of the hold relay R820, at its contacts 821, it completes a circuit by way of the contacts 764 and 734 for operating the class test relay R720. The relay R720 upon operating, at its contacts 722, prepares a point in the circuit for the class 2 test relay R670 and, at its contacts 724, it completes an operating circuit for the slow-to-operate control relay R730.

It may be well to mention at this time, that the calling subscriber line may be provided with any one of three classes of service. The line circuit 405, individual to the calling line, is provided with a terminal 428 which may be jumpered to the grounded terminal 425 or to the resistance battery terminal 426 or the jumpers may be omitted so that no potential is applied to the terminal 428. The calling line may be classified as a class 1 line arranged for extended service facilities by an absence of any potential on the terminal 428. It may also be classified as a class 2 line arranged for local service by jumpering the grounded terminal 425 and the terminal 428. It is also possible to classify the calling subscriber line as a class 3 line by jumpering the resistance battery terminal 426 and the terminal 428 in order to indicate that the calling line is a paystation line. The conductor C432 (Fig. 5) terminating at the terminal 428, is connected by way of the line circuit 405, the line finder 440, the primary selector 500 and the director hunter 450 to the conductor C470 in the cable C301.

With the foregoing three classes of service in mind, it will be seen that when the class test relay R720 operates, the conductor C470 is connected by way of the contacts 722 to the winding of the class 2 test relay R670. If the particular calling line is arranged for class 2 service, the direct ground potential applied to the conductor C470 will operate the class 2 test relay R670 in order to indicate that the calling line is of the class 2 type. The relay R670 upon operating, at its contacts 671, locks in its operated position to ground at contacts 752. Furthermore, at its contacts 672 and 674, the class 2 test relay R670 prepares points in circuits to be described hereinafter for indicating that the calling line is a class 2 line.

In the event that the calling line is not a class 2 line and no ground potential is applied to the conductor C470, the class 2 test relay R670 will remain in its unoperated position at the time it is connected to the conductor C470. As previously noted, the slow-to-operate control relay R730 also operated in response to the operation of the relay R720 and, after a slight delay, fully operates to interrupt, at its contacts 734, the circuit for the relay R720 which now restores to normal. At its contacts 732, the relay R730 prepares a point in the circuit for the class 3 test relay R710. Finally, at its contacts 733, the relay R730 prepares a point in the circuit for the class control relay R760. As soon as the class test relay R720 restores to normal, at its contacts 721, it connects the class test conductor C470 by way of the contacts 721, 732 and 711 to the winding of the class 3 test relay R710. If the calling line is a class 3 line, the conductor C470 will have a resistance battery potential applied thereto and a circuit will be completed for operating the class 3 test relay R710 over the above mentioned circuit to ground at contacts 752. As soon as the class 3 test relay R710 operates, at its contacts 711 and 712, it completes a locking circuit for itself which may be traced from ground at contact 752 and then by way of the winding of the relay R710, the contact 712 and the resistor 709, to battery. The relay R710, at its contacts 713 and 715, prepares points in circuits for indicating that the calling line is a class 3 line. In the event that neither ground potential nor resistance battery potential is applied to the conductor C470, the class 2 test relay R670 and the class 3 test relay R710 will not be operated during the cycle when these relays are successively connected to the class test conductor C470. With these relays in their restored positions, circuits will be completed in order to indicate that the calling line is a class 1 line.

As a further result of the restoration of the class test relay R720, at its contacts 723, it completes a circuit including the contacts 733 for operating the class control relay R760. Upon operating, the relay R760, at its contact 762, locks itself in its operated position from ground at contacts 752. It should be noted that when the relay R720 restores and completes the operating circuit for the relay R760, it interrupts, at its contacts 724, the circuit for the relay R730 which slowly restores to normal. The relay R730, however, does not fully restore to normal until after the circuit has been completed for operating and locking the relay R760 in its operated position.

As a further result of the operation of the relay R760, at its contacts 764, it opens an additional point in the circuit of the relay R720 in order to prevent reoperation of the last mentioned relay. Also, at its contacts 765, the relay R760 completes a circuit for illuminating the particular class lamp 676, 677 or 678 corresponding to the class of the calling line. Consequently, if the class 2 test relay R670 and the class 3 test relay R710 are restored, a circuit will be completed via contacts 714 and 673 for illuminating the class 1 lamp 676; if the class 2 test relay R670 is operated, a circuit will be completed via contacts 714 and 672 for illuminating the class 2 lamp 677; and finally, if the class 3 relay R710 is operated, a circuit will be completed via contacts 713 for illuminating the class 3 lamp 678. In the event that a circuit is completed for illuminating the class 2 lamp 677, a branch circuit is also completed via the conductor C708 extending to Fig. 5 in order to mark the class 2 calling line in the call recorder 2000. The operation of the call recorder 2000 in response to the marking of the class 2 calling line therein is described in detail in the previously mentioned Ostline application.

As a further result of the operation of the class control relay R760, at its contacts 763, it completes a circuit for transmitting the well known dial tone signal to the calling subscriber substation. This circuit may be traced from the dial tone conductor C797 and then by way of the contacts 763, 624 and 775, the conductor C1136 extending to Fig. 11 and then by way of the condenser 1133 and the conductor C472 to the calling subscriber substation.

*Dialling the called subscriber directory number*

When the calling subscriber at substation 401 hears the dial tone signal, he may then manipulate the dial at his substation in accordance with the code portion and the numerical portion of the called subscriber directory number. More specifically, the calling subscriber may dial the first two letters of the desired called exchange name and then the numerical digit designating the particular called exchange and finally the four numerical digits designating the particular called subscriber line in the called exchange. The two letters and the digit designating the particular called exchange are, at times, referred to as the called office code.

When the first digit is dialled by the calling subscriber at substation 401, the line relay R1140 in the code switch 1100 (Fig. 11) follows the pulses of the digit, in the well known manner, to register in the call register 1500 (Fig. 15) the digit dialled. In response to the first pulse of the first digit dialled, the loop circuit including the winding of the line relay R1140, is momentarily interrupted thereby causing the relay to restore to normal. At its contacts 1141, the relay R1140 applies ground potential by way of the contacts 1152 to the conductor C717 extending to Fig. 15 and to the winding of the digit relay R1160. The latter relay operates and, at its contacts 1161, applies ground potential to the conductor C1144 extending to Fig. 8. The relay R1160 is of the slow-to-release type and remains in its operated position during the time that the circuit of the line relay R1140 is interrupted under control of the calling subscriber dial. The ground potential applied to the conductor C717 is connected by way of the wiper 1514 of the receive sequence switch 1510, the engaged contact 1 of its associated bank, the conductor C1551 and the winding of the rotary magnet RM1521 of the first code register 1520, to battery. The rotary magnet RM1521 operates over the above traced circuit in order to prepare the first code register 1520 to advance its wipers 1523 to 1527, inclusive, one step in a counterclockwise direction. At the end of the first pulse of the dialled digit, the loop circuit for the line relay R1140 is again closed to cause the relay to operate and thereby interrupt, at its contacts 1141, the above traced circuit for the rotary magnet RM1521. The magnet RM1521 now restores to normal and advances the wipers 1523 to 1527, inclusive, from engagement with the home contacts into engagement with the contacts 1 in the associated banks.

In view of the foregoing, it will be seen that upon each restoration of the relay R1140, during pulsing, the circuit is completed for the digit relay R1160 whereby the relay is operated and due to the first restoration of the line relay R1140 and due to its slow-to-release characteristics, the relay R1160 is maintained in its operated position until the end of the last pulse of the series constituting the first dialled digit. The rotary magnet RM1521, however, will operate upon each restoration of the line relay R1140 and it will restore to normal upon each energization of the relay R1140 during pulsing. Furthermore, in order to maintain the pulsing circuit over the conductor C717, the line relay R1140 recompletes, at its contacts 1142, the circuit for the hold relay R1150 so that the last mentioned relay is retained in its operated position during the dialling of each digit. The line relay R1140 restores and reoperates in response to each pulse transmitted from the calling subscriber dial in order to repeat the pulses of each digit over the conductor C717. The pulses of the first dialled digit control the magnet RM1521 to step the wipers 1523 to 1527, inclusive, a number of steps corresponding to the number of pulses constituting the digit dialled.

At the end of the dialling of the first digit, the wipers 1524 and 1525 of the first code register 1520 will mark the WXYZ21 code marking conductors terminating in the associated contact banks to register, in code, the first digit dialled. The wiper 1526 marks a particular conductor in its associated contact bank for the purpose of determining whether or not the first dialled digit corresponds to the first digit of a local exchange name. The operation of the director, in the event a local exchange code is dialled and registered in the call register 1500, will be described hereinafter. The wiper 1527 of the first code register 1520 will mark one of the conductors in its associated contact bank in order to select one of the eight wipers in the wiper set individual to the code switch 1100. In this manner the first digit dialled by a calling subscriber is registered by the first code register 1520 in the call register 1500.

When the digit relay R1160 operated in response to the first pulse of the first digit dialled, it applied to ground potential, at its contacts 1161, to the conductor C1144. The conductor C1144 extends to Fig. 8 and then by way of the winding of the sequence control relay R830, to battery. Consequently, the sequence control relay R830 is operated at the beginning of the first pulse of the first dialled digit and, at its contacts 831, it applies ground potential to the conductor C815 extending to Fig. 15 and then by way of the winding of the magnet RM1511 of the receive sequence switch 1510, to battery. The above mentioned circuits including the relay R830 and the magnet RM1511, are maintained during the pulsing constituting the first dialled digit and shortly after the last pulse of the series the digit relay R1160 restores to normal. This relay restores to normal at this time due to the fact that the line relay R1140 remains in an operated position during the interdigital pause between the series of pulses constituting the first and second digits dialled by the calling subscriber. As soon as the relay R1160 restores to normal, at its contacts 1161, it removes ground potential from the conductor C1144 in order to interrupt the previously traced circuit for the relay R830 which also restores to normal. At its contacts 831, the relay R830 interrupts the circuit for the magnet RM1511 which now restores to normal and causes the wipers 1513 to 1516, of the receive sequence switch 1510, to be advanced one step in a counterclockwise direction from the normal home contact position into engagement with the contacts 1 in the associated contact banks. The advancement of the wiper 1514 into engagement with contact 1 transfers the pulsing circuit including the conductor C717, from the first code register 1520 to the second code register 1530 in order to prepare the last mentioned register to register the second digit dialled by the calling subscriber.

Before proceeding further with the description of operation, it should be noted that when the sequence control relay R830 initially operated, that is, at the beginning of the first pulse of the first digit dialled, at its contacts 835, it completed a circuit for illuminating the station dial lamp 823 in order to indicate to the exchange attendant that the subscriber connected to the particular director has started to dial the digits of a called number. Furthermore, at its contacts 832, the relay 830 completes a circuit for operating the tone control relay R620 which relay in turn, at its contacts 622, locks itself in its operated position to ground at the contacts 756. As a further result of the operation of relay R620, at its contacts 624, it interrupts the previously traced circuit for transmitting the dial tone signal to the calling subscriber and, at its contacts 621, it interrupts a point in the circuit including the fifteen second time control conductor C1196, which circuit is effective to indicate a faulty seizure of the director in the event that the subscriber fails to dial a digit within fifteen seconds after the director is seized.

Returning now to the code switch 1100 (Fig. 11), it will be seen that the hold relay R1150 and the digit relay R1160 are retained in their operating position during the dialling of the first digit and consequently, the ground at contacts 1151, which is applied to the conductor C1137, is also applied by way of the jumper interconnecting the terminals 1113 and 1114, the contacts 1163, 1176 and 1121 in order to operate the control relay R1180. The terminals 1113 and 1114 included in the above described circuit are provided for the purpose of either omitting or utilizing the functions of the relays R1110, R1120, R1170 and R1180. These relays are only required if the telephone system is provided with toll ticketing facilities and at least some of the subscribers in the system are party line subscribers. The operations of the above mentioned relays are described in detail in the previously mentioned Ostline application and it may be well to mention at this time that the party line subscriber substations are provided with a special calling device of the construction and arrangement disclosed in the John E. Ostline Patent, No. 2,410,520, granted November 5, 1946. Accordingly, the description of the operation of these relays in response to a call by a subscriber on a party line will be omitted.

In view of the foregoing, it will be assumed that the calling subscriber at substation 401 is provided with a conventional calling device or dial and that the line relay R1140 follows the pulses constituting each digit dialled by the subscriber thereat. Furthermore, it will be assumed that the differential type party line relay R1130 remains in its unoperated position during the dialling of all of the digits transmitted by the conventional dial at the calling subscriber substation 401.

When the calling subscriber dials the second digit, the line relay R1140 repeats the pulses of the digit over the conductor C717 to the wiper 1514 which now stands in engagement with the contact 1 terminating the conductor C1552. Accordingly, the pulses of the second digit dialled by the calling subscriber are repeated over the above traced circuit to the winding of the magnet RM1531 of the second code register 1530. Also during the dialling of the second digit, the digit relay R1160 and the sequence control relay R830 will be operated in the manner previously described in order to again complete the circuit for the magnet RM1511 of the receive sequence switch 1510 so that the wipers 1513 to 1516, inclusive, will be advanced a step in the counterclockwise direction into engagement with the contacts 2 in the associated contact banks at the end of the second digit. The magnet RM1531 of the second code register 1530 will advance its wipers, step-by-step, in a counterclockwise direction a number of steps corresponding to the number of pulses constituting the second digit dialled. In this manner, the second digit dialled by the calling subscriber is registered in the second code switch 1530 in substantially the same manner as the first digit was registered in the first code register 1520. However, in addition to the registration of the second digit, the magnet RM1531 upon each operation closes, at its contacts 1537, a circuit for operating the vertical magnet VM1210 of the code switch 1100. The circuit for operating the vertical magnet VM1210 may be traced from ground at contacts 757 and then by way of the conductor C794' extending to Fig. 15, the wiper 1515 of the receive sequence switch 1510, contact 1 in its associated contact bank, contacts 1537, conductor C1231 extending to Fig. 12, the winding of the vertical magnet VM1210, the contacts 1143 and the resistor 1154, to battery. Since the rotary magnet RM1531 closes its contacts 1537 upon each restoration of the line relay R1140 during pulsing, the contacts 1143 will be closed at the time the rotary magnet RM1531 closes its contacts 1537 and consequently the vertical magnet VM1210 will respond to each pulse and advance the associated wipers 1201 to 1208, inclusive, step-by-step, in a vertical direction a number of steps corresponding to the number of pulses in the second digit dialled by the calling subscriber. From the foregoing explanation of the operations resulting from the dialling of the second digit of the called subscriber number, it will be seen that the second code register 1530 and the code switch 1100 are operated substantially simultaneously to register the second digit of the called subscriber number.

During the interdigital pause between the dialling of the second and third digits, the line relay R1140 and the hold relay R1150 remain in their operated positions and the digit relay R1160 and the sequence control relay R830 restore to normal in the manner previously described. The relay R830, at its contacts 831, interrupts the previously traced circuit for the magnet RM1511 of the receive sequence switch 1510 thereby to cause the wipers 1513 to 1516, inclusive, to be advanced another step in a counterclockwise direction from engagement with contacts 1 into engagement with contacts 2 in the associated contact banks. This operation of the received sequence switch 1510 transfers the pulsing circuit including the conductor C717 from the second code register 1530 to the third code register 1540. In other words, the wiper 1514 disconnects the pulsing circuit from the conductor C1552 and connects it to the conductor C1553 extending to the magnet RM1541 of the third code register 1540. The wiper 1515 of the receive sequence switch 1510 interrupts, at the bank contact 1, the previously described circuit for controlling the vertical magnet VM1210 and it prepares a circuit, at the bank contact 2, for controlling the rotary magnet RM1211 of the code switch 1100.

Before proceeding with the description of operation for registering the third digit dialled by the calling subscriber, it should be noted that the wiper 1516 is in engagement with the contact 1 in its associated contact bank during the dialling of the second digit. Consequently, if the calling subscriber is a party line subscriber and the substation is provided with the special dial previously noted, the party line relay R1130 will operate in the manner described in the previously mentioned Ostline application to intermittently ground, at its contacts 1131, the conductor C1199. These ground pulses are transmitted by way of the wiper 1516 and the conductor C1517 extending to Fig. 5 in order to register in the call recorder 2000 whether the calling subscriber is the second, third or fourth station on a calling party line. The detail operations for registration of the identity of the particular calling station on a party line are described in the previously mentioned Ostline application.

When the third digit of the called subscriber directory number is dialled by the calling subscriber at substation 401, the pulses of the digit will be repeated by the line relay R1140 in order to control the intermittent operation of the magnet RM1541 of the third code register 1540. The magnet RM1541 advances its wipers 1543 to 1546, inclusive, step-by-step in a counterclockwise direction from the home contacts into engagement with the contacts in the associated contact banks corresponding in number to the number of pulses in the third dialled digit. Each time the rotary magnet RM1541 operates it completes, at its contacts 1547, a circuit including the ground wiper 1515 and the conductor C1230 for operating the rotary magnet RM1211 of the code switch 1100. Consequently, each time the magnet RM1541 operates and restores, the rotary magnet RM1211 is operated to rotate the wipers 1201 to 1208, inclusive, step-by-step in a rotary direction a number of steps corresponding to the number of pulses included in the third dialled digit. In view of the foregoing, it will be understood that the third code register 1540 registers the third digit of the called subscriber number and the wipers of the code switch 1100 will be positioned in a rotary direction in accordance with the third dialled digit.

From the foregoing description of operation, it will be understood that the first, second and third code registers 1520, 1530 and 1540 are successively operated to register respectively the first three digits dialled by the calling subscriber and that the code switch 1100 operates its wipers in a vertical direction and in a rotary direction in accordance with the second and third digits dialled. The particular wiper of the code switch 1100 which is rendered effective is determined by the value of the first digit dialled and registered in the first code register 1520. More specifically, the wiper 1527 of the first code register 1520 has access to the contacts in the associated contact bank terminating respectively the conductors C1221 to C1229, inclusive. These conductors extend to Fig. 12 where they terminate in the wipers 1201 to 1208, inclusive. Particular attention is called to the fact that the two conductors C1221 and C1222, which respectively terminate in the contacts 1 and 2 associated with the wiper 1527, may be selectively connected to the wiper 1201 of the code switch 1100 depending upon the position of the contacts NP1214 and NP1215. If the code switch is controlled to advance the wipers only one step in a vertical direction to level "1," the normal post contacts NP1214 will be closed and the normal post contacts NP1215 will be opened. However, if the wipers of the code switch 1100 are advanced in a vertical direction to any of the other levels "2" to "9," inclusive, and "0" the normal post contacts NP1214 and NP1215 will remain in the position shown in Fig. 12. The remaining conductors C1223 to C1229, inclusive, are respectively connected directly to the wipers 1202 to 1208, inclusive, of the code switch 1100. Accordingly, the position of the wiper 1527 of the first code register 1520 at the termination of the first digit dialled will correspond to the numerical value of the digit and, therefore, the corresponding conductor C1221 to C1229, inclusive, will be selected to render the associated wiper in the code switch 1100 effective for subsequent operation. It should be noted at this time, however, that the code switch 1100 is operated, in the manner described above, for the purpose of selectively controlling the translator 1300 to translate the first three digits dialled by the calling subscriber into one or more appropriate routing digits and for registering these routing digits in the coder 1800 portion of the director in the manner to be described hereinafter.

Before continuing with other operations which occur as a result of registering the first, second and third dialled digits in the first, second and third code registers 1520, 1530 and 1540, the manner in which the last four digits of the called subscriber directory number are registered in the call register 1500 will now be described. The last four digits dialled by the calling subscriber constitute the numerical portion of the directory number and designate the line of the particular called subscriber substation. It should be understood, however, that the subsequent operations occur in the event that the director is utilized in controlling the setting up of the connection to the called subscriber line. In other words, in the case of local calls, the director will be released from the calling subscriber line in response to the registration of the first three dialled digits designating a local exchange and the last four digits, dialled by the calling subscriber, will directly control the switches in the local exchange switch train to complete the connection to the desired local subscriber.

In the present example, however, it will be assumed that the director will be utilized to complete the connection to the called subscriber and consequently the fourth digit dialled by the calling subscriber will be repeated by the line relay R1140, in the manner previously described, over a circuit including the conductor C717, the wiper 1514, which is now in engagement with contact 3 in the associated contact bank, the conductor C1554 and the rotary magnet (not shown) of the first numerical register 1610. The fourth digit dialled by the calling subscriber will be registered in the first numerical register 1610 in the same manner and for the same purpose as the digits registered in the first, second and third code registers 1520, 1530 and 1540. At the end of the digit the receive sequence switch 1510 will advance its wipers into engagement with contacts 4 in order to transfer the pulsing circuit from the conductor C1554, extending to the first numerical register 1610, to the conductor C1555, extending to the second numerical register 1620. The calling subscriber now dials the fifth digit of the called number and this digit is registered in the second numerical register 1620 in the manner described above. After the registration of the fifth digit, the receive sequence switch 1510 advances its wipers into engagement with the contacts 5 in the associated banks in order to transfer the above mentioned pulsing circuit from the second numerical register 1620 to the third numerical register 1630. The calling subscriber now dials the sixth digit of the called subscriber number and this digit is registered in the third numerical register 1630 in the manner previously described. At the end of this digit the receive sequence switch 1510 advances its wipers into engagement with contacts 6 in order to complete the pulsing circuit over the conductor C1557 to the fourth numerical register 1640. The calling subscriber now dials the seventh digit of the directory number which is repeated by the line relay R1140, in the manner previously described, to the magnet RM1641 thereby to register in the fourth numerical register 1640, the seventh digit dialled by the calling subscriber. The wipers 1643 to 1645, inclusive, are advanced, step-by-step, under control of the magnet RM1641 in order to mark the associated bank contacts in accordance with the digit dialled. When the seventh or last digit of the called subscriber number has been registered in the fourth numerical register 1640, the receive sequence switch 1510 advances its wipers into engagement with the contacts 7 in the associated contact banks. In this manner, the seven digits of the called subscriber directory number are registered in the call register 1500. The manner in which the registered digits are utilized in setting up the desired connection and in controlling the apparatus to produce a record including the directory number of the called subscriber, will be described hereinafter.

*Local calls*

A description will first be given of the operation of the director in response to the registration therein of the code digits designating the FLorida 3 office in which the director is located. This operation is given at this time in order to describe the manner in which the director releases itself from the calling subscriber line so that it is again rendered available for other calls. Accordingly, it will be assumed that the calling subscriber at substation 401 is a subscriber located in the FLorida 3 exchange, such as the subscriber TR3 illustrated in Fig. 3, and that the digits dialled by the calling subscriber indicate that the call is to be extended to another subscriber in the FLorida 3 exchange. The calling subscriber at substation 401 dials the called office code digits 353 (FL3) of the FLorida 3 exchange followed by the digits 1234 of the numerical portion of the directory number of the called subscriber. When the calling subscriber actuates his calling device in accordance with the letter F, three impulses corresponding to the digit 3 are transmitted to the line relay R1140 (Fig. 11) and repeated to the first code register 1520 in the manner previously described. The wipers 1523 to 1527, inclusive, will be advanced into engagement with contacts 3 in the associated contact banks. The wiper 1524 places a ground potential upon the W21 code marking conductor and the wiper 1525 places a ground potential upon the Z21 code marking conductor. The application of ground potential to the W21 and Z21 conductors marks the four marking conductors WXYZ21, in code form, in accordance with the digit 3. In this manner the digit 3, registered in the first code register 1520, is marked in the bank contacts associated with the wipers 1655 to 1658, inclusive, of the send sequence switch 1650. Also the wiper 1526 of the first code register 1520 applies ground potential via the engaged contact 3 to the terminal 3 in the left hand section of the terminal block TB1528. Finally, the wiper 1527 of the first code register 1520 connects the conductor C1070 to the conductor C1223 extending to the wiper 1202 of the code switch 1100.

The calling subscriber at substation 401 now dials the letter L thereby to transmit five pulses corresponding to the digit 5 to the second code register 1530 in the manner previously described. The second code register 1530 in response to the digit 5 advances its wipers 1533 to 1536, inclusive, into engagement with the contacts 5 in the associated contact banks. The wipers 1534 and 1535 respectively apply ground potential to the X22 and Z22 conductors thereby to register, in code form, the digit 5 on the code marking conductors WXYZ22. The wiper 1536 connects the terminal 1562 of the terminal block TB1528 to the terminal 5 provided in the middle section of the terminal block TB1528. As a result of the last mentioned connection, a circuit is completed from ground at the wiper 1526 via the contact 3 in the associated contact bank, the terminal 3 in the left hand section of the terminal block TB1528, the conductor C1564, the terminal 1562, the wiper 1536 and the engaged contact 5, the terminal 5 in the middle section of the terminal block TB1528, the conductor C1565, the terminal 1561, the conductor C888 extending to Fig. 8, the contacts 833 and 813 and the winding of the first and second digit local relay R840, to battery. In view of the above description, it will be understood that by means of the strappings on the terminal block TB1528, it is possible to jumper the left hand section thereof and the middle section thereof to complete a circuit for the relay R840 for any combination of two digits in order to indicate that a call is for a subscriber in the local exchange area. In the present disclosure the terminals have been jumpered to indicate each time the letters FL (digits 35) of the called office code are dialled by a subscriber in the FLorida 3 exchange by completing an operating circuit for the relay R840 as soon as the sequence relay R830 restores to normal at the end of the second dialled digit.

In response to the operation of the relay R840, at its contacts 845, it completes a locking circuit for itself from ground at contacts 758 of the operated seizure relay R750, which locking circuit is independent of the initial operating circuit including the conductor C888. At the contacts 844, the relay R840 completes a circuit for operating a line relay (not shown) in the primary selector 500 (Fig. 5) which circuit is completed from ground at the contacts 1142 of the operated line relay R1140 in the code switch 1100 (Fig. 11), the conductor C1145 extending to Fig. 6, the contacts 646 and 844, the resistor 843 and the conductor C468 in the cable C301 which extends to the line relay (not shown) in the primary selector 500. The line relay in the primary selector 500 operates over the above traced circuit and prepares the primary selector 500 to respond to the next digit dialled by the calling subscriber and registered in the call register 1500 in the manner described in detail in the previously mentioned Ostline application. As a further result of the operation of relay R840, at its contacts 841, it completes a circuit which may be traced from ground at the contacts 851 and then by way of the contacts 841, 731 and 721 and the conductor C470 in the cable 301 to a transfer relay (not shown) in the primary selector 500 in order to place the last mentioned relay under control of the controller 600 portion of the director.

From the foregoing explanation, it will be seen that when the calling subscriber dials the first two code digits of the local exchange name, the first and second code registers 1520 and 1530 in the associated director will function to prepare the primary selector 500 to respond to the third digit dialled by the calling subscriber and registered in the third code register 1540.

In the present example, the third digit dialled by the calling subscriber is the digit 3 identifying the third FLorida exchange in zone 35. The digit 3 is registered in the third code register 1540, in the manner previously described, and positions the wipers 1543 to 1546, inclusive, into engagement with the contacts 3 in the associated contact banks. The wipers 1544 and 1545 respectively apply ground potential to the code marking conductors W23 and Z23 in order to register, in code form, the third digit 3 on the WXYZ23 code making conductors. The wiper 1546 applies ground potential by way of the associated contact 3 to the terminal 3 located at the right hand section of the terminal block TB1528. This ground potential is further extended by way of the jumper C1566 to the terminal 1563 and then by way of the conductor C889 extending to Fig. 8, the contacts 842 and 846 and the winding of the third digit local relay R850, to battery.

The above traced circuit for operating the third digit relay R850 is completed after the wiper 1546 has been positioned into engagement with the contact 3 of the associated contact bank. However, during the time that the line relay R1140 is being controlled by the pulses constituting the third digit 3, at its contacts 1142, it intermittently interrupts the previously traced circuit including the conductor C1145, the contacts 646 and 844, the resistor 843 and the conductor C468 extending to Fig. 3 in order to control the line relay (not shown) in the primary selector 500 whereby the last mentioned relay is restored a number of times corresponding to the number of pulses in the third digit dialled in order to raise the wipers of the selector to a position opposite the third level in the associated contact banks. In this manner, the third digit 3 is registered by the third code register 1540, the code switch 1100 and the primary selector 500.

At the end of the dialling of the third digit 3, the line relay R1140 in the code switch 1100 remains in its operated position over the previously traced loop circuit including the calling subscriber line. In its operated position, the line relay R1140 maintains, at its contacts 1142, a holding circuit for the line relay (not shown) in the primary selector and it also maintains the hold relay R1150 in the code switch 1100 in its operated position.

Shortly after the last pulse of the digit 3, the digit relay R1160 restores to normal and, at its contacts 1161, it interrupts the circuit for the sequence control relay R830, which relay now restores to normal and, at its contacts 831, interrupts the previously traced circuit for the receive sequence switch 1510 thereby to cause the wipers 1513 to 1516, inclusive, to be advanced one step into engagement with the contacts 3 in the associated contact banks. The last mentioned operation of the sequence switch 1510 is of no consequence in the present call inasmuch as the first three digits dialled by the calling subscriber and registered in the call register 1500 indicate that the call is to a subscriber connected to the originating exchange. As a further result of the restoration of the relay R830, at its contacts 834, it completes a circuit for operating the director release relay R780. The circuit for operating the relay R780 is substantially the same as the previously described circuit for operating the third digit local relay R850 since the relay R780 is in multiple with the last mentioned circuit. Finally, at its contacts 836, the relay R830 completes a circuit including the contacts 854 for operating a peg count meter which is provided to indicate the number of times that the director has been utilized in absorbing the first three digits of the called office code of the originating exchange.

Before describing the release of the director in response to the operation of the relay R780, it should be noted that when the third digit local relay R850 operated, in the manner described above, it interrupted, at its contacts 851, a circuit including the contacts 841, 731 and 721 and the conductor C470 extending to the previously mentioned transfer relay (not shown) in the primary selector 500. The transfer relay now restores to normal and thus causes the primary selector 500 to automatically rotate its associated wipers to search for an idle trunk to the switches in the succeeding local switch train. When the primary selector 500 finds an idle trunk extending to the local switch train it will switch through, in the manner described in the previously mentioned Ostline application, and thereby disconnect the associated director from the calling line and connect the calling subscriber line through the primary selector to the succeeding switch over the selected trunk. The subsequent pulses transmitted from the calling subscriber dial will now be transmitted directly over the selected trunk to a switch in the local switch train. Consequently, the remaining digits dialled by the calling subscriber, which constitute the numerical portion of the called subscriber directory number, will directly control the local switch train to extend the connection to the desired local exchange called subscriber.

*Release of the director on local calls*

It will be recalled that the dialling of the three digits of the code indicative of the originating local exchange caused the director release relay R780 to be operated. Upon operating, the relay R780, at its contacts 786, completes a locking circuit for itself from ground at the contacts 758 of the operated seizure relay R750. Also, at its contacts 781, the relay R780 places an additional holding ground on the circuit for maintaining the director busy relay R610 in its operated position. Accordingly, the director busy relay R610 will remain in its operated position until the restoration of the seizure relay R750 or the director release relay R780 depending upon which of these relays is last to restore. Furthermore, at its contacts 784, the relay R780 completes a circuit for illuminating the release lamp 777. Finally, at its contacts 782, the relay R780 interrupts a point in the previously traced circuit for the hold relay R820. The hold relay R820 now restores to normal and, at its contacts 821, interrupts a further point in the previously traced circuit for the class test relay R720. It should be mentioned at this time that the hold relay R820 originally operated over a series circuit including the conductor C474 in the cable C301 and a director test relay (not shown) in the primary selector 500. The above mentioned director test relay also restores to normal, at the time relay R820 restores, and it disconnects the various conductors in the cable 301 from the primary selector 500 and the associated director hunter 450.

When the various conductors in the cable 301 are disconnected, upon the restoration of the director test relay (not shown) in the primary selector 500, the loop circuit for the line relay R1140 in the code switch 1100 is interrupted. The line relay R1140 now restores to normal and, at its contacts 1142, it interrupts the circuit for the hold relay R1150 which slowly restores to normal. As soon as the relay R1150 restores, it removes, at its contacts 1151, the ground potential from conductor C1137 extending to Fig. 7 thereby to cause the restoration of the seizure relay R750. Also the removal of ground, at the contacts 1151, causes the restoration of any one of the operated relays R1110, R1120, R1170 and R1180 in the code switch 1100 in the manner described in the previously mentioned Ostline application.

Incident to the restoration of the seizure relay R750, at its contacts 751', it completes a circuit for the lower winding of the director release relay R780 from the grounded conductor C795 extending to Fig. 16. Referring now to Fig. 16, it will be seen that the conductor C795 is grounded at the home contact position of wiper 1667 of the sender switch 1600. Consequently, the ground potential applied to the conductor C795 is extended by way of the contact 751', the lower winding of the director release relay R780, the conductor C796 extending to Fig. 16 and the wiper 1643 of the fourth numerical register 1640. Inasmuch as the numerical registers 1610, 1620, 1630 and 1640 have not been operated to register any of the digits of a called subscriber directory number, the wipers thereof, such as the wiper 1643, are in engagement with the home contact positions. Consequently, the ground potential applied to the wiper 1643 is further extended by way of the home contact positions and associated wipers (not shown) of the above mentioned numerical registers to the wiper 1543 of the third code register 1540. The third code register 1540 has been operated to register the third digit of the called office code and its wipers engage contacts corresponding to the numerical value of the digit registered therein. The ground potential applied to the wiper 1543 is, accordingly, extended by way of the interrupter contacts 1542 and the winding of the magnet RM1541, to battery. The magnet RM1541 interrupts its own circuit by opening the contacts 1542 and causes the associated wipers 1543 to 1546, inclusive, to be advanced, step-by-step, in a counterclockwise direction until the wiper 1543 engages its home contact position. When this occurs the automatic restoring circuit for the various registers in the call register 1500 is transferred to the wiper 1533 of the second code register 1530. The second code register 1530 has registered therein the second digit of the called office code and a circuit is accordingly completed via the interrupter contacts 1532 and winding of the magnet RM1531, to battery. The magnet 1531 is self-interruptedly operated over this circuit until the wipers thereof are rotated into engagement with the home contact positions. When the home contact position is reached the restoring circuit is transferred to the first code register 1520 where a corresponding self-interrupting circuit is completed for the magnet RM1521 for restoring the wipers 1523 to 1527, inclusive, of the first code register to the normal home contact positions. The wiper 1523 in engagement with its home contact position transfers the restoring circuit via the wiper 1513 to the magnet RM1511 of the receive sequence switch 1510. The last mentioned magnet is self-interruptedly operated and the wipers 1513 to 1516, inclusive, are thereby restored to the home contact positions.

In view of the foregoing, it should be understood that each of the switches 1510, 1520, 1530, 1540, 1610, 1620, 1630 and 1640 may be sequentially operated in the reverse order to restore their associated wipers to normal. As soon as the receive sequence switch 1510 has restored its wipers 1513 into engagement with the home contact, the restoring circuit ground potential is transferred to the send sequence switch off-normal contacts 1659. However, since the send sequence switch 1650 has not been operated in the local call being described, the off-normal contacts thereof are in the position illustrated in the drawing and no circuit will be completed at this time for restoring the send sequence switch 1650 to normal. It is convenient at the present time, however, to explain the release circuit for the send sequence switch 1650 and for this purpose it will be assumed that it has been operated to advance its wipers away from their normal home contact positions. When the wipers of the switch 1650 have been advanced from the home contact positions, the off-normal contacts 1659 are closed and the off-normal contacts 1659' are opened. Accordingly, the ground potential applied over the previously traced circuit is further extended by way of the contact 1659, the interrupter contacts 1652 and the winding of the magnet RM1651, to battery. This will cause the magnet RM1651 to be self-interruptedly operated until the wipers 1653 to 1658, inclusive, have been advanced, step-by-step, in a counterclockwise direction to the home contact position. In the home contact position of the above mentioned wipers, the off-normal contact 1659 will be opened to interrupt the above mentioned circuit for controlling the operation of the magnet RM1561. From the foregoing, it will be understood that the operation of the director release relay R780 will cause the various operated rotary switches in the call register 1500 to be sequentially restored to normal in the order described above.

Figure 12:
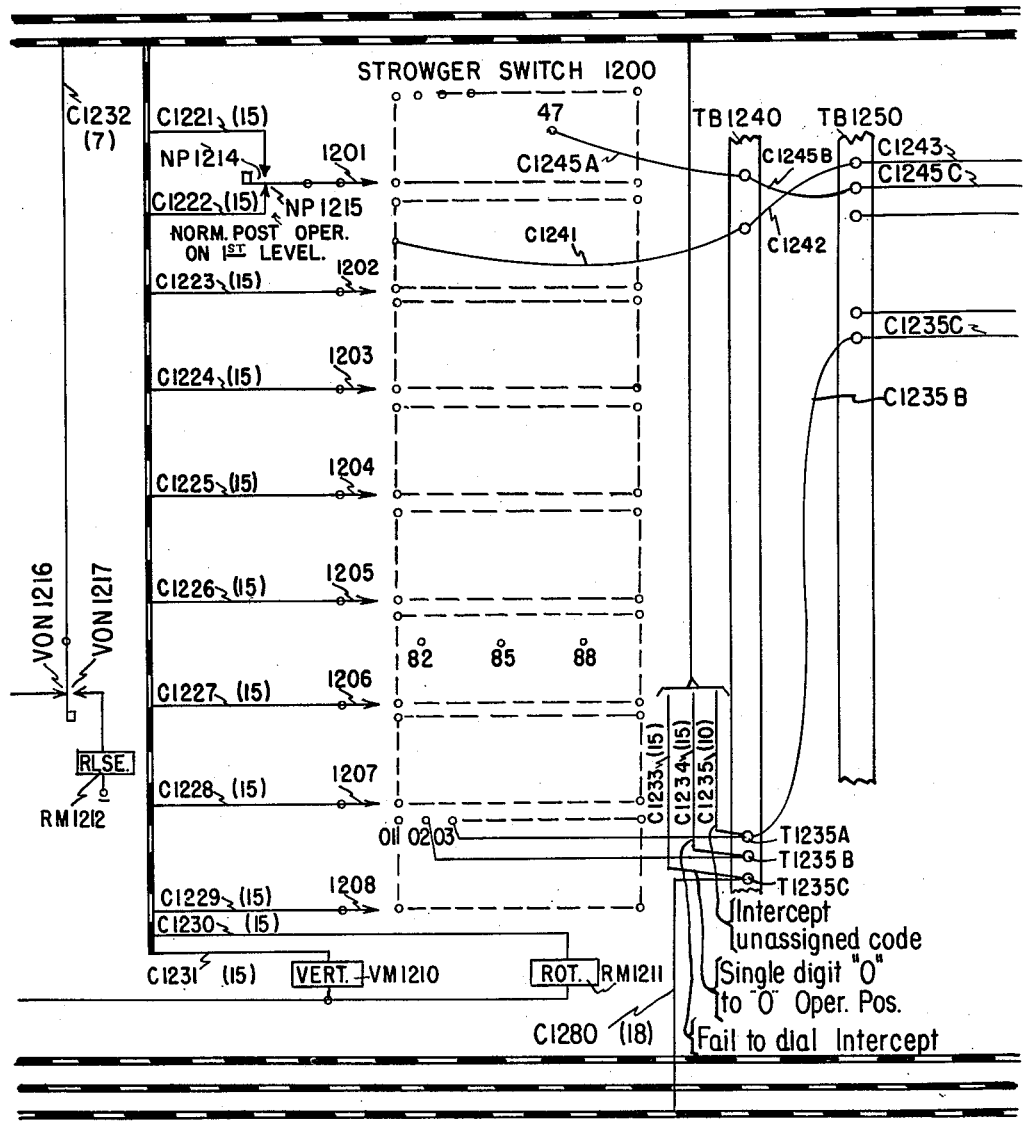

Simultaneously with the completion of the above traced circuit for restoring the various rotary switches in the call register 1500, a multiple release ground circuit is completed by way of the grounded conductor C795, the contacts 751', the lower wind of the director release relay R780, the contacts 752', the conductor C1232 extending to Fig. 12, the vertical off-normal contacts VON1217 and the winding of the release magnet RM1212, to battery. The release magnet RM1212 of the code switch 1100 operates over the above traced circuit and thereby causes the wipers 1201 to 1208, inclusive, to be restored to their normal resting positions. The restoration of the wipers to their normal resting positions actuates the vertical off-normal contacts VON1216 and VON1217 to the positions shown in the drawing (Fig. 12) thereby to interrupt the circuit of the release magnet RM1212, which magnet restores to normal, and to transfer the ground potential on the conductor C1232 by way of the contacts VON1216 in order to operate the release magnet RM1198 of the timer 1190. If the wipers of the timer 1190 have been advanced from the home contact position shown on the drawing, the rotary off-normal contacts RON1195 will be closed and a circuit will be completed for the release magnet RM1198. The magnet RM1198 will operate over this circuit and will cause the wipers 1191 and 1192 to be restored, in a counterclockwise direction, to the normal resting position illustrated on the drawing and the contacts RON1195 will be opened to interrupt the circuit of the magnet RM1198.

As a further result of the restoration of the seizure relay R750, at its contacts 752, 753, 754, 756, 758 and 753', it interrupts various circuits to remove holding ground potentials from various operated relays in the controller 600 in order to cause all of such operated relays to restore to normal.

When all of the rotary switches in the call register 1500 (Figs. 15 and 16), the code switch 1100 (Fig. 12) and the minor switch timer 1190 have been restored to normal in the manner described above the multiple circuit including the low winding of the director release relay R780 will be interrupted and the relay will restore to normal. At its contacts 784, the relay R780 interrupts the circuit for illuminating the release lamp 777; at its contacts 782 and 783, it again prepares points in circuits for reseizing the controller 600 portion of the director; and finally, at its contacts 781, it interrupts the circuit for the director busy relay R610 which now restores to normal. The director busy relay R610 upon restoring, at its contacts 611, removes the busy marking ground potential from the conductor C475 in the cable 301 in order to render the associated director available for additional calls and, at its contacts 612, it interrupts a circuit for the director busy relay R606 in order to indicate that at least one director, in the group of directors serving calling subscriber lines, is available for an additional call.

Calls to exchanges outside the originating exchange local area

In view of the previous explanation of the mode of operation of the line circuit 405, the line finder 440, the primary selector 500, the director hunter 450 and the units of equipment of the director, including the controller 600, the code switch 1100 and the call register 1500, in so far as this equipment functions to extend a connection from the calling subscriber at substation 401 to the director and to register this code and numerical digits of the called subscriber number, it should be understood that this equipment is operative in a substantially identical manner to extend a call from a calling subscriber substation to a director and to register the directory number of any called subscriber substation in the entire telephone network. In describing the operation of the call register 1500 portion of the director, an explanation was given of the manner in which the three code registers 1520, 1530 and 1540 and the four numerical registers 1610, 1620, 1630 and 1640 operated to register the three code digits and the four numerical digits of a seven digit directory number. Also, in the case of a local call, a description was given to illustrate the fact that the registration of the three code digits corresponding to the local called exchange caused the primary selector 500 to operate in response to the third code digit to select an idle trunk extending to the local switch train and to cause the release of the director.

It will now be assumed that the calling subscriber at substation 401 has initiated a call and that the director including the controller 600, the code switch 1100, the call register 1500 and the coder 1800 has been seized for operation. It will also be assumed that the calling subscriber has dialled into the director the seven digits of the directory number of a desired called subscriber in the EMpire 1 exchange. For the purpose of this description, it will be assumed that the desired called subscriber is the subscriber at substation TR1 (Fig. 2) whose directory number is EMpire 1-1234. In response to the dialling of the digits corresponding to the called office code EM1 the code digits 361 are registered respectively in the first, second and third code registers 1520, 1530 and 1540 in the manner previously described. Also as a result of the dialling of the digits of the numerical portion of the called subscriber directory number, the digits 1, 2, 3 and 4 are registered respectively in the first, second, third and fourth numerical registers 1610, 1620, 1630 and 1640 all in the manner previously described. In response to the registration of the first code digit 3 in the first code register 1520, the wipers 1523 to 1527, inclusive, will be stepped into engagement with the contacts 3 in the associated contact banks. The wipers 1524 and 1525 will mark the code conductors WXYZ21 in accordance with the digit 3 and the wiper 1527 will select the conductor 1223 terminating in the wiper 1202 of the code switch 1100 (Fig. 12). The second and third code registers 1530 and 1540 will advance their associated wipers into engagement with their respective sixth and first bank contacts in response to the second code digit 6 and the third code digit 1. The wipers 1534 and 1535 will mark the code conductors WXYZ22 in accordance with the digit 6 and the wipers 1544 and 1545 will mark the code conductors WXYZ23 in accordance with the digit 1. It will be recalled that at the time the first code register 1520 was operated in accordance with the first code digit 3, the wipers 1513 to 1516, inclusive, of the receive sequence switch 1510, were in engagement with the home contacts in the associated contact banks and that the wipers were in engagement with the contacts 1 in the associated contact banks during the dialling of the second digit 6 which is registered in the second code register 1530. The pulses of the last mentioned digit is repeated to the code switch 1100 over the conductor C1231 in the manner previously explained and control the vertical magnet VM1210 to raise the wipers 1201 to 1208, inclusive, step-by-step, in a vertical direction to a position opposite the sixth level of the associated contact banks. During the dialling of the third code digit 1, the wipers of the receive sequence switch 1510 are in engagement with the contacts 2 in the associated contact banks, whereby the third code register 1540 registers the third code digit 1 and the digit 1 is repeated over the conductor C1230 to the rotary magnet RM1211 of the code switch 1100. The magnet RM1211 rotates the wipers 1201 to 1208, inclusive, one step into engagement with the first contacts in the sixth level of the associated contact banks.

During the dialling of the first numerical digit of the called subscriber directory number, that is the thousands digit 1, the wipers 1513 to 1516, inclusive, of the receive sequence switch 1510 are in engagement with the contacts 3 in the associated contact banks. When the wiper 1515 engages contact 3 it completes a circuit for operating the assigner start relay R640 in order to control the translator assigner 1000 (Fig. 10) to find the particular director being utilized in the instant call and to associate the common translator 1300 with the particular director.

Before proceeding with the description of the operation whereby the common translator is associated with a calling director, it should be noted that the originating exchange is provided with a plurality of directors of the type illustrated and a single common translator 1300 which will be called into use by a calling director when it is necessary to translate the called office code digits of a directory number into one or more routing digits. These routing digits may be of the same numerical value as the three called office code digits or they may be of different values and different numbers of digits depending upon the trunking network employed in the system. The common translator 1300 is provided with a number of individual translator relays each of which is permanently wired, in accordance with the routing digits and other information, to control the setting up of connections between the originating exchange and a particular called exchange over a predetermined trunk route. The route selected is predetermined by jumpering various contacts of the individual translator relays so that the call will either be set up over a direct trunk route to the particular called exchange or it will be set up by way of one or more tandem exchanges to the called exchange.

Referring again to the previously mentioned circuit for controlling the operation of the assigner start relay R640, it will be seen that the circuit for relay R640 may be traced from ground by way of the contacts 757 of the operated seizure relay R750, the conductor C794' extending to Fig. 15, the wiper 1515 and the engaged contact 3, the conductor C891 extending to Fig. 8, the contacts 852, 811, 783 and 662 and the winding of the assigner start relay R640, to battery.

Upon operating, the relay R640 completes a locking circuit for itself which is dependent on a portion of the above described circuit including the wiper 1515. This locking circuit may be traced from ground at contacts 756 and then via the contacts 645, 811, 783 and 662 and the winding of relay R640, to battery. It may be well to mention at this time that the initial circuit for operating the assigner start relay R640 is completed when the wiper 1515 engages contact 3 due to the fact that the third digit local relay R850 and the director release relay R780 have not been operated. In other words, the fact that called office code digits, other than the code digits indicative of the originating local exchange, have been registered in the call register 1500 prevents operation of these relays and, consequently, is completed for operating the assigner start relay R640 in order to assign the common translator 1300 for the exclusive use of the calling director.

As a further result of the operation of the assigner start relay R640, at its contacts 646, it opens a further point in the previously described circuit including the conductors C1145 and C468 for controlling the line relay (not shown) in the primary selector 500. The relay R840 is not operated in the present call because the first two called office code digits dialled by the calling subscriber do not correspond to the first two code digits identifying the originating local exchange.

As a further result of the operation of relay R640, at its contacts 647, it completes a circuit for illuminating the translator assigner lamp 635 in order to indicate to the exchange attendant that this particular director requires the association of the common translator. Also, at its contacts 647, the relay R640 completes a circuit from ground via the conductor C686 extending to Fig. 10, and the winding of the start relay R1040, to battery, for operating the last mentioned relay. At its contacts 648, the relay R640 completes an obvious circuit for operating the peg count meter 654 in order to count the number of times the controller 600 portion operates the translator assigner 1000. At its contacts 641, the relay R640 removes ground potential from the conductor C685 extending to the translator assigner 1000 (Fig. 10) thereby to remove a non-calling marking ground potential from a contact in the bank associated with the wiper 1002 in the translator assigner 1000. At its contacts 642, the relay R640 connects the winding of the assigner test relay R650 to a contact in the bank associated with the wiper 1002, via the conductor C685, in order to mark the particular contact with a resistance ground potential and thus indicate that the particular director is calling and is to be connected to the common translator 1300. At its contacts 643, the relay R640 interrupts a point in the circuit including the conductors C1070 and C1074 which circuit is utilized, in the manner to be described hereinafter, only in the event that the first digit dialled by a calling subscriber is the single digit 0. At its contacts 644, the relay R640 prepares a point in the circuit, traced hereinafter, for operating the translator test relay R1050. It should be noted that since each of the directors is provided with a controller portion, such as a controller 600, the conductors, corresponding to the conductor C685, normally have direct ground potential applied thereto when the associated directors are not in a calling condition and do not require the use of the translator assigner 1000 and the translator 1300. However, as soon as a controller portion of a director is in a calling condition and requires the use of the common translator 1300, the start conductor C686 is grounded and the conductor C685 is marked with a resistance ground potential instead of a direct ground potential.

Finally, relay R640, at its contacts 649, completes four separate branch circuits. The first branch circuit is completed from ground, contacts 649 and 701X and the winding of the pulse generator start relay XR700, to battery. The second branch circuit is completed from ground, contacts 649, 701X, 705 and the winding of the field structure 701 of the pulse generator 700, to battery. The third branch circuit is completed from ground, contacts 649, 701X, 704X and the winding of the field structure 701, to battery. The fourth branch circuit is completed from ground, contacts 701X, conductor C794 extending to Fig. 16, the send sequence switch off-normal contacts 1659', the interrupter contacts 1652 and the winding of the magnet RM1651 of the send sequence switch 1650, to battery. The four branch circuits are completed substantially simultaneously in order to start operation of the pulse generator 700 even though the main operating circuit therefor is open at contacts 705 in order to step the wipers of the second sequence switch 1650 one step from the home contacts into engagement with contacts 1, and in order to transfer the control ground for these circuits from the contacts 649 to the contacts 759 by operating relay XR700. More specifically, when the second and third branch circuits are completed the pulse generator 700 is started regardless of the position of the contacts 705 and it continues to operate over the circuit traced from ground, contacts 759, 703X and 705, and the winding of the field structure 701, to battery, as soon as the relay XR700 operates. The relay XR700 operates over the first branch circuit and, at its contacts 703X, it completes the last traced circuit for the pulse generator 700, it completes a locking circuit for itself from ground at contacts 759, and it connects the last mentioned ground to the conductor C794. At its contacts 704X, the relay XR700 interrupts the preliminary start circuit for the pulse generator 700 including the third branch circuit and at its contacts 701X, it disconnects all of the branch circuits from ground at contacts 649. The magnet RM1651 operates over the fourth branch circuit and upon operating, it interrupts its own circuit, at its contacts 1652, and restores to normal. The restoration of the magnet RM1651 causes the wipers 1653 to 1658, inclusive, to be advanced from the home contacts to the contacts 1. As soon as the wipers are advanced from the home contacts the send sequence off-normal contacts 1659' are opened and the contacts 1659 are closed, thereby to interrupt the initial circuit for the magnet RM1651 and bring the wipers to rest in engagement with the contacts 1. The pulse generator 700 continues to operate and generates pulses, at its contacts 706, at the rate of approximately ten pulses per second. In this connection, it should be noted that the ground potential at contacts 759 which retains the pulse generator 700 and the relay XR700 operated, is also extended by way of the contacts 706 to the winding of the pulse relay R880. Consequently, the pulse relay R880 operates at the rate of ten pulses per second for the purpose to be described hereinafter.

The pulse generator 700 is of the type disclosed in the copending Ostline application, Serial No. 36,371, filed July 1, 1948, now Patent No. 2,492,435, granted December 27, 1949. It may be well to mention that the armature 702, the serrated permanent magnet 703 and the cam 704 are secured to a common shaft. The armature 702 is rotated in the magnetic field created by the field structure 701, and causes the magnet 703 to interrupt the circuit for the winding of the field structure 701, at the contacts 705, at a predetermined frequency. The left hand end of the armature spring of the contacts 705 is provided with a permanent magnet and constitutes a pendulum having a natural frequency of vibration that is determined by the mass of the magnet and the mass and stiffness of the armature itself. Thus, the pulse generator 700 constitutes a direct current electric motor which is started when the second and third branch circuits are closed to the winding of the field structure 701. The circuit for the pulse generator 700 is connected and arranged so that the motor will always be stopped in a fixed restarting position when the contacts 759 are opened upon the restoration of the seizure relay R750. The principal function of the pulse generator 700 is to transmit pulses, at the contacts 706, at the rate of ten pulses per second to the pulse relay R880.

*Operation of the translator assigner 1000*

When the start conductor C686 for the translator assigner 1000 (Fig. 10) is grounded by a director requiring the use of the translator 1300, the start relay R1040 is operated in the manner previously explained. The relay R1040 upon operating, at its contacts 1043, applies ground potential by way of the winding of the director hold relay R1030 to the wiper 1001 and, at its contacts 1042, it completes an obvious circuit for operating the translator timer relay R1020. Finally, at its contacts 1041, the relay R1040 connects the wiper 1002 to the winding of the rotary magnet RM1004 by way of the rotary magnet interrupter contacts 1005. The operation of the translator timer relay R1020 performs no useful function on a normal call wherein the translator 1300 is connected to and released from a calling director within a predetermined elapsed time interval. All directors not requiring the use of a translator maintain a non-calling or busy marking ground potential on the respective hold conductor, such as the conductor C685, and, therefore, the wiper 1002 will find ground potential on the bank contacts terminating such conductors. This ground potential is extended by way of the contacts 1041 and 1005 and the winding of the rotary magnet RM1004, to battery. The rotary magnet RM1004 operates over this circuit and, incident to its operation, it interrupts its own operating circuit, at its contacts 1005, and restores to normal. In response to the restoration of the magnet RM1004 the wipers 1001 to 1003, inclusive, are advanced one step in a clockwise direction into engagement with the next set of bank contacts. If the next contact engaged by the wiper 1002 also has a direct ground potential applied thereto, the above described cycle of operation will be repeated in order to advance the wipers an additional step in a clockwise direction. In this manner the wipers 1001 to 1003, inclusive, of the translator assigner 1000 are automatically advanced step-by-step to search for the contact terminating the conductors of a director that requires the use of a translator. Since the director calling for a translator has substituted a resistance ground for the direct ground on the conductor C685, the engagement of the associated contact by the wiper 1002 completes a circuit traced hereinafter. This circuit may be traced from ground and then by way of the winding of the assigner test relay R650, contacts 642, the conductor C685, the wiper 1002, contacts 1041 and 1005 and the winding of the magnet RM1004, to battery. Due to the high resistance of the winding of relay R650, the magnet RM1004 will not operate over this circuit but the relay R650 will operate. In this manner the wipers 1001 to 1003, inclusive, of the translator assigner 1000 are automatically rotated until the wiper 1002 engages a contact marked with resistance ground and when this occurs the automatic stepping is terminated, to indicate that the particular calling director has been found.

Figure 6:
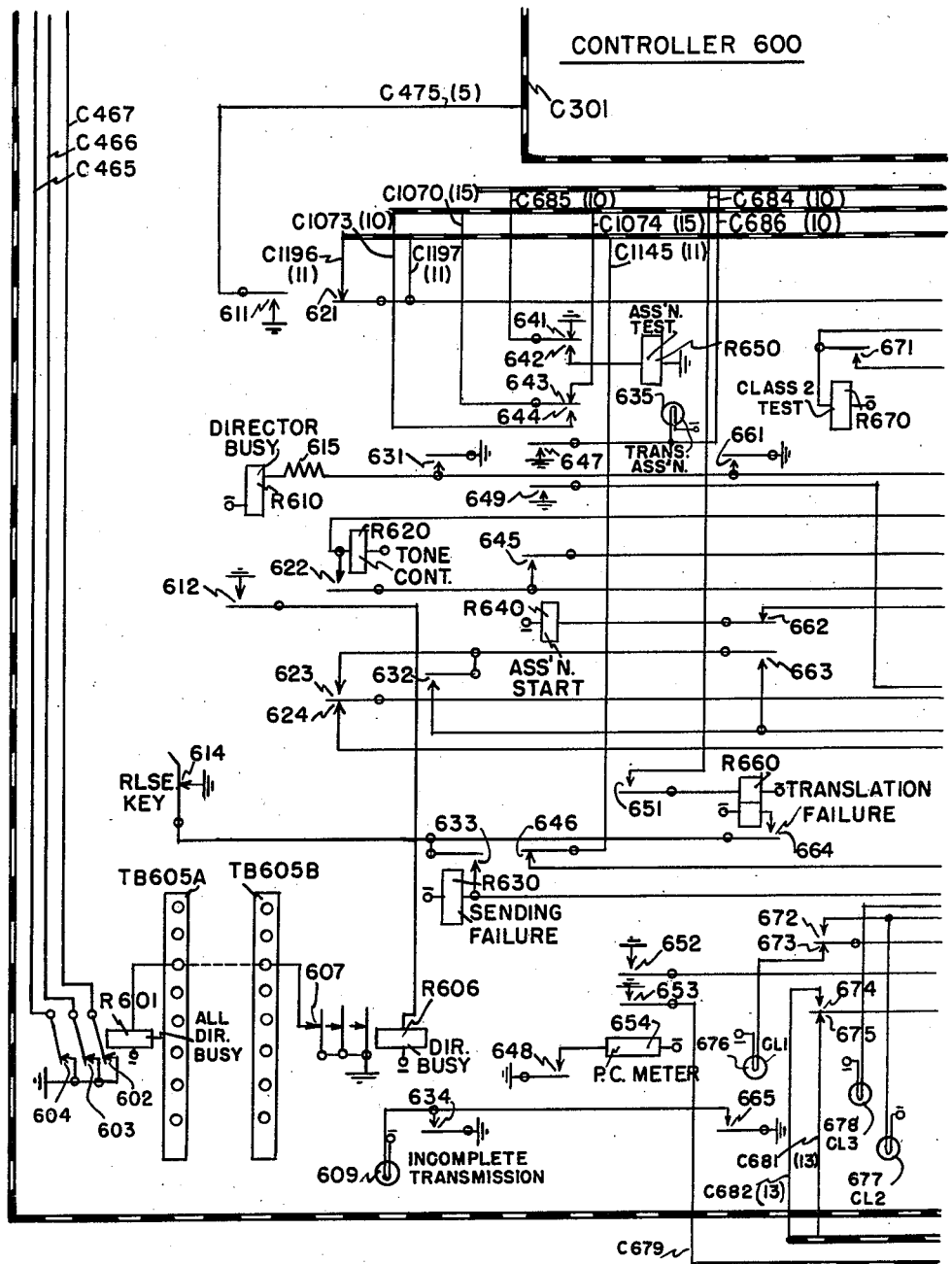

At substantially the same time that the assigner test relay R650 is operated in series with the magnet RM1004, a circuit is completed from ground at contacts 1043 of the operated start relay R1040 via the winding of the relay R1030, the wiper 1001, the conductor C684 extending to Fig. 6, the contacts 651, and the upper winding of the translation failure relay R660, to battery. Due to the resistance of the winding of the director hold relay R1030, the translation failure relay R660 does not operate over this circuit but the relay R1030 operates. At its contacts 1032, the relay R1030 completes an obvious circuit for operating the slow-to-operate translator start relay R1010 and, at its contacts 1033, it applies ground potential to the conductor C1071 extending to Fig. 13 thereby to operate the start relay R1380 in the translator 1300.

The relay R1380 upon operating interrupts, at its contacts 1383, a point in the circuit for controlling the alternate trunk route relay R1370 and, at its contacts 1381, it interrupts the locking circuit for the multiple guard relay R1440 in the translator 1300. The last mentioned circuit is normally retained completed as long as the translator 1300 is in an idle condition and the relay R1440, at its contacts 1 to 35, inclusive (numbered from left to right), connects a signal lamp, such as the lamp 1484, to each of the conductors terminating in the associated contacts. The thirty-four conductors terminating in the contacts 1 to 34, inclusive, are multiply connected to the corresponding contacts of each of the translator relays in the translator, such as the relays R1410, R1420, R1430 etc. The contact 35 is grounded in order to maintain the guard control relay R1470 operated as long as the relay R1440 is operated. With the multiple guard relay R1440 operated, the thirty-four above mentioned signal lamps are connected to each of the above mentioned thirty-four multiply connected conductors in order to indicate whether or not false ground potential is applied to any one of the conductors. If a false ground is encountered, the lamp connected thereto, such as the lamp 1484, will be illuminated and the left hand winding of the guard alarm relay R1480 will be energized in series therewith. The relay R1480 will operate over this conduit and cause the transmission of various alarm signals in the manner explained in the previously mentioned Ostline application. In view of the foregoing, it will be understood that the multiple guard relay R1440 performs a continuous test of the various multiply connected code marking conductors terminated in the various contacts of the translator relays noted above.

Shortly after the previous traced circuit is completed for the translator start relay R1010, the relay operates and, at its contacts 1011, it short-circuits the interrupter contacts 1005 of the rotary magnet RM1004. At its contacts 1013, the relay R1010 completes a point in the circuit for operating the translator test relay R1050 in series with the particular translator relay in the translator 1300 which is selected in accordance with the operated position of the code switch 1100. The code switch 1100, it will be recalled, has been operated in accordance with the first three digits constituting the called office code. Also the relay R1010, at its contacts 1014, prepares a point in a circuit for applying direct ground potential to the conductor C684 but this circuit is not completed immediately due to the fact that the translator timer relay R1020 is somewhat slow-to-release after its circuit is opened at the contacts 1012. Finally, at its contacts 1116, the relay R1010 prepares a point in the circuit for operating the unassigned code relay R1060. The last mentioned relay, due to its slow-to-operate characteristics and also due to the fact that its operating circuit is normally interrupted, at the contacts 1051, prior to the time that it can fully operate, does not operate when the remaining circuits and apparatus of the translator and the director function in the proper manner. The operation of the relay R1060, in response to the registration of an unassigned called office code, is described in detail in the previously mentioned Ostline application.

It will be recalled that the assigner test relay R650 operated when the translator assigner 1000 found the calling director. At its contacts 652, the relay R650 applies ground potential to the class 1 conductor C681, the class 2 conductor C682 or the class 3 conductor C683 depending upon the operated or unoperated positions of the relays R670 and R710. The last mentioned relays are operated in accordance with the service class of the particular calling line as previously described. Also, at the contacts 653, the relay R650 applies ground potential to the conductor C679 extending to Fig. 17 in order to operate the multicontact connector relay R1710. This relay at its contacts 1 to 35, inclusive (numbered from left to right), connects the coder 1800 portion of the calling director to the conductors terminating in the lower contacts of the multicontact relay R1710. The last mentioned conductors are multiply connected to the corresponding contacts of each of the translator relays included in the translator 1300. Since only one director can be connected to the translator 1300, as has been determined by the operation of the translator assigner 1000, the information, which has been permanently wired to the selected one of the translator relays, such as the relays R1410, R1420 etc. in the translator 1300, will be transferred to the coder 1800 portion of the calling director, in the manner described hereinafter.

From the foregoing description it will be understood that when a director requires the use of a translator, the translator assigner 1000 is operated to find the calling director and when the calling director is found, the coder 1800 portion of the director is connected to the common translator 1300 by means of the translator connector relay R1710. It is now necessary to select and operate the particular translator relay in the translator 1300 which corresponds to the service class of the particular calling subscriber line and which is also individual to the called office code digits which have been registered in the code registers 1520, 1530 and 1540 of the call register 1500.

It may be well to mention at this time that each of the translator relays in the translator 1300 is permanently wired in code to register in the coder 1800, one or more of the routing digits required to extend a connection from the originating exchange over a preselected trunk route or routes in the direction of the desired called exchange. Also these translator relays are permanently wired to register in the coder 1800, various control signals for controlling the operation of the sender portion of the director to first send the registered routing digits in a predetermined order and then to send one or more selected ones of the digits of the directory number registered in the call register 1500, which are necessary to complete the connection to the desired called subscriber. The translator relays also register in the coder 1800, certain other items of information, including the rate at which the call should be charged in order to accumulate sufficient information to produce a record of the telephone connection.

The manner in which a particular translator relay is selected and operated will not be described. It will be recalled that the code switch 1100 has positioned all of its wipers into engagement with the first contact in the sixth level in response to the registration of the second digit 6 and the third digit 1 in the second and third code registers 1530 and 1540. It will also be recalled that the first code register 1520 in response to the registration of the first digit 3 selected the wiper 1202 of the code switch 1100. Consequently, when the translator start relay R1010 operated, ground potential was extended by way of the contacts 1031 and 1013, the winding of the translator test relay R1050, contacts 1062, wiper 1003, conductor C1073 extending to Fig. 6, contacts 644, conductor C1070 extending to Fig. 15, wiper 1527 and the engaged contact 3, conductor C1223 extending to Fig. 12, the wiper 1202 and the engaged contact 1 in the sixth level of the code switch 1100, conductor C1241, terminal block TB1240, jumper C1242, terminal block TB1250 and then over conductor C1243 to contact 1 of relays R1310, R1320 and R1340. The further extension of this circuit in order to control the operation of a particular translator relay, such as the relays R1410, R1420 etc., depends upon the operation of either the class 1, class 2 or class 3 auxiliary relays R1310, R1320 or R1330. The particular one of the last mentioned relays which is operaed at this time depends upon the class of the calling line which has been registered in the controller 600 portion of the director by relays R670 and R710.

However, before describing the circuits for controlling the operation of the relays R1310, R1320 and R1330 in the translator 1300, it may be well to explain the manner in which the various contacts in the banks of the code switch 1100 are jumpered to the terminals on the terminal block TB1240. Each bank contact assembly associated with each of the wipers 1201 to 1208, inclusive, of the code switch 1100, includes ten rows of ten contacts to make up a contact bank assembly of one hundred separate contacts. Since there are eight bank contact assemblies, each provided with one hundred contacts, a total number of eight hundred individual selectable contacts are available and each contact is connected by means of a separate conductor, such as the conductor C1241, to separate terminals on the terminal block TB1240. Thus it will be seen that any one of eight hundred contacts may be selected depending upon the wiper of the code switch 1100 which is selected in accordance with the first digit registered in the first code register 1520 and in accordance with the particular contact in the bank of the switch which is selected in accordance with the second and third digits registered in the second and third code registers 1530 and 1540. The number of translator relays, such as the relays R1410, R1420 etc., provided in the translator 1300 in the originating exchange, depends upon the number of code translations which are necessary to extend connections from the originating calling subscriber line to any other called subscriber line in any exchange in the telephone network. In the system being described, it may be assumed that one hundred seventy-five separate translator relays, such as the relay R1410, have been provided but only five of these relays have been shown, namely, the translator relays R1410, R1420, R1430, R1450 and R1460. The windings of the one hundred seventy-five translator relays are connected to terminals on the terminal block TB1396 and they may be individually jumped therefrom to corresponding terminals on the terminal block TB1395. The particular translator relay which is selected is determined by the class of the calling line and the three code digits dialled by the calling subscriber, as previously noted. Since there are three separate classes of service provided, it is also necessary to provide facilities for jumpering any particular contact of the eight hundred contacts in the bank of the code switch 1100 to one contact in each of three sets of one hundred seventy-five terminals provided respectively for the three classes of service. The three sets of one hundred seventy-five contacts may in turn be jumpered to one or more of the translator relays by means of jumpers interconnecting the terminals on the terminal block TB1395 and the terminals on the terminal block TB1396. Although it has been assumed that this system is provided with one hundred seventy-five translator relays, it should be understood, from the jumpering arrangement described and illustrated, that any number of translator relays may be provided as is determined by the number of different possible called office codes which may be dialled by a calling subscriber, the number of different routes over which connections may be extended to the different called offices, and the different classes of calling lines.

The manner in which the class relays in the translator 1300 are operated in order to complete the selection of a particular translator relay in the translator 1300 will now be described. Referring now to the operated assigner test relay R650, it will be noted that, in addition to grounding the conductor C679 in order to operate the translator connector relay R1710, at its contacts 652, it applies ground potential by way of the contacts 716 and 674 to the conductor C682 extending to Fig. 13. In the above described circuit, it has been assumed that the class 2 test relay R670 has been operated due to the fact that the calling subscriber is of the class 2 type and that it has been locked in its operated position. It should be understood, however, that the ground potential at the contacts 652 may be connected to the conductor C682 in the event that the class 3 test relay R710 is operated or to the conductor C681 in the event that the class 2 test relay R670 and the class 3 test relay R710 are not operated.

Referring now to Fig. 13, it will be seen that when ground potential is applied to the conductor C682, a circuit is completed for the class 2 relay R1350. The relay R1350 operates over this circuit and, at its contacts 1351, completes an obvious circuit for operating the class 2 auxiliary relay R1320. This relay is provided with one hundred seventy-five separate make contacts which are closed in response to the operation of the relay. Although a single relay, provided with one hundred seventy-five make contacts, is illustrated, it should be understood that any number of relays having a combined total of one hundred seventy-five contacts could be utilized, provided they are simultaneously operated to close all of their contacts at one time.

In the previous description it was pointed out that the conductor C1243 was grounded over a circuit including the contacts 1013 of the operated translator start relay R1010. With the class 2 auxiliary relay R1320 operated, this ground potential is further extended via the contact 1 of the operated relay R1320, the conductor C1390, the terminal block TB1395, the jumper C1391, the terminal block TB1396, the conductor C1392 and the winding of the translator relay R1410, to battery. When the above mentioned circuit is completed, the relay R1410 operates and, at its contacts 1 to 34, inclusive, (numbered from left to right) it connects marking ground potentials to certain of the thirty-four conductors extending to the coder 1800. The bottom contacts 1 to 28, inclusive, of the relay R1410 respectively terminate seven sets of four marking conductors designated WXYZ11 to WXYZ17, inclusive. The last six contacts 29 to 34, inclusive, respectively terminate six conductors designated TA, TB, TC, TD, ABT and Y18. The above mentioned thirty-four conductors are multiply connected to the corresponding thirty-four contacts of all of the remaining translator relays and to the corresponding thirty-four contacts of all of the translator connector relays, such as R1710, in all of the directors. The corresponding upper contacts of the relay R1410 form a terminal arrangement whereby a common ground busbar, secured to the relay structure, may be connected to any one of the thirty-four upper contacts by merely soldering the particular contacts to the grounded busbar. In this manner the four WXYZ code marking conductors in the seven groups designated WXYZ11 to WXYZ17, inclusive, may be selectively grounded in accordance with the previously described combinational code to register any of the digits "1" to "9" and "0." The last six conductors TA to TD, inclusive and ABT and Y18 may be grounded individually or in combinations to provide certain specific controls in the director.

For the purpose of this description, it will be assumed that the routing digits 4 and 8 are required to extend a connection from a calling subscriber in the FLorida 3 exchange to the called subscriber TR1 in the EMpire 1 exchange. Consequently, the X11 and Y11 conductors will be grounded respectively via the contacts 2 and 3 of the operated relay R1410. This ground potential will mark the X11 and Y11 conductors, in code form, in accordance with the first routing digit 4. In order to mark the WXYZ12 conductors, in accordance with the second routing digit 8, the X12 conductor is grounded via the contact 6 when the relay R1410 is operated. In view of the foregoing, it will be understood that the upper contacts 2, 3 and 6 on the relay R1410 are soldered to the grounded busbar in the manner described above.

It should be noted that as many as six separate routing digits may be marked respectively on the WXYZ11 to WXYZ16 code marking conductors by connecting the associated contacts of the relay R1410 to the grounded busbar in accordance with the previously described code. The WXYZ17 marking conductors are provided to indicate the units digit of the rate of charge for a call between a calling subscriber in the FLorida 3 exchange and a subscriber in the EMpire 1 exchange. For the purpose of this description, it will be assumed that the class 2 calling subscriber will be charged for the connection in accordance with the rate 01. Thereby the W17 and X17 code marking conductors will be grounded in accordance with the units digit 1 of the rate 01 when the relay R1410 is operated. Finally, the TB conductor and the ABT conductor will be grounded when the relay R1410 is operated in order to control the director to transmit the last five digits of the directory number of the called subscriber as registered in the call register 1500 and in order to control the call recorder 2000 (Fig. 5) to indicate that the particular call is an AB toll call requiring toll ticketing. The X18 code marking conductor will not be grounded in the present call because the tens digit of the rate 01 is the digit 0. If the tens digit of the rate is to be the digit 1 then the Y18 code marking conductor will also be grounded.

Before proceeding with the description of operation of the circuits whereby the information permanently wired on the translator relay R1410 is transferred to the coder 1800, it may be well to mention that the information permanently wired on the relay R1410 may also be used in connection with calls which are to be completed between the FLorida 3 exchange and the EMpire 2 and EMpire 3 exchanges serving called subscriber substations located in the same local exchange area as the subscriber substations served by the EMpire 1 exchange. Consequently, if a call is to be extended to a subscriber in the EMpire 2 exchange, the calling subscriber at substation 401 dials the called office code digits 362 instead of 361. These digits are registered in the call register 1500 in the manner previously explained and causes the wiper 1202 of the code switch 1100 to be selected and operated to the second set of contacts in the sixth level of the associated bank contacts. In this case the conductor, such as the conductor C1241, is connected between a terminal on the terminal block TB1240 and the above mentioned contact and a jumper, such as the jumper C1242, connects this terminal to the terminal on the terminal block TB1250 terminating the conductor C1243. Accordingly, it will be understood that the translator relay R1410 will be operated in the same manner as has been described in connection with the call being extended to a subscriber in the EMpire 1 exchange.

The same operations also take place when the called office code digits 363 of the EMpire 3 exchange are registered in the call register 1500. However, in this case the wiper 1202 of the code switch 1100 is positioned into engagement with contact 3 in the sixth level and the last mentioned contact may be connected, in the manner described above, to the conductor C1243. Consequently, the translator relay R1410 will also operate to extend a connection from the class 2 calling subscriber in the FLorida 3 exchange to a desired called subscriber in the EMpire 3 exchange. With this arrangement the translator relay R1410 may be operated in order to register the routing digits 4 and 8 in the coder 1800, to register the units digit 1 of the rate 01 in the coder 1800, to operate the TB control relay in the coder 1800 in order to cause the director to send the last five digits of the called subscriber directory number and to indicate to the call recorder 2000 that the call is an AB toll call requiring toll ticketing, regardless of whether the call is to be extended to the EMpire 1, EMpire 2, or EMpire 3 exchange.

In the above explanation it was assumed that the originating subscriber is a class 2 subscriber in the FLorida 3 exchange and that the charge rate 01 is applicable to telephone connections established with subscribers in the EMpire 1, EMpire 2 or EMpire 3 exchange. However, if one of the EMpire exchanges is located at a more remote point in the EMpire zone, it may be advisable to apply a different charge rate for calls to the last mentioned exchange. In that event the translator relay R1410 will be used for routing calls to subscribers in the EMpire 1 and EMpire 2 exchanges and the rate 01 will be applied. However, another translator relay, similar to the relay R1410, may be connected and arranged in the manner described above and permanently wired with another charge rate, such as the rate 02, and the last mentioned translator relay may be operated each time the EMpire 3 exchange is called by the class 2 subscriber at substation 401 of the FLorida 3 exchange.

When the translator relay R1410 initially operates, in the manner previously described, the ground potential applied to the X11 and Y11 code marking conductors is extended by way of contacts 2 and 3 of the operated connector relay R1710 and the windings of the X11 and Y11 route digit register relays R1802 and R1803, to battery. The relays R1802 and R1803 operate when the above mentioned circuits are completed and, at their inner left hand contacts, they complete locking circuits for themselves to the grounded locking conductor C787. The last mentioned conductor has ground potential applied thereto at the contacts 751 of the operated seizure relay R750. In this manner the first route digit 4 is registered, in code form, in the first route digit register of the coder 1800.

As a further result of the initial operation of the translator relay R1410 ground potential is applied to the X12 conductor and then by way of the contacts 6 of the relay R1710 and the winding of the X12 relay R1806, to battery, in the second route digit register thereby to operate the last mentioned relay and register the second route digit 8. The relay R1806 upon operating completes a locking circuit for itself, at its inner left hand contacts, to the locking conductor C787. Since the WXYZ13 to WXYZ16 code marking conductors terminating in the contacts of the translator relay R1410 are not grounded at this time, the associated register relays in the third to sixth route digit registers in the coder 1800 are not operated.

As a further result of the operation of the translator relay R1410, the W17 and X17 code marking conductors are grounded and cause the operation of the W17 and X17 relays R1825 and R1827 of the units digits rate digit relays in the coder 1800 over circuits substantially identical to those previously described. These relays are also locked in their operated positions via their left hand make contacts to the locking ground conductor C787. As a further result of the operation of R1410, ground potential is also applied to the TB conductor in order to operate the TB control relay R1885 in the coder 1800. The relay R1885, upon operating, locks itself in its operated position via the left hand make contacts and the grounded conductor C787. Finally, the relay R1410 upon operating applies ground potential to the ABT conductor. This conductor terminates in contacts 33 of the operated translator connector relay R1710 and it is extended via the conductor C2242 to the call recorder 2000 (Fig. 5). The ground potential applied to the conductor C2242 completes an operating circuit for a start relay (not shown) in the call recorder 2000. The description of operation of the call recorder 2000 and the associated detector 1900 is described in detail in the previously mentioned Ostline application. Generally stated, the call recorder 2000 and the detector 1900 automatically operate to identify and register the directory number of the calling subscriber at substation 401 and the call recorder 2000 also functions to transfer certain items of record information, including the calling subscriber directory number, to the toll ticketing repeater 2300 which is subsequently included in the telephone connection.

At the present time the coder 1800 has registered therein the routing digits 4 and 8, the units digit 1 of the rate 01 and the control relay R1885 has been operated in order to determine further operations of the director in setting up the telephone connection. The foregoing operations occur simultaneously since they also result from the closure of the contacts 1 to 34, inclusive, of the translator relay R14'0. Referring now to the first route digit register relays R1801 to R1804, inclusive, it will be seen that the left hand outer contacts of these relays individually apply ground potential to the conductor C884. Consequently, when one of these relays is operated in conjunction with the registration of a first route digit, ground potential is applied to the conductor C884 and in order to complete an operating circuit for the translation complete relay R810 in the controller 600 portion of the director. In other words, as soon as a routing digit is registered in the first route digit register relays R1801 to R1804, inclusive, the translation complete relay R810 is operated in order to indicate that the translator 1300 has translated the three called office code digits of a called subscriber directory number into appropriate routing digits and control signals and this information has been registered in the coder 1800. Since the translation has been completed, the translator 1300 may now be disconnected from the calling director so that it may be used by other directors requiring the translation of called office code digits registered therein.

When the translation complete relay R810 operates, it interrupts, at its contacts 811, a point in the previously traced locking circuit for the assigner start relay R640. The relay R640 now restores to normal and, at its contacts 641 and 642, it transfers the hold conductor C685 from the circuit including the winding of the relay R650 to the direct ground potential at contacts 641. Referring to the translator assigner 1000 (Fig. 10), it will be seen that the substitution of direct ground potential for the resistance ground potential on conductor C685 will complete a circuit via the wiper 1002 and the contacts 1041 and 1011 for operating the magnet RM1004. The operation of the magnet RM1004 conditions the rotary magnet to advance the wipers 1001 to 1003, inclusive, an additional step. The relay R650 now restores to normal. As a further result of the restoration of the relay R640, at its contacts 641, it extinguishes the lamp 635 and it removes ground potential from the start conductor C686 thereby to interrupt the previously traced circuit for the start relay R1040 in the translator assigner 1000. If no other director requires the use of a translator, the start relay R1040, which is multiple connected to all of the directors in the system, will now restore to normal. Accordingly, it is immaterial, as far as the translator assigner is concerned, whether or not the start relay R1040 restores to normal at the present time inasmuch as the rotary magnet RM1004 will be automatically controlled to advance the associated wipers to contacts terminating another calling director.

The manner in which the start circuit is bypassed upon the completion of a translation operation is controlled responsive to the restoration of the relay R650. More specifically, the relay R650 upon restoring, at its contacts 651, interrupts the previously traced circuit, including the conductor C684, for the director hold relay R1030. The relay R1030 now restores to normal and, at its contacts 1032, it interrupts the circuit for the translator start relay R1010 which also restores to normal. The relay R1030, at its contacts 1031 interrupts a point in the previously traced series circuit including the translator test relay R1050 and the selected translator relay R1410 in the translator 1300. The relays R1050 and R1410 now restore to normal and the latter relay disconnects the marking ground potential from the associated code marking conductors. The relay R1010 upon restoring, at its contacts 1011, interrupts a point in the previously traced circuit for operating the rotary magnet RM1004 thereby to cause a magnet to restore to normal and advance its wipers one step in a clockwise direction. Inasmuch as the relays R1010 and R1030 have now restored to normal, the contacts 1015 and 1033 remove ground potential from the conductor C1071 thereby to restore the start relay R1380 in the translator 1300.

If no other director is maintaining a starting ground potential on the start conductor C686 the relay R1040 will also restore to normal thereby to condition the translator assigner 1000 to again perform the previously described cycle of operation the next time a calling director requires the use of the translator 1300 and applies a starting ground potential to the conductor C686.

In the event that the translator 1300 has functioned properly to transfer information to the coder 1800 within a predetermined elapsed time interval, which time interval is controlled by the slow-to-operate and slow-to-release characteristics of relays R1010, R1020 and R1060, the relay R1020 will release after the restoration of the start relay R1040 and, if the start relay R1040 is retained operated, the relay R1020 will normally restore after the restoration of the director hold relay R1030. The slow-to-release action of the timer relay R1020 serves as a timing means to prevent excessive holding of the translator assigner 1000 and to automatically give an alarm in the case of irregular calls.

An irregular call is a call in which a director hold relay R1030 is not released prior to the time that the slow-to-release translator timer relay R1020 has restored to normal. Since the time required for passing information from the translator relay R1410 to the coder 1800 is very short, the holding time of the translator assigner 1000 need not exceed the operating releasing time of the relay R1020. More specifically, the relay R1030 must be released prior to the time that relay R1020 restores to normal. If it is assumed that the translator timer relay R1020 restores prior to the time that the relay R1030 is restored, at its contacts 1021 the relay R1020 short-circuits the relay R1030 in order to release the latter relay. The direct ground potential which short-circuits the relay R1030 is also applied by the conductor C684 and causes the operation of the translator failure relay R660. It should be understood, however, that the assigner test relay R650 will be in its operated position at this time due to the fact that the translation has not been completed within the predetermined elapsed time interval described above. Upon operating, the relay R660 locks itself to ground at contact 614 of the release key and it will remain in its operated position until an attendant in the exchange manually actuates the release key. In its operated position the relay R660, at its contacts 661, maintains the director busy relay R610 operated; at its contacts 662, it interrupts the circuit of relay R640 which now restores to normal; at its contacts 663, it connects the busy tone signal conductor C836, by way of the contacts 663, 623 and 775 and the conductor C1136 to the calling subscriber; and, at its contacts 665, it completes a circuit for illuminating the incomplete transmission lamp 609 in order to indicate to the exchange attendant that a fault has occurred in the operation of the director. When the calling subscriber hears the busy tone signal he will replace the telephone receiver upon the switch-hook of his associated telephone instrument thereby to release the incomplete telephone connection. The lamp 609 provides a signal to indicate to the exchange attendant that a trouble condition exists in the particular calling director and when the trouble is cleared the attendant may operate the release key contacts 614 thereby to restore the translation finder relay R660 to normal. In this manner the calling director is locked out of service until the trouble has been cleared and it is again rendered available for further calls.

Continuing again with the description of the normal operation of the translator assigner 1000 whereby the translation is made by the translator 1300 and stored in the coder 1800 within the predetermined elapsed time interval, it will be understood that when the relay R650 in the controller 600 portion of the director restores to normal, at its contacts 652, it removes the ground potential from the selected one of the class conductors C681 to C683, inclusive. In the present call the class 2 test relay R670 is in its operated position and, therefore, the ground potential is removed from the conductor C682. The removal of ground potential from conductor C682 causes the relays R1350 and R1320 in the translator 1300 to restore to normal. The last mentioned relay, at its contacts 1 to 175, inclusive, interrupts the circuits for controlling the various translator relays in the translator 1300 from the code switch 1100. Finally, at its contacts 653, the relay R650 removes ground potential from the conductor C679 thereby to interrupt the previously traced circuit for the translator connector relay R1710. This relay now restores to normal and at its contacts 1 to 34, inclusive, disconnects the coder 1800 portion and the call recorder 2000 portion of the director from the translator 1300.

From the foregoing description of operation, it will be understood that the translator 1300 is assigned to the exclusive use of the calling director for a very short period of time and that the information permanently stored in one of the translator relays is transferred to and registered in the coder 1800. The particular translator relay which has been operated to transfer its stored information was selected in accordance with the first three dialled digits comprising the called office code and in accordance with the class of service of the particular calling subscriber substation.

*Sending of the digits by the director to control the setting of the switches*

It will be recalled that when the translation complete relay R810 operated to indicate that the translation of the called office code digits dialled by the calling subscriber has been completed, it disconnects the translator 1300 from the calling director. As a further result of the operation of relay R810, at its contacts 814, it completes a circuit for operating the start send relay R930. This relay upon operating, at its contacts 932, completes a locking circuit for itself from ground at contacts 758 of the operated seizure relay R750.

The start send relay R930 initiates the operation of the director to transmit pulses corresponding to the routing digits stored in the coder 1800 and pulses corresponding to certain of the digits which have been registered in the code and numerical registers of the call register 1500. Accordingly, the relay R930 upon operating, at its contacts 931, applies the ground potential at the contacts 751 to the conductor C977 extending to Fig. 16. In Fig. 16 the conductor C977 is multiply connected to the contacts 1 to 9, inclusive, in the contact bank accessible to the wiper 1653 of the send sequence switch 1650. This ground potential controls the last mentioned switch in order sequentially to render effective the various operated route digit registers and the office code digit registers in a predetermined order. Consequently, the sender portion of the director may be operated to transmit all of the routing digits and the called office code digits during the time that the calling subscriber dials the remaining four digits of the numerical portion of the called subscriber directory number.

As a further result of the operation of the relay R930, at its contacts 933, it connects battery potential via the resistor 935 and the contacts 868 (as soon as the relay R860 is operated) to the right hand winding of the delay send relay R910. Finally, at its contacts 934, the relay R930 connects ground potential via the contacts 753', the resistor 936 and the contacts 934 to the right hand winding of the relay R910. Consequently, at the present time the ground potential at the contacts 753' is connected in multiple with the left hand and right hand windings of relay R910. The resistance ground through the right hand winding of the relay R910 is further extended by way of the contacts 862 and the conductor C468 to the winding of the line relay (not shown) of the primary selector 500. The line relay now operates and prepares the primary selector 500 to respond to the first routing digit transmitted by the sender portion of the director.

The send sequence switch 1650 has its wipers 1653 to 1658, inclusive, positioned into engagement with the contacts 1 in the associated contact banks at this time due to the fact that the wipers have been advanced from the home contact positions, illustrated in the drawings, in response to the application of ground potential to the conductor C794. More specifically, the ground potential applied to the conductor C794 is extended via the send sequence off-normal contacts 1659', the interrupter contact 1652 and the winding of the magnet RM1651, to battery. Magnet RM1651 operates when this circuit is completed and interrupts its operating circuit, at its contacts 1652, thereby advancing the wipers 1653 to 1658, inclusive, one step in a counterclockwise direction from the home contact positions into engagement with the contacts 1. As soon as the wipers 1653 to 1658, inclusive, are advanced from the home contact positions the send sequence switch off-normal contacts are actuated thereby to interrupt the previously traced circuit for operating the magnet RM1651 at the contacts 1659', and to prepare a point in the release circuit previously described at the contacts 1659. In this manner the send sequence switch 1650 is controlled to advance its wipers from engagement with the home contact positions into engagement with the contacts 1 to select the first route digit register in the coder 1800. With the wipers of the send sequence switch 1650 in this position the ground potential applied to the conductor C977, completes a circuit via the wiper 1653 and the engaged contact 1, the conductor C892 extending to Fig. 8, the contacts 864, the winding of the pulse control relay R870 and the resistor 879, to battery. The relay R870 operates over the above traced circuit and, at its contacts 877, it further extends the ground potential applied to conductor C892 via the contacts 864, 881 and 877, the conductor C895 extending to Fig. 16 and the winding of the magnet RM1661 of the sender switch 1660, to battery. Since the pulse relay R880 is intermittently operated at the rate of ten pulses per second under control of the pulse generator 700, as previously noted, the ground potential applied to the conductor C895 is intermittently interrupted, at the contacts 881, in order to operate and restore the magnet RM1661 of the sender switch 1660 in synchronism with the pulse relay R880.

As a further result of the operation of relay R870, at its contacts 872, it completes a circuit via the contacts 871, the conductor C894 extending to Fig. 16 and the winding of the magnet RM1651, to battery, in order to operate the magnet and condition it to advance its wipers when the circuit is subsequently interrupted. At its contacts 875, the relay R870 completes a circuit for illuminating the send call progress lamp L879 in order to indicate to the exchange attendant that the particular director is transmitting switch controlling impulses. Finally, at its contacts 878, the relay R870 connects ground potential, via the contacts 867 and 882, to the conductor C468. Each time the sender switch magnet RM1661 is operated and restored, in the manner described above, the wipers 1663 to 1667, inclusive, are advanced, step-by-step, in a counterclockwise direction over the associated contact banks. During the advancement of the wipers of the sender switch 1660, the wipers 1665 and 1666 simultaneously test corresponding contacts in the associated contact banks for code marking potentials which are applied to the respective contacts in accordance with the code of the digit registered in the particular registers sequentially selected by the wipers 1655 to 1658, inclusive, of the send sequence switch 1650. Referring to the contacts in the banks associated with the wipers 1665 and 1666, it will be seen that the home contacts and the contacts 1 and 2 are vacant and that the contacts 3 to 12, inclusive, are either directly grounded or they are connected to the WXYZ wipers 1655 to 1658, inclusive, of the send sequence switch 1650. The last mentioned wipers, as they are advanced over their associated contact banks, sequentially connect the WXYZ conductors in the cables C1844 to C1849, inclusive, to the contacts of the sender switch 1660 in a predetermined order. The six groups of code marking conductors WXYZ11 to WXYZ16, inclusive, included in the above mentioned cables terminate respectively in contacts 1 to 6 in the banks associated with the wipers 1655 to 1658, inclusive. The remaining contacts 7 to 13, inclusive, terminate respectively the code marking conductors WXYZ21 to WXYZ27, inclusive. These code marking conductors are respectively connected to the first, second and third code registers 1520, 1530 and 1540 and to the first, second, third and fourth numerical registers 1610, 1620, 1630 and 1640. Consequently, the send sequence switch 1650 may, during successive steps of the associated wipers, connect the various code marking conductors WXYZ11 to WXYZ16, inclusive, and WXYZ21 to WXYZ27, inclusive, to the contact banks accessible to the wipers 1665 and 1666 of the sender switch 1660 in order to determine the numerical value of the particular digit registered in code form in the various registers. When a particular marking of a code digit has been found by the wipers of the sender switch 1660 a corresponding number of numerical pulses will have been transmitted by the sender switch 1660. The sending out of a number of pulses corresponding to the value of the registered digit will be terminated and the sender switch 1660 will automatically advance its wipers, step-by-step, in a rapid manner under control of a self-interrupting circuit and it will also advance its wipers, step-by-step, over the contact positions 14 to 19, inclusive, at the rate of ten impulses per second. Finally, the sender switch 1660 will advance its wipers from the contact position 20 to the home contact positions at a rapid rate under control of the self-interrupting circuit for the magnet RM1661. The slow rate of stepping that occurs during the advancement of the wipers over the contacts 14 to 19, inclusive, provides a digit spacing interval between the transmission of the successive numerical series of pulses constituting successive digits. This interdigital delay is accomplished under the joint control of the sender switch 1660 and a digit space relay R869. After each registered digit has been transmitted by the sender switch 1660, the send sequence switch 1650 is advanced an additional step in order to connect the WXYZ code marking conductors of the next digit register to the bank contacts of the sender switch 1660. In this manner the send sequence switch 1650 and the sender switch 1660 cooperate to transmit numerical pulses corresponding to the routing digits registered in the coder 1800 and corresponding to the digits of the directory number of the called subscriber substation as registered in the call register 1500.

The manner in which the above described operations are performed will now be described. The first time the pulse relay R880 operates, after the operation of the relay R870, it completes the previously traced circuit for operating the rotary magnet RM1661 of the sender switch 1660. The magnet RM1661 operates to prepare the advancement of the wipers from engagement with the home contacts into engagement with the contacts 1 in the associated contact banks. At the end of the first pulse, that is when the relay R880 restores to normal, the contacts 881 are opened thereby to interrupt the circuit for the magnet RM1661, which magnet now restores to normal and advances the wipers 1663 to 1667, inclusive, into engagement with the contacts 1 in the associated contact banks.

The next operation of the pulse relay R880 reoperates the magnet RM1661 and at the end of the pulse, that is when the relay R880 restores, the magnet RM1661 restores to normal and advances its wipers into engagement with the contacts 2 in the associated contact banks. During the time that the wiper 1663 is in engagement with the home contact and the contact 1, pulses are not transmitted over the conductor C468 to the primary selector 500, due to the fact that a short-circuit is placed around pulsing contacts 882. This short-circuit includes the conductor C899, the wiper 1663, the conductor C975 (multiply connected to the home contact, the contact 1 and the contacts 13 to 24, inclusive), and the contacts 882. In other words, when ever the wiper 1663 of the sender switch 1660 is in engagement with any one of the above enumerated contacts the direct ground potential at contacts 878 is connected over the above traced circuit to the conductor C468 extending to the primary selector 500 and it prevents the interruptions of the pulsing circuit at contacts 882 from being effective to control the line relay in the primary selector 500.

The next time the pulse relay R880 operates, after the wiper 1663 is in engagement with the contact 2, a pulse is transmitted, at the contacts 882, over the conductor C468 to the primary selector 500, at the same time that a pulse is transmitted, at the contacts 881, over the conductor C895 to the magnet RM1661. When the pulse relay R880 restores, the pulse transmitted over the conductor C468 is terminated and the pulse transmitted over the conductor C895 is terminated. The pulse transmitted over the conductor C468 controls the line relay in the primary selector 500 in the manner to be described hereinafter and the pulse transmitted over the conductor C895 controls the sender switch 1660, in the manner previously described, to advance its wipers into engagement with the contacts 3. Accordingly, the number of steps taken by the wipers of the sender switch 1660 after contact 2 has been reached, corresponds to the number of pulses transmitted by the pulse relay R880 over the pulsing conductor C468 to the primary selector 500. As soon as the wipers 1665 and 1666 engage contacts 3 in the associated contact banks the testing is started to determine the value of the digit that has been registered in the particular register that is selected by the send sequence switch 1650.

In the present example it has been assumed that the routing digit 4 has been registered in the first route digit register of the coder 1800. Therefore, the X11 and Y11 relays R1802 and R1803 have been operated and locked to the locking ground conductor C787. This locking ground potential is also extended via the X11 and Y11 code marking conductors in the cable 1844 to the contacts 1 engaged by the X wiper 1656 and the Y wiper 1657 of the send sequence switch 1650. The W11 and Z11 conductors in the cable 1844 terminate respectively in the contacts 1 engaged by the W wiper 1655 and the Z wiper 1658. However, the last mentioned two conductors are not marked with ground potential inasmuch as the corresponding register relays R1801 and R1804 have not been operated. Since the digit 4 has been registered in the first route register, as noted above, it is essential that four pulses be transmitted over the conductor C468 to the primary selector 500 and over the conductor C895 to the sender switch 1660. When the wipers 1665 and 1666 engage contacts 6 the test circuit should be completed for terminating the transmission of impulses to the primary selector 500.

Accordingly, at the end of the fourth pulse transmitted over the conductors C468 and C895 the wipers of the sender switch 1650 will be in engagement with the contacts 6 in the associated contact banks. As soon as this position is reached the ground potential applied to the X wiper 1656 is extended via the wiper 1665, the conductor C976 extending to Fig. 9 and the right hand winding of the digit stop relay, to battery. The right hand winding of the digit stop relay R920 will be energized when the above traced circuit is completed. It should be noted, however, that this relay is so constructed and arranged that it will not operate its associated contacts 921 unless the two windings of the relay are simultaneously energized. In the present example, the left hand winding of the digit stop relay R920 will be simultaneously energized with the right hand winding thereof because the ground potential applied to the Y wiper 1557 is extended via the wiper 1666, the conductor C974 and the left hand winding of the digit stop relay R920, to battery. The digit stop relay R920 now operates and, at its contacts 921, it completes a circuit for operating the digit space relay R860. The last mentioned relay, at its contacts 865, completes a locking circuit for itself, which is independent of its initial operating circuit, by way of the conductor 890, the wiper 1664 and any one of the contacts 1 to 24, inclusive, of the sender switch 1660, the conductor C788 extending to Fig. 7 and grounded contacts 751 of the operated seizure relay R750.

From the foregoing it will be understood that when the digit space relay R860 is operated, in response to the completion of the transmission of the number of pulses corresponding to the value of the registered digit, it remains in its operated position until the wiper 1664 of the sender switch 1660 returns to its home contact position. As a further result of the operation of the digit space relay R860, at its contacts 866, it places a short-circuit around the pulsing contacts 882 in order to prevent further transmission of pulses over the conductor C468 via the pulsing contacts 882. Also, at its contacts 868, the relay R860 prepares a point in a test circuit including the right hand winding of the delay send relay R910. The last mentioned relay is provided to prevent the transmission of the pulses of the next digit over the conductor C468 in the event that the next pulse receiving switch in the switch train over which the connection is to be set up is not in condition to receive the pulses. The operation of the delay send relay R910 is controlled by the application of direct ground potential to the conductor C468 by the primary selector 500 or any succeeding switch in the switch train. If relay R910 is operated, it completes, at its contacts 911, an independent locking circuit for the digit space relay R860 and the latter relay in its operated condition prevents transmission of pulses of the next digit until it is restored to normal. However, as soon as the next switch in the switch train is in condition to receive the pulses of the next digit, the ground potential is removed from the conductor C468 thereby restoring the delay send relay R910 to normal.

For the purpose of this description, it will be assumed that the delay send relay R910 is not operated. As a further result of the operation of relay R860, at its contacts 864, it interrupts the circuit for the pulse control relay R870 which restores to normal. At its contacts 863, the relay R860 prepares an alternate circuit, including the conductor C893, for reoperating the pulse control relay R870 at a predetermined time during the automatic stepping of the sender switch 1660; at its contacts 867, it removes the direct ground potential, at contacts 876, from the pulsing conductor C468; and, at its contacts 866, it connects the resistance ground potential via the resistor 936, contacts 934, the right hand winding of the delay send relay R910 and the contacts 866 to the conductor C468. At this instant a resistance battery potential is connected to the conductor C468 via the resistor 935, contacts 933 and 868, the right hand winding of the delay send relay R910 and the contacts 866. The two test potentials, that is the resistance ground potential and the resistance battery potential, are now applied to the conductor C468. The former provides a holding potential for the line relay (not shown) in the primary selector 500 or in any subsequent switch in the switch train and the resistance battery potential provides the circuit for the delay send relay R910 which is completed in the event the next switch in the switch train is not in condition to receive the pulses of the next digit to be transmitted by the director.

When the relay R870 restores to normal, at its contacts 872, it opens an additional point in the circuit for the magnet RM1651 thereby to restore the magnet and advance the wipers 1653 to 1658, inclusive, from engagement with the contacts 1 into engagement with the contacts 2 in the associated contact banks. Also, at its contacts 871 and 873, the relay R870 completes points in the circuits for controlling the magnet RM1661 of the sender switch 1660 so that the last mentioned magnet will automatically advance its wipers at a high rate of speed from the contacts included in the circuits over which the digit stop relay R920 was operated to the contacts 14 in the associated contact banks. The circuit for self-interruptedly operating the sender switch magnet RM1661 may be traced from ground at the wiper 1667, the engaged contact 6 in the associated contact bank, the conductor C898 extending to Fig. 8, the contacts 871, the conductor C897 extending to Fig. 16, the contact 1662 and the winding of the magnet RM1661, to battery. When this circuit is completed, the magnet RM1661 operates and when it has fully operated, the contacts 1662 are opened, thereby to cause the magnet to restore to normal and advance its wipers 1663 to 1667, inclusive, an additional step in a counterclockwise direction from engagement with the contacts 6 into engagement with the contacts 7 in the associated contact banks. The above mentioned cycle of operation is completed after each step of the wiper 1667 and consequently the self-interrupting circuit causes the wipers to be advanced, step-by-step, over the contacts 6 to 12, inclusive, into engagement with the contacts 13 in the associated contact banks. In this position the ground potential, applied to the conductor C1667, is connected via the conductor C896 extending to Fig. 8, the contacts 873 and 871 and the conductor C897 in order to reoperate the magnet RM1661. The magnet RM1661 operates and restores, in the manner previously described, and advances its wipers into engagement with the contacts 14 in the associated contact banks.

At this point the circuit for stepping the wipers of the sender switch 1660 is transferred from the self-interrupting circuit which causes the wipers to be advanced at a rapid rate to a circuit which advances the wipers, step-by-step, at the rate of ten steps per second. The circuit for stepping the wipers at the rate of ten steps per second is under control of the pulse relay R880 and provides the interdigital pause between the transmission of successive series of pulse trains. Consequently, when the wiper 1667 engages the contact 14 in its associated contact bank, ground potential is extended over the conductor C893 extending to Fig. 8, the contacts 863, the winding of the pulse control relay R870 and the resistor 879, to battery. The relay R870 reoperates when the above traced circuit is completed and, at its contacts 877, it recompletes the circuit for pulsing the rotary magnet RM1661 under control of the contacts 881 of the pulse relay R880. Each time the pulse relay R880 operates the previously traced circuit is again completed for controlling the magnet RM1661. Each time the magnet RM1661 is operated and restored, under control of the pulse relay R880, it advances its wipers, step-by-step, from the contacts 14 to the contacts 20 in the associated contact banks. In other words, the stepping circuit for the magnet RM1661 is controlled by the pulse relay R880 during the time the wipers of the sender switch 1660 are advanced over the contacts 14 to 19, inclusive. As soon as the wiper 1667 advances from the contact 19 into engagement with the contacts 20, the circuit for the pulse control relay R870 is again interrupted. The relay R870 now restores to normal and it interrupts the previously described pulsing circuit for directively controlling the magnet RM1661 under control of the pulse relay R880. As soon as the wiper 1667 engages in contact 20 the previously traced self-interrupting circuit for the magnet RM1661 is recompleted and the magnet RM1661 self-interruptedly advances its wipers over the contacts 20 to 24, inclusive. As soon as the wiper 1664 again engages the home contact in the associated contact bank, the locking ground potential applied to the conductor C788 is removed from the conductor C890 in order to restore the digit space relay R860 to normal. The restoration of the digit space relay R860 again conditions the various circuits in the controller 600 portion of the director to transmit pulses corresponding to the second routing digit stored in the second route digit register of the coder 1800.

In view of the foregoing description of operation of sending out the first route digit registered in the coder 1800, it will be understood that the sender switch 1660 is first controlled to advance its wipers, step-by-step, over the contacts of the associated contact banks to transmit a number of pulses corresponding to the digit registered in the register selected by the send sequence switch 1650 and then to automatically advance the wipers back to the home contact positions in the associated contact banks. The automatic advancement of the wipers back to the home contact position is accomplished by first advancing the wipers at a rapid rate, then advancing them at a rate of ten steps per second, in order to provide the interdigital pause, and, finally, advancing the wipers at a rapid rate to the home contact position. When the digit space relay R860 restores to normal at the end of the above described cycle of operation, the circuits are reconditioned to repeat the cycle of operation in order to transmit the second route digit registered in the WXYZ12 register relays R1805 to R1808, inclusive, in the coder 1800.

It will be recalled that after the sender switch 1660 found the contacts in the associated contact banks which were marked in accordance with the code markings of the first route digit 4, the digit space relay operated and interrupted, at its contacts 861, the circuit for the magnet RM1651. The magnet RM1651 restored to normal and advanced the wipers of the send sequence switch 1650 an additional step in the counterclockwise direction into engagement with the contacts 2. When the wiper 1654 engages the contact 2, ground potential is applied to the conductor C1832 and then by way of the left hand break contacts of each of the WXYZ12 relays R1805 to R1808, inclusive, the skip common conductor C1831 extending to Fig. 16, the interrupter contacts 1652 and the winding of the rotary magnet RM1651, to battery. The above mentioned circuit for controlling the magnet RM1651 is completed only in the event that a digit has not been registered in the second route digit register of the coder 1800. If no digit is registered, the magnet RM1651 automatically advances the wipers an additional step into engagement with the contacts 3. A similar circuit is now completed via the wiper 1654, the conductor C1833 and the corresponding contacts of the third route digit register relays of the coder 1800 for again controlling the magnet RM1651 if no digit is registered in the third route digit register. The above described circuit is provided for the second, third, fourth, fifth and sixth WXYZ12 to WXYZ16 route digit register relays and if no digits are registered in these route digit registers, the wiper 1654 causes the magnet RM1651 of the sequence switch 1650 to automatically advance the wipers, step-by-step, over the contacts 2 to 6, inclusive. In the present example, however, the digit 8 has been registered in the second route digit register of the coder 1800 and accordingly, the X12 relay R1806 is in its operated position. Since the last mentioned relay is in its operated position, the above described circuit, including the conductor C1832, is interrupted and prevents the send sequence switch 1650 from advancing its wipers at the present time. With the X12 relay R1806 in its operated position, the ground potential applied to the locking ground conductor C787 is extended via the left hand inner make contacts of the relay R1806 to the winding thereof in order to lock the relay in its position and via the X12 conductor in the cable C1845 to the contact 2 engaged by the X wiper 1656 of the send sequence switch 1650.

With the wiper 1653 in engagement with the contact 2, ground potential, applied to the conductor C977, is connected via the conductor C892 to recomplete the previously traced circuit for operating the pulse control relay R870. The relay R870 provides the pulsing ground for controlling the magnet RM1661 of the sender switch 1660 to advance its wipers 1663 to 1667, inclusive, step-by-step, to search for the WXYZ wipers 1655 to 1658, inclusive, having a code marking ground potential applied thereto corresponding to the digit stored in the second route digit register of the coder 1800. The operations of the sender switch 1660, the pulse control relay R870 and the pulse relay R880 are the same as has been previously described and it will be understood that when the wiper 1665 engages the contact 10 in the associated contact bank, the ground potential applied to the X wiper 1656 is connected to the conductor C976 in order to energize the right hand winding of the digit stop relay R920. Simultaneously therewith, the ground potential applied directly to the contact 10 engaged by the wiper 1666 is connected to the conductor C974 in order to energize the left hand winding of the digit stop relay R920. When the two circuits described above are simultaneously completed, the relay R920 operates and, at its contacts 921, recompletes the previously traced circuit for operating the digit space relay R860 which locks itself in its operated position to the grounded conductor C899.

As the wipers 1665 and 1666 are advanced, step-by-step, from the contacts 2 to the contacts 10, eight switch controlling pulses are transmitted over the conductor C468 by the pulse relay R880 in order to control the setting of the next switch in the switch train in accordance with the second routing digit 8. During the stepping of the wipers 1665 and 1666 over the contacts 2 to 10, inclusive, individual circuits may be completed at different times for either the right hand or the left hand windings of the digit stop relay R920 but it is not until the wipers reach contacts 10 that circuits are completed for simultaneously energizing both windings of the digit stop relay R920 in order to terminate transmission of pulses over the conductor C468.

The operations which now take place are substantially the same as those previously described whereby the sender switch magnet RM1661 is controlled to advance its wipers, step-by-step, to the contacts 14 at a rapid rate; to advance its wipers, step-by-step, at the rate of ten steps per second over the contacts 14 to 19, inclusive; and to advance its wipers, step-by-step, at a rapid rate over the contacts 20 to 24, inclusive, and into engagement with the home contact positions. In this manner the sender switch 1660 completes the second cycle of operation whereby the second route digit 8 registered in the X12 register relay R1806 is transmitted to the next switch in the switch train and whereby an interdigital pause is provided after the transmission of the second routing digit 8.

Since no additional route digits have been registered in the third, fourth, fifth and sixth route digit registers, WXYZ13 to WXYZ16, inclusive, in the coder 1800, the previously described chain circuits, including the left hand break contacts of each of the route digit register relays (not shown), are completed so that the skip conductor C1831 is successively grounded as the wiper 1654 of the send sequence switch 1650 is advanced, step-by-step, over the contacts 3, 4, 5 and 6 terminating the conductors C1833, C1834, C1835 and C1836. The circuit operations whereby the wipers 1653 to 1658, inclusive, are advanced, step-by-step, over the contacts 3 to 6, inclusive, have been described above but it may be well to mention at this time that the self-interrupting circuit is started as soon as the digit space relay R860 operates and is terminated before the wipers of the send switch 1660 have been returned to the home contact positions.

The operations which now take place depend upon the operated conditions of the TA, TB, TC and TD control relays R1890, R1885, R1880 and R1875. It will be recalled that one or more of these relays may be operated to register certain controlling information in accordance with the operation of the selected translator relay, such as the relay R1410, in the translator 1300. In the present example the TB control relay R1885 has been operated in response to the operation of the translator relay R1410 and it is locked in its operated position to the locking ground conductor C787. Referring now to Fig. 18, it will be seen that the conductors C1837, C1838 and C1839 may be connected to the skip conductor C1831 depending upon the operated or restored positions of the TA and TB relays R1890 and R1885. Since the TB control relay R1885 is in its operated position in the present call, it disconnects, at its contacts 1887, the conductor C1839 from the skip conductor C1831 and since the TA control relay R1890 is in its restored position the conductors C1837 and C1838 remain connected to the skip conductor C1831 by way of the contacts 1894 and 1893 respectively. Accordingly, when the wiper 1654 of the send sequence switch 1650 engages the contact 7, it applies ground potential by way of the conductor C1837 and the contacts 1894 to the skip conductor C1831 in order to again complete the self-interrupting circuit for the magnet RM1651 of the send sequence switch 1650. The rotary magnet RM1651 advances its wipers from engagement with the contact 7 into engagement with the contacts 8. In this manner the send sequence switch 1650 will automatically step its wipers 1655 to 1658, inclusive, over the contacts terminating the WXYZ21 code marking conductors which have been marked in code form in accordance with the digit registered in the first code register 1520.

The wiper 1654 now applies ground potential via the conductor C1838 and the contacts 1893 to the skip conductor C1831 whereby the magnet RM1651 is again operated to advance its wipers from engagement with the contacts 8 into engagement with the contacts 9. In this manner the send sequence switch 1650 skips the digit registered in the second code register 1530 and marked in code form on the WXYZ22 conductors terminating in the contacts 8 accessible to the wipers 1655 to 1658, inclusive. The ground potential at the wiper 1654 is now applied via the engaged contact 9 to the conductor C1839. However, this ground potential is not applied to the skip conductor C1831 inasmuch as the circuit is opened at the contacts 1887 of the operated TB control relay R1885. In other words the operation of the TB control relay R1885 has determined that the send sequence switch 1650 should skip first and second code registers 1520 and 1530 and that the sender switch 1660 should send out the digit registered in the third code register 1540 and marked in code form on the WXYZ23 code marking conductors.

The advancement of the wipers of the send sequence switch 1650 from the contacts 2 to the contacts 9 and the tests performed over the corresponding contacts of the wiper 1654 are all completed during the interdigital pause which is provided after the transmission of the second route digit 8. Consequently, when the wipers of the sender switch 1660 have completed the second cycle of operation and returned to engage the home contact positions, the locking ground potential applied to the conductor C890, during the rotation of the wiper 1664, is removed therefrom and again causes the restoration of the digit space relay R860.

In response to the restoration of the digit space relay R860 the contacts 864 are again closed to recomplete the previously described circuit for operating the pulse control relay R870. The digit pulse relay R870 upon operating again initiates the cycle of operation whereby the sender switch 1660 advances its wipers over the associated bank contacts to transmit pulses in accordance with the value of the digit stored in the third code register 1540. In the present example it has been assumed that the digit 1 has been registered in the third code register 1540 and consequently the wipers 1544 and 1545 are in engagement with the contacts 1 in the associated contact banks. These wipers mark the code marking conductors WXYZ23 in accordance with the digit 1 by applying a direct ground potential to the W23 and X23 conductors. The conductors WXYZ23 terminate respectively at contacts 9 engaged respectively by the WXYZ wipers 1655 to 1658, inclusive. Therefore, when the wipers 1665 and 1666 of the sender switch 1660 engage contacts 3, the ground potential applied to the W23 and X23 code marking conductors are extended via the W and X wipers 1655 and 1656, the wipers 1665 and 1666, the conductors C976 and C974 and the right hand and the left hand windings of the digit stop relay R920, to battery. The relay R920 reoperates and, at its contacts 921, recompletes the circuit for reoperating the digit space relay R860 which relay locks itself in its operated position to the grounded conductor C890. During the stepping of the wipers of the sender switch 1660 from contacts 2 to contacts 3 one pulse, constituting the digit 1, is transmitted over the conductor C468 to the next pulse receiving switch in the switch train, under control of the pulse relay R880.

The digit space relay R860, upon operating again, interrupts the circuit of the magnet RM1651, at its contacts 861, thereby to cause the wipers of the sender switch 1650 to be advanced from engagement with the contacts 9 into engagement with the contacts 10. The pulse control relay R870 again restores to normal thereby to control the sender switch 1660 to advance its wipers, in the manner previously described, to the home contact positions. As soon as the wipers of the sender switch 1660 are again returned to the home contact positions the digit space relay R860 is again restored to normal and the circuit for operating the pulse control relay R870 is again prepared at the contacts 864.

Since the relay R870 must operate to initiate the subsequent cycle of operation of the sender switch 1660, circuits have been provided whereby a test is made to determine whether or not the sender switch 1660 has reached a point in the sending out of digits registered in the call register 1500, which corresponds to a numerical register which is being operated under control of the calling subscriber dial. In other words, if the calling subscriber should register the first three code digits of the called office code portion of a called subscriber number and should then delay in transmitting the thousands digit, that is the first numerical digit, of the numerical portion of the called subscriber number, it is possible for the sender switch 1660 to transmit all of the registered route digits and all of the registered code digits in the code registers 1520, 1530 and 1540, before the first numerical digit has been registered in the numerical register 1610. When this condition exists the send sequence switch 1650 will prevent the operation of the pulse control relay R870 until after the subscriber has dialled and registered in the first numerical register 1610 the thousands digit of the called subscriber directory number. It may be well to mention, however, that if the subscriber delays dialling of any of the digits of the called subscriber directory number for more than a predetermined time interval, the director is arranged to automatically time out and disconnect itself from the calling subscriber line.

In order to indicate to the controller 600 portion of the director when the first numerical digit has been registered in the first numerical register 1610, the relay R940 has been provided. This relay is operated only in the event that the subscriber has dialled the thousands digit of the called number and the digit has been registered in the first numerical register 1610. During the time the subscriber dials the first numerical digit, the receive sequence switch 1510 has its wipers in engagement with the contacts 3 in the associated contact banks. And at the end of the digit the receive sequence switch 1510 advances its wipers from engagement with the contacts 3 into engagement with contacts 4, in order to prepare circuits for registering the hundreds digit of the called number in the second numerical register 1620. As soon as the wiper 1515 of the receive sequence switch 1510 engages contact 4, a circuit is completed for operating the first numerical send relay R940. This circuit may be traced from ground at contacts 757, conductor C794', wiper 1515 and the engaged contact 4, conductor C979 and the winding of relay R940, to battery. The relay R940 upon operating, at its contacts 942, completes a locking circuit for itself from ground at contacts 754. With this arrangement, the first numerical send relay R940 is operated as soon as the receive sequence switch 1510 has prepared circuits for registering the second numerical digit of the called subscriber directory number in the second numerical register 1620 and, in its operated condition, it indicates to the controller 600 portion of the director that pulses corresponding to the registered first numerical digit may now be transmitted. This indication is given by the relay R940 by operating the relay R870 over a circuit which may be traced from ground at the contacts 751, the contacts 941, the conductor C978, the contact 10 engaged by the wiper 1653, the conductor C892, the contacts 864, the winding of the pulse relay R870 and the resistor 879, to battery. In other words, the last mentioned circuit permits the director to transmit pulses corresponding to the digit registered in the first numerical register 1610.

Before proceeding with the description of operation whereby the digit registered in the first numerical register 1610 is transmitted, it should be noted at this time that the second numerical send relay R950, the third numerical send relay R960 and the fourth numerical send relay R990 are successively operated, over circuits similar to the circuit described above for operating the first numerical send relay R940, as the digits are successively registered in the second, third and fourth numerical registers 1620, 1630 and 1640. The relays R950, R960 and R990 are successively operated as the wiper 1515 successively engages contacts 5, 6 and 7 in the associated contact banks. At the contacts 951, 961 and 991, the conductors C980, C982 and C985, terminating in the contacts 11, 12 and 13 associated with the wiper 1653, are successively grounded as the respective relays are successively operated in response to the registration of the corresponding second, third and fourth numerical digits.

When the pulse control relay R870 operates over the circuit including the wiper 1653 and the engaged contact 10, as previously noted, the WXYZ wipers 1655 to 1658, inclusive, will be in engagement with the contacts 10 terminating the code marking conductors WXYZ24, which conductors are marked in code form in accordance with the first numerical digit registered in the first numerical register 1610. Incident to the engagement of the contact 10 by the wiper 1654, ground potential is applied to the conductor C1840 extending to Fig. 18 in order to determine whether or not the send sequence switch 1650 should skip the digit registered in the first numerical register 1610. The circuit including the conductor C1840, however, is open at the contacts 1876 due to the fact that the TD control relay R1875 is in its normal unoperated position. Accordingly, the digit registered in the first numerical register 1610 will now be transmitted by the director.

Upon operating the pulse control relay R870 again initiates the cycle of operation of the sender switch 1660 whereby a number of pulses corresponding to the value of the digit registered in the first numerical register 1610 is transmitted by the pulse relay R880 over the conductor C468 to the next pulse receiving switch included in the switch train over which the connection has thus far been extended. When the number of pulses transmitted corresponds to the digit registered, the previously described test circuit, including the WXYZ wipers 1655 to 1658, inclusive, the wipers 1665 and 1666 and the two windings of the digit stop relay R920, is completed whereby the digit space relay R860 is again operated to terminate the transmission of pulses over the conductor C468. The digit space relay R860 upon operating causes the send sequence switch 1650 to advance its wipers into engagement with the contacts 11; it restores the pulse control relay R870 to normal; and it locks itself under control of the wiper 1664 of the sender switch 1660. The sender switch 1660 is now controlled, in the manner previously described, to introduce the interdigital pause and to return its wipers into engagement with the home contact positions.

If it is assumed that the remaining three digits, dialled by the calling subscriber, have been registered in the second, third and fourth numerical registers 1620, 1630 and 1640, the digits registered and marked in code form on the respective WXYZ25, WXYZ26 and WXYZ27 code marking conductors terminating respectively in the contacts 11, 12 and 13 associated with the WXYZ wipers 1655 to 1658, inclusive. Consequently, the send sequence switch 1650 and the sender switch 1660 will cyclically operate, in the manner previously described, to transmit pulses corresponding to the registered digits over the conductor C468. The pulses transmitted over the conductor C468 will control the subsequent switches in the switch train and thus complete the connection to the desired called subscriber line. It may be well to mention at this time, however, that under certain conditions the sender switch 1660 will delay the transmission of the pulses constituting the last two digits of a called subscriber directory number. For example, in the event that the call recorder 2000 (Fig. 5) has not performed all of its operations, as described in the previously mentioned Ostline application, at the time the sender switch 1660 is ready to transmit the last two digits of the called subscriber number, the sender switch 1660 will be prevented from operating until all of the operations have been performed by the call recorder 2000. Referring now to Fig. 9, it will be noted that the terminals shown below the relays R960 and R990 are normally jumpered to connect the contacts 961 and 991 to the conductors C972 and C986 extending to the call recorder 2000. The conductors will be grounded by the call recorder 2000 only in the event that the various operations thereof have been completed in the manner explained in the above mentioned Ostline application. Furthermore, if the telephone system does not require the use of a call recorder for toll ticketing purposes, the terminals noted are jumpered to the grounded terminals and thus provide the ground potential at the contacts 961 and 991 for controlling the pulse control relay R870 in the manner previously explained.

After the sender switch 1660 has transmitted the last digit registered in the fourth numerical register 1640, the magnet RM1651 of the send sequence switch 1650 is operated, in the manner previously described, to advance its wipers from engagement with the contacts 13 into engagement with the contacts 14. When the wiper 1654 engages the contact 14, it applies ground potential via the conductor C887 and the upper winding of the director release relay R780, to battery. The director release relay R780 operates over this circuit and locks itself to ground at contacts 758. As a further result of the operation of the director release relay R780, the director is disconnected from the primary selector 500 and the calling subscriber line is connected via the operated switches in the switch train to the called subscriber line.

The foregoing description of operation of the director occurs as a result of the registration of the called subscriber directory number in the call register 1500 and it should be understood that during the time that the director is controlling the various switches in the switch train to complete the connection between the calling and called subscriber lines, the call recorder 2000 and the detector 1900, schematically illustrated in Fig. 5 will operate to identify the directory number of the calling subscriber substation and to transmit various items of record information pertaining to the connection, including the calling subscriber directory number, the called subscriber directory number, the rate of charge for the call, the class of service of the calling subscriber line and the identification of the particular director involved in the connection, to the toll ticket repeater 2300 all in the manner described in detail in the previously mentioned Ostline application. The toll ticket repeater 2300 is included in the connection established to the called subscriber line under control of the director in the manner described hereinafter.

In the previous description of the operation of the director, it was pointed out that the routing digits 4 and 8, followed by the last five digits 1-1234 of the called subscriber directory number, were transmitted to set up the connection to the called subscriber line. Referring now to Fig. 5, it should be understood that the first route digit 4 controls the primary selector 500 to raise its wipers to a position opposite the fourth level and to automatically search for an idle toll ticket repeater, such as the toll ticket repeater 2300. If it is assumed that the toll ticket repeater 2300 is selected by the primary selector 500, the ticket repeater selector 2700, individually associated with the repeater 2300, will respond to the second routing digit 8 transmitted by the director to raise its wipers to a position opposite the eighth level of its associated banks. The wipers of the ticket repeater selector 2700 automatically rotate over the contacts in the eighth level to search for and seize an idle repeater, such as the repeater 305, terminating a two-way trunk to the EMpire 1 exchange. The remaining digits 1-1234 of the called subscriber directory number are transmitted by the director and repeated by the repeater 305 over the trunk line 335 to the EMpire 1 exchange. In Fig. 2, the interconnecting trunk line 335 terminates in the repeater 290 which repeats the above mentioned digits in the order in which they are received. The digit 1 controls the incoming toll selector 205 in the EMpire 1 exchange to raise the wipers to the first level of its associated contact banks and to search for an idle selector, such as the selector 210. The selector 210, the selector 215 and the connector 220 will successively respond to the last four digits 1234 of the called subscriber directory number and complete the connection to the called subscriber at substation TR1, whose directory number is EMpire 1-1234.

The toll ticket repeater 2300 is included in the connection to store various items of record information pertaining to the connection, to establish the elapsed time of the conversational connection between the calling and called subscribers and to transfer the various items of record information to the tabulator 2800 after the connection has been released by the subscribers. The tabulator 2800 in turn, in conjunction with the date and time unit U2953, controls the ticket tape punch mechanism 2968 and the record tape punch mechanism 2967 in accordance with the various items of record information whereby a ticket tape is produced containing the various items of information transmitted to the ticket tape punch and a record tape is produced containing the various items of information transmitted to the record tape punch. The operations of the above named apparatus is described in detail in the previously mentioned Ostline application.

However, it may be well to point out that as soon as the toll ticket repeater 2300 is selected by the primary selector 500, a battery potential is applied to one of the conductors of the connection to signal the call recorder 2000 that the code sending operation may take place whereby the call recorder 2000 transfers the various items of record information, including the calling subscriber directory number and the called subscriber directory number, to the toll ticket repeater 2300. This battery potential is transmitted to the call recorder 2000 via the primary selector 500, the director hunter 450, the conductor C469 in the cable 301 extending to Fig. 8, the conductor C885 extending to Fig. 5 and then to a code send relay (not shown) in the call recorder 2000. The call recorder 2000 now begins to transmit, in code form, the items of record information, previously noted, to the toll ticket repeater 2300 and simultaneous therewith the director continues to transmit numerical pulses to complete the connection to the called subscriber line in the manner previously explained.

Generally stated, the various items of information are transmitted to the toll ticket repeater 2300 in the following order. The first item transmitted is a two digit number identifying the particular director being utilized in the connection. These two digits are permanently wired on a terminal block in the call recorder 2000 and the tens and units digits thereof are successively transmitted, in code form, and registered in the ticket repeater 2300.

The next item of information transmitted is indicative of the class of service of the calling subscriber involved in the telephone connection. The class of service of the calling subscriber substation is indicated to the call recorder 2000 in accordance with the operated or non-operated position of the class 2 test relay R670 in the controller 600 portion of the director. If a class 2 subscriber has initiated the call, the class 2 relay R670 will be operated and a ground potential will be applied via the contacts 672 to the conductor C708 extending to Fig. 5. If the class 1 subscriber initiated the call, the relay R670 will be in its restored position and the conductor C708 will not be grounded. Depending upon the non-grounded or grounded condition of the conductor C708 the call recorder 2000 transmits a signal to the ticket repeater 2300 to indicate that a class 1 or a class 2 subscriber originated the call in progress. Since the call recorder 2000 is not utilized in conjunction with calls from class 3 calling paystation lines, no indication is made of such calls.

The next item of information transmitted by the call recorder 2000 is the units digit of the rate of charge for the particular call. The units digit of the rate of charge for the particular call has been registered, as previously noted, on the WXYZ17 register relays R1825 to R1828, inclusive, in the coder 1800 under control of the translator 1300. In the present example, it was assumed that the units digit 1 of the rate 01 was registered and, consequently, the W17 and X17 relays R1825 and R1826 are operated. These relays are also locked in their operated positions to the locking ground conductor C787 and, at their left hand make contacts, they apply the locking ground potential to the W17 and X17 conductors in the cable C1850 extending to the call recorder 2000. The ground potentials applied to the above named conductors control the call recorder 2000 to transmit, in code form, the units digit 1 of the rate 01 to the repeater 2300.

The next three items of information transmitted by the call recorder 2000 are the three called office code digits registered respectively on the first, second and third code registers 1520, 1530 and 1540 of the call register 1500. In the present example, it was assumed that the digits 361 were respectively registered in the above named three code registers and that the WXYZ21, WXYZ22 and WXYZ23 code marking conductors were respectively marked, in code form, in accordance therewith. The three sets of WXYZ code marking conductors are connected respectively to the contacts 7, 8 and 9 accessible to the wipers 1655 to 1658, inclusive, of the send sequence switch 1650 and they are also multiply connected, via the cable C2012, to the call recorder 2000. Accordingly, the call recorder 2000 will transmit, in code form, the called office code digits 361 to the toll ticket repeater 2300.

The next item of information transmitted by the call recorder 2000 indicates to the repeater 2300 whether or not the called subscriber directory number includes six or seven digits. The item of information relating to the number of digits in a called subscriber directory number is permanently wired in the translator relay corresponding to the three digits registered in the first, second and third code registers 1520, 1530 and 1540 of the call register 1500. In the present example, the translator relay R1410 was selected in response to the registration of the called office code digits 361 and the class of service of the calling line. As a result of the operation of translator relay R1410, the TB control relay R1885 in the coder 1800 was operated. If the called office code digits registered in the call register 1500 identified an office in which the directory numbers include only six digits, instead of the usual seven digits, then the selected translator relay would cause the operation of the TC control relay R1880 and any one of the other control relays in the coder 1800, depending upon the control operations required in the director to complete the connection. The TC control relay R1880 is provided with contacts 1882 which ground the conductor C2167 extending to the call recorder 2000 (Fig. 5). If this conductor is grounded by the operation of the TC control relay R1880, the call recorder 2000 will transmit a signal to the repeater 2300 to indicate that the particular called subscriber directory member is a six digit number having a two digit called office code. Since the call being described is extended to a subscriber having a seven digit directory number, the TC control relay R1880 is not operated and the conductor C2167 is not grounded. Accordingly, the call recorder 2000 will control the repeater 2300 to indicate a seven digit directory number having a three digit called office code.

The next item of information which is transmitted to the toll ticket repeater 2300 indicates whether or not the associated detector 1900 has successfully identified the directory number of the calling subscriber substation. If the detector fails to identify the substation number of the calling subscriber a detector failure signal is transmitted by the call recorder 2000 to the toll ticket repeater 2300 and this signal, when registered in the repeater 2300, causes a signal to be given to an intercepting operator who may monitor the particular connection and obtain the substation number from the calling subscriber. However, if the associated detector 1900 functions properly to identify the calling subscriber directory number, the detector failure signal will be omitted and the signal will not be given to the intercepting operator.

Figure 17:
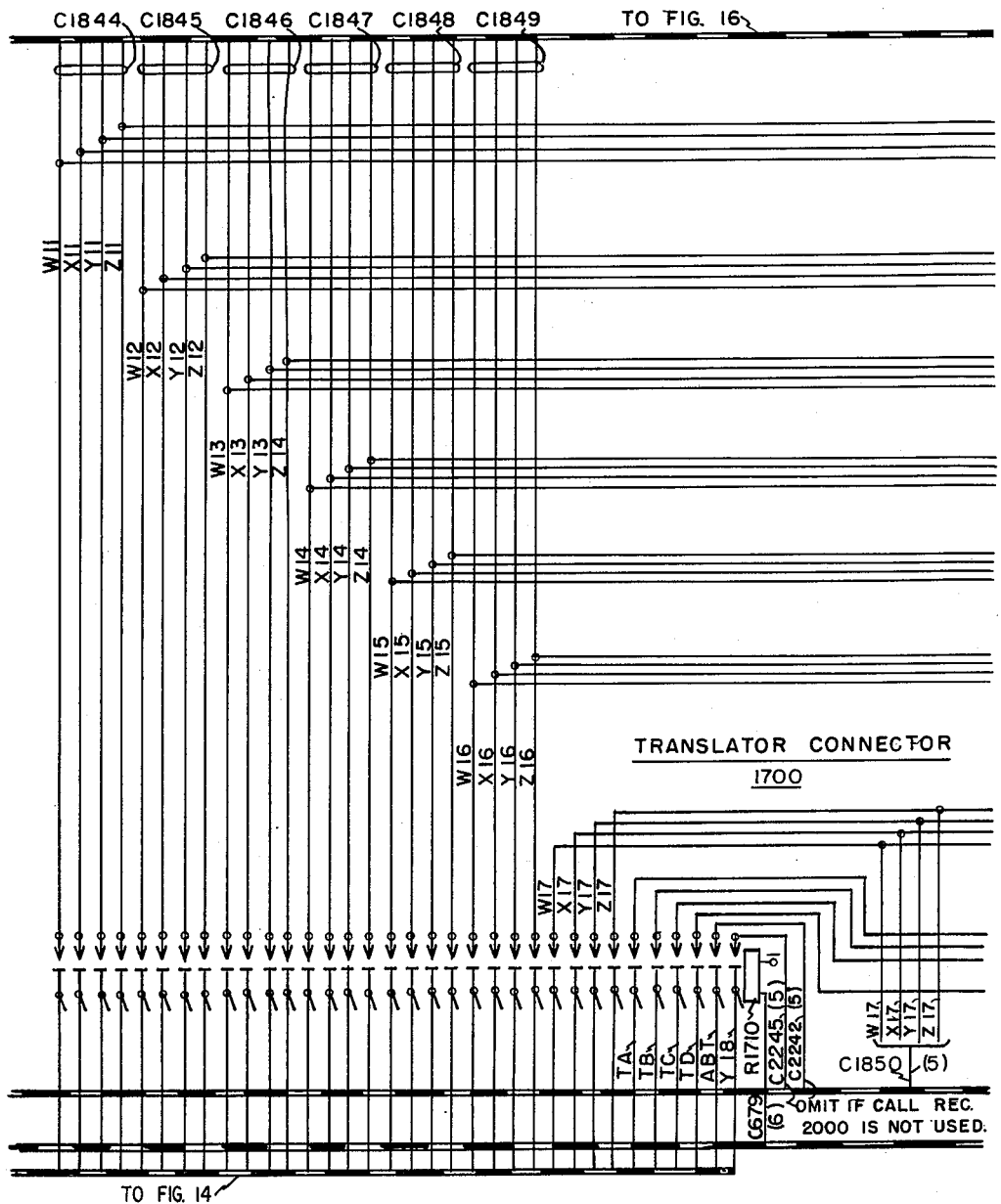

The next item of information transmitted by the call recorder 2000 to the toll ticket repeater 2300 is the tens digit of the charge rate for the present call. It will be recalled that the charge rate 01 is established by the operation of the translator relay R1410. The tens digit for a charge rate may be either the digit 0 or the digit 1. In the present disclosure the apparatus is designed to establish and register twenty different charge rates respectively designated 00 to 09 and 10 to 19, inclusive. From the foregoing, it will be understood that the tens digit for any of the twenty different rates may be the digit 0 or the digit 1. Referring to Fig. 17, it will be seen that the conductor C2245 extending to the call recorder 2000 (Fig. 5) may either be grounded or not grounded when the connector relay R1710 operates and connects the Y18 code marking conductor thereto. This conductor may be grounded or not grounded depending upon the strapping arrangement at the contacts 34 of the operated translator relay R1410 or similar translator relays. In the present example, the conductors Y18 and C2245 are not grounded and the call recorder 2000 will control the toll ticket repeater 2300 to register the tens digit 0 of the established charge rate 01. If the above mentioned conductors are grounded in response to the operation of the selected translator relay, then the call recorder 2000 will control the toll ticket repeater 2300 to register the tens digit 1 of the selected charge rate for a connection.

The next five items of information transmitted by the call recorder 2000 are respectively the third, fourth, fifth, sixth and seventh digits of the calling subscriber directory number. These digits are initially determined by the operation of the detector 1900 and they are temporarily registered in the call recorder 2000. Accordingly, when the call recorder 2000 reaches the cycle of operation being described, it successively transmits, in code form, the above mentioned digits of the calling subscriber directory number to the toll ticket repeater 2300. It may be well to mention at this time that the first and second digits designating the calling office need not be transmitted to the repeater 2300 inasmuch as these two digits of the calling office are permanently registered in the tabulator 2800 and the record producing apparatus is controlled to produce a record of these digits on all recorded calls originated by subscribers in the FLorida 3 exchange.

The last four items of record information transmitted by the call recorder 2000 to the toll ticket repeater 2300 are the fourth, fifth, sixth and seventh digits of the called subscriber directory number. As previously noted, these digits are registered respectively on the first, second, third and fourth numerical registers 1610, 1620, 1630 and 1640 of the call register 1500 and marked in code form on the WXYZ24, WXYZ25, WXYZ26 and WXYZ27 code marking conductors. In the present example, it was assumed that the four digits of the numerical portion of the called subscriber directory number are the digits 1234 and that the WXYZ24, WXYZ25, WXYZ26 and WXYZ27 code marking conductors are respectively marked, in code form, in accordance with these digits. The four sets of WXYZ code marking conductors are respectively connected to the contacts 10, 11, 12, and 13 accessible to the wipers 1655 to 1658, inclusive, of the send sequence switch 1650 and they are also multiply connected via the cable C2012 to the call recorder 2000. Accordingly, the call recorder 2000 will transmit, in code form, the four digits 1234 of the numerical portion of the called subscriber directory number to the toll ticket repeater 2300.

With respect to the transmission of the last mentioned digits, it should be noted that in the controller 600 portion of the director, the relays R940, R950, R960 and R990 are successively operated as each of the four digits are registered in the numerical registers 1610, 1620, 1630 and 1640 and as these relays are operated they complete, at their contacts 943, 953, 963 and 994, circuits for applying ground potentials respectively to the conductor C970, C971, C973 and C987 extending to the call recorder 2000. The call recorder 2000 cannot transmit any one of the above mentioned four digits of the called subscriber number to the toll ticket repeater 2300 until the corresponding one of the last mentioned conductors have been grounded in response to the registration of the corresponding digit. Furthermore, the call recorder 2000, in turn, controls the sender switch 1660 to transmit the last two digits of the called number after the call recorder 2000 has transmitted the last of the four digits of the calling subscriber number to the toll ticket repeater 2300. As soon as the call recorder 2000 has transmitted the penultimate digit of the called number to the toll ticket repeater 2300, it applies ground potential via the conductor C972, the contacts 961, the conductor C982, the wiper 1653 and the conductor C892 thereby to control the sender switch 1660 to transmit the penultimate digit of the called subscriber directory number to the switch train. Finally, when the call recorder 2000 transmits the last digit of the called subscriber number in the repeater 2300, it applies ground potential via the conductor C986, the contacts 991, the conductor C985, the wiper 1653 and the conductor C892 in order to control the sender switch 1660 to transmit the last digit of the called subscriber number and thereby complete the connection to the called subscriber substation in the manner previously described. The foregoing control operations are provided in order to delay further operation of the call recorder 2000 in the event that it should attempt to transmit a digit in the called subscriber number before it has been registered by a calling subscriber and also in order to prevent the director from completing the connection between the calling and the called subscriber substations prior to the time that the last item of record information has been transmitted by the call recorder 2000 to the repeater 2300.

The call recorder 2000 has not completed all of its operations but it will not be released from the associated controller 600 portion of the director until the ground potential is removed from the conductor C725 in response to the restoration of the seizure relay R750.

*Releasing the director after the transmission of the called number*

Referring again to the call register 1500, it will be recalled that when the sender switch 1660 completed the transmission of the numerical pulses corresponding to the digit registered in the fourth numerical register 1640, the send sequence switch 1650 rotated its wipers into engagement with the contacts 14 and, at the wiper 1654, completed a circuit via the conductor C887 for operating the director release relay R780 over its upper winding. Upon operating, the relay R780, at its contacts 786, completes a locking circuit for itself from ground at contacts 758. As a further result of the operation of the relay R780 it completes, at its contacts 781, a holding circuit for retaining the director busy relay R610 in its operated position until the releasing operations of the instant director have been completed. Also, at its contacts 784, the relay R780 completes a circuit for illuminating the release lamp 777 thereby to indicate to the exchange attendant that this particular director is in the process of releasing. Finally, at its contacts 782, the relay R780 interrupts the previously described series circuit including the hold relay R820 and the conductor C474 extending to the primary selector 500 thereby to cause the restoration of the hold relay R820 and a test relay (not shown) in the primary selector 500. The restoration of the test relay (not shown) in the primary selector 500 performs certain switching operations described in the previously mentioned Ostline application whereby the calling line is disconnected from the director and connected to the called subscriber line over the connection established under the control of the director. Finally, the above mentioned test relay disconnects the various conductors in the cable C301 from the primary selector 500.

Referring now to the code switch 1100 portion of the director, it will be seen that as soon as the conductors C471 and C472 in the cable C301 are disconnected from the primary selector 500, the previously traced loop circuit including the windings of the party line relay R1130 and the upper winding of the line relay R1140 is interrupted. The line relay R1140 will now restore to normal. The party line relay R1130, although both of its windings were previously energized, is in its restored position due to the differential characteristics of its windings. Incident to the restoration of the relay R1140, at its contacts 1142, it interrupts the circuit for the hold relay R1150 which slowly restores to normal. As soon as the relay R1150 restores to normal, at its contacts 1151, it removes ground potential from the conductor C1137 extending to Fig. 7 thereby to cause the restoration of the seizure relay R750. Also the removal of ground at contacts 1151 interrupts the holding circuits for relays R1110 and R1120 which relays may or may not be in their operated positions depending upon whether or not the call originated at a party line or an individual line.

When the seizure relay R750 (Fig. 7) restores to normal it removes holding ground potentials from various locking conductors whereby the remaining operated relays and switches in the director will restore to their normal positions. Starting with the contacts 751, the relay R750, upon restoring, simultaneously removes the locking ground potential from the conductor C788 extending to Fig. 16 and from the conductor C787 extending to Fig. 18. The removal of ground from the conductor C788 has no function to perform at this time inasmuch as the wiper 1664 of the sender switch 1660 is in engagement with the home contact position in its associated contact bank. However, the removal of ground potential from conductor C788 interrupts the locking circuits for all of the operated route digit register relays, rate relays and control relays in the coder 1800 thereby to cause the restoration of such relays. Consequently, the coder 1800 is now restored to its normal unoperated condition. Before proceeding with the controls exercised by the remaining contacts of the relay R750, it should be noted at this time that when the operated relays in the first route digit register of the coder 1800 are restored to normal, the ground potential is removed from the conductor C884 extending to Fig. 8 thereby to cause the restoration of the translation complete relay R810.

At the contact 752, the relay R750, upon restoring, interrupts a point in the locking circuits for any one or more of the relays R670, R710, R760 and R770. Any operated one of the above named relays will not restore to normal. At the contact 753, the relay R750 interrupts a point in one of the holding circuits for the director busy relay R610 but the last mentioned relay does not restore to normal at this time since it is held operated from ground at the contacts 781 of the director release relay R780. At the contacts 754, the relay R750 interrupts the locking circuit for the relays R940, R950, R960 and R990 thereby to cause the last mentioned relays to restore to normal. At its contacts 755, the relay R750 interrupts a further point in the circuit for the hold relay R820; at its contacts 756, it interrupts the circuit for the tone control relay R620 which now restores to normal; and, at its contacts 757, it simultaneously removes the ground potential from the conductor C725 extending to the call recorder 2000 (Fig. 5) and the conductor C794' extending to Fig. 15. The removal of ground potential from the conductor C794' has no function to perform at the present time. However, the removal of ground from the conductor C755 causes a start relay (not shown) in the call recorder 2000 to restore to normal thereby to initiate the release of the operated apparatus in the call recorder 2000, in the manner described in the previously mentioned Ostline application. At its contacts 758, the relay R750 interrupts the locking circuit for the upper winding of the director release relay R780, the locking circuit for the relay R840 and the locking circuit for the start send relay R930. The relay R930 now restores to normal and terminates further sending operations by the associated director. The director release relay R780 will not restore to normal when the above mentioned circuit including its upper winding is interrupted unless the circuit, including the lower winding of the relay, for releasing various switching mechanism included in the director, has also been interrupted. At its contacts 753', the relay R750 interrupts the energizing circuit for the left hand winding of the delay send relay R910.

At its contacts 759, the relay R750 interrupts the circuit for supplying the locking ground potential to the pulse generator start relay XR700, the ground potential for the pulse generator 700 and the ground potential for the conductor C794 extending to Fig. 16. The pulse generator start relay XR700 restores to normal when the ground potential is removed and, at its contacts 701X and 704X, it again prepares points in the circuits whereby the pulse generator 700 may be restarted in response to a subsequent seizure of the director by another calling subscriber. It may be well to mention at this time that the pulse generator 700 will be controlled to select a proper stopping position and that the contact arrangements on the pulse generator start relay XR700 are such that they will insure subsequent self-starting of the pulse generator 700, in substantially the same manner as has been described in the copending Ostline application, Serial No. 36,371, filed July 1, 1948.

Finally, at its contacts 751' and 752', the relay R750 completes the previously described restoring circuits for the various operated rotary stepping switches in the call register 1500, the code switch 1100 and the timer 1190. When the above mentioned switching apparatus is finally restored to normal, the circuit including the lower winding of the director release relay R780 is interrupted. The relay R780 now restores to normal and, at its contacts 781, it interrupts the last point in the holding circuit for the director busy relay R610 which also restores to normal. As soon as the relay R610 restores to normal, at its contacts 611, it removes ground potential from the conductor C475 in the cable C301 thereby to remove the busy marking ground potential from the director hunter 450 and thus render the director available for additional calls.

In view of the foregoing description of the mode of operation of the director, it will be understood that in combination with the translator 1300 the director functions to establish a connection between the calling and the called subscriber substations, to obtain various items of record information pertaining to the connection, to transmit and store the various items of record information in the toll ticket repeater 2300 included in the connection and to restore to normal and renders itself available for use in additional calls.

*General description of the operation of the director in setting up a connection*

In view of the foregoing description of the mode of operation of the telephone system, when considered in conjunction with the trunking diagram illustrated in Figs. 2, 3 and 4, that when the calling subscriber at substation TR3 originated the telephone connection to the called subscriber TR1 in the EMpire 1 exchange, whose directory number is EMpire 1-1234, the switching apparatus operates in the following manner to complete the connection. For this purpose, it will be assumed that the calling subscriber at substation TR3 is the subscriber at substation 401 illustrated in Fig. 5. Consequently, when the calling subscriber at substation TR3 (Fig. 3) removes his receiver, the line circuit 405B controls the distributor 442A to assign the finder 440A to the exclusive use of the calling subscriber. The finder operates in a vertical and rotary direction to find the calling subscriber line and causes the primary selector 500A and the associated director hunter 450A to connect the idle director 300A to the calling subscriber line. When these operations have been completed the calling subscriber dials the digits 361-1234 corresponding to the directory number EMpire 1-1234 of the called subscriber at substation TR1. The digits 361-1234 are registered in the call register 1500 portion of the director and in response to the registration of the first three called office code digits 361, the common translator 1300A is associated with the director by means of the translator assigner 1000. The translator 1300A is selectively controlled in accordance with the class of the calling line and the digits 361 whereby the digits 361 are translated into the routing digits 4 and 8 and registered in the coder 1800 portion of the director. When the translation operation is completed, the translator 1300A is disconnected from the director and the director then transmits the routing digits 4 and 8 followed by the last five digits 1-1234 of the called number as registered in the call register 1500 portion of the director. In this particular case the first two digits 3 and 6 of the called office code are translated into the routing digits 4 and 8. The first routing digit 4, transmitted by the director, controls the primary selector 500A to raise its wipers to the fourth level and to rotate its wipers over the bank contacts in the fourth level to select an idle toll ticket repeater, such as the repeater 2300A. The second routing digit 8, transmitted by the director, controls the ticket repeater selector 2700A, individually associated with the ticket repeater 2300A, to select an idle trunk in the eighth level of the associated contact banks terminating in the repeater 305. The remaining digits 1-1234 are transmitted by the director to the repeater 305 and the repeater 305 repeats these digits over the interconnecting toll line 335 to the repeater 290 in the EMpire 1 exchange. The last mentioned repeater repeats the digit 1 to the incoming selector 205 and the selector 205, in turn, selects an idle selector, such as the selector 210 in the first level of its associated banks. The last four digits repeated by the repeater 290 control the selector 210, the selector 215 and the connector 220 to complete the connection to the telephone line of the called subscriber at substation TR1.

During the course of the setting up of the connection, the director withholds the transmission of the last digit of the called subscriber directory number until it has been signaled by the call recorder 2000A that all of the items of information necessary for recording the particulars of the call have been transmitted to and registered in the toll ticket repeater 2300A. When the signal is received by the director, it transmits the last digit 4 of the called subscriber number to the connector 220 which will rotate its wipers over the third level (selected by the next to the last digit 3) into engagement with the contacts 4 terminating the called line. The connector now rings the called subscriber substation and, during the ringing period, the director is disconnected from the calling line in the manner previously described. The connection will be completed between the calling subscriber substation TR3 and the called subscriber substation TR1 over the above traced switching path. When the called subscriber answers, the connector will operate, in the well known manner, to transmit an answering supervisory signal in order to initiate the conversation timing operation of the ticket repeater 2300A and to complete the talking connection between the calling and called subscribers. When the conversation is completed and the subscribers disconnect, the conversation timing will be terminated and the various switches included in the connection will be restored to normal. However, the toll ticket repeater 2300A, which has stored therein all of the items of record information pertaining to the telephone connection, does not restore at this time and it is maintained in a busy condition in order to prevent its seizure, for additional calls, until it has transferred all of the stored items of record information to a tabulator, such as the tabulator 2800A. This busy condition is removed to render the toll ticket repeater 2300A available for other calls as soon as all of the information has been transferred to the tabulator 2800A. The tabulator 2800A then operates in conjunction with the date and time unit U2953 to simultaneously control the ticket tape punch mechanism 2968 and the record tape punch mechanism 2967 to produce perforated tapes containing a record of the various items of information. The manner in which the above described apparatus operates to produce the perforated tape records is described in detail in the previously mentioned Ostline application, Serial No. 75,985, filed February 12, 1949.

In the telephone connection, previously described, it was assumed that the calling subscriber at substation TR3 was of the class 2 type and, consequently, perforated tape records are produced of all telephone connections completed therefrom to subscriber substations in exchanges outside of the local originating exchange. Private subscriber substations of the class 1 type pay a higher flat rate service charge for their telephone service than ordinary subscribers of the class 2 type and, for this additional charge, they are entitled to make calls into certain nearby exchange areas outside of the originating exchange area, on a free call basis. In other words, the class 2 subscribers when making toll calls will have a record produced automatically which will have all of the information necessary to access the calling subscriber substation in accordance with the charge rate applicable to such calls and in accordance with the time duration of the conversational connection. On the other hand, extended service subscribers of the class 1 type may make such toll calls to certain nearby exchanges on a free call basis in which case no record is produced of the call.

The extension of a toll call from the class 1 subscriber at substation TX3 to the called subscriber TR1 in the EMpire 1 exchange, whose directory number is EMpire 1-1234, is completed by the director 300A in substantially the same manner as has been described above in completing a connection from the class 2 calling subscriber at substation TR3. However, since the calling subscriber is of the class 1 type, the translator 1300A is controlled to translate the called office code digits 361 into the single routing digit 8 and the director is then controlled to transmit pulses corresponding to the digits 81-1234. The last five digits, noted above, are the digits of the called subscriber directory number which have been registered in the director by the calling subscriber. In response to the first routing digit 8, the primary selector 500A raises its wipers to the eighth level of the associated contact banks and selects a ticket repeater, such as the repeater 305, terminating an interconnecting toll line to the EMpire 1 exchange. The remaining digits 1-1234 control the switching apparatus, in the same manner as has been previously described, to complete the connection to the called subscriber at substation TR1. The director will then automatically release from the connection and thereby complete the talking connection between the calling subscriber line at substation TX3 and the called subscriber line at substation TR1. In this particular call the translator 1300A is wired and connected in the manner described in the last mentioned Ostline application so that it does not call the call recorder 2000A or the detector 1900A into operation. Furthermore, in the setting up of this connection under control of the director, the record producing apparatus, such as the ticket repeater 2300A, the ticket repeater selector 2700A, the tabulator 2800A and the punch mechanisms 2967 and 2968, is by-passed in order to avoid the operation of this apparatus inasmuch as no record is to be produced of the call.

In the present system the paystation subscriber substations of the class 3 type may automatically complete local calls when the appropriate coin or coins have been deposited into the coin chute of the telephone instrument. However, such lines are prohibited from automatically completing short haul toll calls either into nearby adjacent exchange areas or into the more remotely located exchange areas. In this respect the paystation lines of the class 3 type are restricted service lines since they cannot complete short haul toll calls without the aid of a toll operator. Toll calls which are extended from a paystation line to a toll operator position are completed by the toll operator to the desired called subscriber substation. The toll operator supervises the connection and performs the usual coin collecting and refunding of deposited coins in the conventional manner.

Occasionally, a subscriber at a paystation will either inadvertently or deliberately attempt to complete a short haul toll call beyond the area assigned for local calls without first calling the toll operator. In order automatically to prevent a paystation subscriber from extending such unauthorized calls, the director and associated apparatus in the FLorida 3 exchange automatically extends such calls to an intercepting or toll operator position. For the purpose of this description, it will be assumed that the paystation subscriber at substation TP3 has attempted to call the subscriber TR1 in the EMpire 1 exchange whose directory number is EMpire 1-1234. The establishment of the connection between the calling paystation line and the director 300A (Fig. 3) is substantially the same as has been described previously and the called subscriber number 361-1234 is registered in the call register 1500. During the dialling of the called subscriber number the fact that the calling line is a paystation line of the class 3 type is registered in the controller 600 portion of the director. Accordingly, when the code switch 1100 responds to the code digits 361, the translator 1300A is connected in the manner previously described. Since the call originated on a class 3 line a particular translator relay in the translator 1300 is selected in the manner described in the last mentioned Ostline application. This translator relay operates to register the routing digits 5 and 0 in the coder 1800 portion of the director and it also causes the operation of the TD control relay R1875. The operation of the TD control relay R1875 controls the director to transmit the routing digits 5 and 0 and to prevent the director from transmitting any of the digits of the called subscriber directory number which have been registered in the call register 1500. The digit 5 transmitted by the director 300A (Fig. 3), controls the primary selector 500A, in the manner previously described to raise its wipers to the fifth level of its banks and to select an idle trunk terminating in a special selector 340. The second routing digit 0, transmitted by the director, controls the special selector 340 to raise its wipers to the tenth level of its banks and to select an idle trunk terminating in the intercepting operator position. The director is then released from the connection in the manner previously described and when the intercepting operator answers the call extended to her position, she will inform the subscriber at the paystation telephone that in order to complete the connection to the desired called subscriber, the calling subscriber should hang up and dial the number of the toll operator whose directory number is "0." When the calling subscriber replaces his receiver, the switching apparatus involved in the connection will automatically restore to normal, in a conventional manner.

*Dialling the "0" toll operator*

From the previous description of the mode of operation of the director and the translator 1300, it will be understood that the translator 1300 is only associated with the director in response to the registration of three digits in the first, second and third code registers 1520, 1530 and 1540 in the call register 1500. In the previously mentioned Ostline application, Serial No. 75,985, filed February 12, 1949, the translator assigner 1000 and the translator 1300 were also called into use each time the single digit 0 of the directory number of the "0" toll operator was registered in the first code register 1520 of the call register 1500. The improved director, however, is arranged to automatically complete a connection to the "0" operator position without requiring the assistance of either the translator 1300 or the translator assigner 1000. In order to describe this operation of the improved director, it will now be assumed that a calling subscriber in the FLorida 3 exchange desires to extend a connection to the "0" operator position.

Any calling subscriber in the FLorida 3 exchange, regardless of class, may extend a connection to the "0" operator position by dialling the single digit 0. In response to the removal of the receiver from the switchhook of the calling subscriber telephone instrument, for example at substation 401, the line circuit 405, the line finder 440 and associated distributor 442, the primary selector 500 and the director hunter 450 are operated in the manner previously described to associate an idle director, such as the director illustrated in the drawing, with the calling subscriber line. As a result of the association, the dial tone signal is transmitted to the calling subscriber, in the manner previously explained, to indicate that the single digit 0 may now be dialled. The ten pulses constituting the digit 0 are transmitted under control of the calling dial to the line relay R1140 in the code switch 1100, in the manner previously described, and the line relay R1140 repeats the pulses via the contacts 1141 and 1152, the conductor C717 extending to Fig. 15, the wiper 1514 of the receive sequence switch 1510 in engagement with its home contact position, the conductor C1551 and the winding of the magnet RM1521, to battery. The magnet RM1521 responds to the ten pulses of the digit 0 thereby to advance the wipers 1523 to 1527, inclusive, of the first code register 1520 ten steps in a counterclockwise direction into engagement with the contacts 10 in the associated contact banks. As a further result of the operations of the line relay R1140, the hold relay R1150 and the digit relay R1160 are operated in the manner previously described and ground potential at the contacts 1161 is extended by way of the conductor C1144 and the winding of the sequence control relay R830, to battery. The relay R830, at its contacts 831, applies ground potential to the conductor C815 thereby to operate the magnet RM1511 of the receive sequence switch 1510. This magnet, however, does not advance the associated wipers 1513 to 1516, inclusive, until the above mentioned circuit is interrupted by the restoration of the relay R830 at the end of the dialling of the first digit 0. Consequently, when the relay R1160 restores at the end of the dialling of the first digit 0, at its contacts 1161, it interrupts the circuit for the relay R830 and the relay R830, in turn, at its contacts 831, interrupts the circuit for the magnet RM1511. The last mentioned magnet upon restoring, advances its wipers into engagement with the contacts 1 in the associated contact banks.

Before proceeding with the description of operation that results from the setting of the wipers 1523 to 1527, inclusive, into engagement with the contacts 10 in the associated contact banks, it should be noted that when the controller 600 portion of the director is seized, the seizure relay R750 operates and completes various circuits for controlling further operations of the director.

Figure 7:
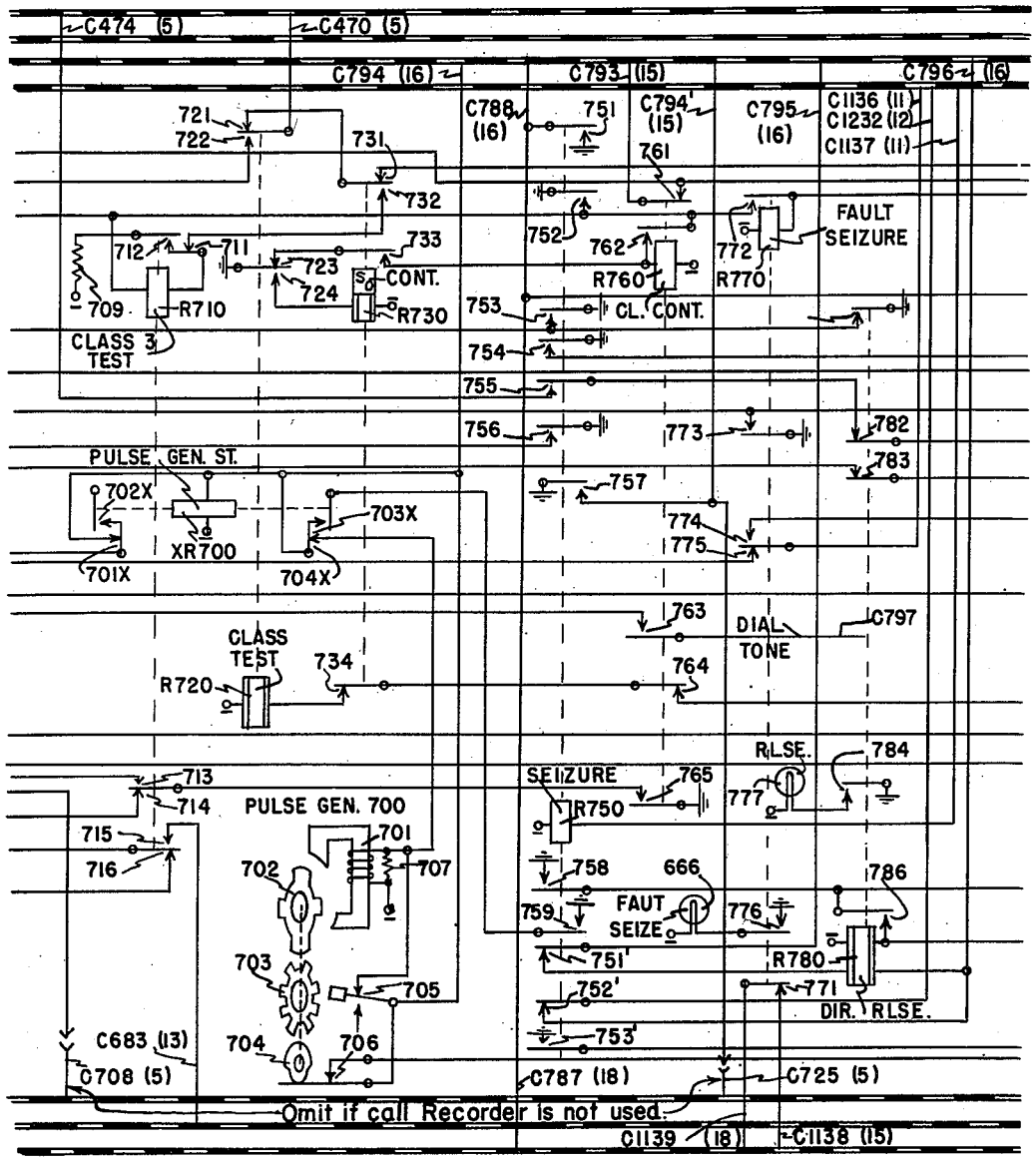

When the wiper 1525 of the first code register 1520 engages contact 10 in the associated contact bank, ground potential is extended via the wiper 1535 of the second code register 1530 and the engaged home contact position, the conductor C1138 extending to Fig. 7, the contacts 771 of the unoperated fault seizure relay R770, the conductor C1139 extending to Fig. 18 and the winding of the TD control relay R1875, to battery. The relay R1875 upon operating, at its contacts 1879', locks itself via the conductor C787 extending to Fig. 7 to ground at contacts 751 of the operated seizure relay R750. As a further result of the advancement of the wipers of the first code register 1520 into engagement with the contacts 10, ground potential at the wiper 1526 is extended via the engaged contact 10, the conductor C1074 extending to Fig. 6, the contacts 643 of the unoperated assigner start relay R640, the conductor C1070 extending to Fig. 15, the wiper 1527, the engaged contact 10 and the conductor C1233 extending to Fig. 12, to the terminal T1235C on the terminal block TB1240. The conductor C1280 is also connected to the terminal T1235C thereby to connect the ground potential applied to the last mentioned terminal via the winding of the Z11 relay R1804 in the first route digit register of the coder 1800, to battery. The relay R1804 operates and, at its inner make contacts, locks itself in its operated position to the grounded conductor C787. At its outer make contacts, the Z11 relay R1804 applies ground potential via the conductor C884 extending to Fig. 8 and the winding of the translation complete relay R810, to battery thereby to operate the last mentioned relay. The operation of the translation complete relay R810 in the controller 600 portion of the director indicates that the single digit 0 of the directory number of the "0" operator position has been translated. The operation of the Z11 relay R1804 in the group of four WXYZ11 register relays R1801 to R1804, inclusive, registers the single digit 0 in the first route digit register of the coder 1800. It should be understood, however, that a conductor, similar to the conductor C1280, may be connected individually to each of the above mentioned relays and connected to a terminal on the terminal block TB1250. Any one of such terminals could then be selectively jumpered to the terminal T1235C on the terminal block TB1240 so that any selected one of the four WXYZ11 relays could be operated in the manner described above. With this arrangement, different route digits may be selectively registered in the first route digit register of the coder 1800 in response to the registration of the single digit 0 in the first code register 1520. In the present example, however, it has been assumed that the single digit 0, dialled by the calling subscriber, has been translated into a single routing digit 0 and registered in the first route digit register of the coder 1800.

As a further result of the registration of the single digit 0 in the first code register 1520, ground potential is connected by way of the wiper 1525, the engaged contact 10 in the associated contact bank, the send sequence switch off-normal contact 1659', the self-interrupting contact 1652 and the winding of the magnet RM1651 of the send sequence switch 1650, to battery. The magnet RM1651 operates over the above traced circuit and, at its contacts 1652, it interrupts its own operating circuit, thereby to advance its wipers 1653 to 1658, inclusive, one step in a counterclockwise direction into engagement with the contacts 1. In this manner, the send sequence switch 1650 selects, at its wipers 1655 to 1658, inclusive, the WXYZ conductors in the cable C1844 extending respectively to the WXYZ11 register relays R1801 to R1804, inclusive. The director is now prepared to transmit pulses corresponding to the routing digit which has been registered in the first route digit register of the coder 1800.

As a further result of the registration of the digit 0 in the first code register 1520, ground potential is connected by way of the wiper 1525, the engaged contact 10, the conductor C794 extending to Fig. 7, and then over several different paths in order to control the pulse generator start relay XR700, the pulse generator 700 and the pulse relay R880. Referring to Fig. 7, it will be noted that the ground potential applied to the conductor C794 may be further extended first, via the contacts 704X and the winding of the field structure 701 of the pulse generator 700, to battery; and second, via the contacts 705 and the winding of the field structure 701 of the pulse generator 700, to battery. In addition to the foregoing, the ground potential applied to the conductor C794 may be extended via the interrupter contacts 706 of the pulse generator 700 and the winding of the pulse relay R880, to battery. Finally, the ground potential applied to the conductor C794 may be extended by way of the winding of the pulse generator start relay XR700, to battery. The pulse generator start relay XR700 operates over the above traced circuit and, at its contacts 703X, locks itself to ground at contacts 759 of the operated seizure relay R750. The ground potential at the contacts 759 is now effectively substituted for the ground potential on the conductor C794 in order to maintain the pulse generator 700 in its operated condition. The above mentioned circuit for the winding of the field structure 701 of the pulse generator 700 which included the contacts 704X, is a preliminary operating circuit for insuring that the pulse generator 700 is operated even though the contacts 705 are in an open position at the time the conductor C704 is originally grounded. The pulse generator 700 continues to operate, once it has been started, and, at its contacts 706, it interrupts the circuit of the pulse relay R880 at the rate of approximately ten times per second.

As noted above, the translation complete relay R810 operates as soon as a digit has been registered in the first route digit register of the coder 1800 and upon operating, at its contacts 811, it interrupts a point in the circuit of the assigner start relay R640. However, this is without effect in the present call inasmuch as the assigner start relay R640 normally does not operate until at least three digits have been registered in the call register 1500. At its contacts 814, the relay R810 completes a circuit via the contacts 822 of the operated hold contact R820 and the winding of the start send relay R930, to battery. The relay R930 upon operating, at its contacts 922, completes a locking circuit for itself from ground at contacts 758.

The operation of the start send relay R930 initiates operation of the director whereby the routing digit 0, registered in the first route digit register of the coder 1800, is transmitted to set up a connection to the "0" operator position. More specifically, the relay R930, at its contacts 931, completes a circuit which may be traced from ground at contacts 751 of the operated seizure relay R750, the contacts 931, the conductor C977 extending to Fig. 16, contact 1 engaged by the wiper 1653 of the send sequence switch 1650, the conductor C892 extending to Fig. 8, the contacts 864, the winding of the pulse control relay R870 and the resistor 879, to battery.

As a further result of the operation of the start send relay R930, at its contacts 934, it connects the ground potential at the contacts 753 via the resistor 936, contacts 943 and the right hand winding of the relay R910, in order to control the line relay (not shown) in the primary selector 500, in the manner previously described. The line relay in the primary selector now operates and prepares the selector to respond to the first routing digit transmitted by the sender portion of the director.

When the pulse control relay R870 operates, over the previously described circuit, it controls various circuits whereby the sender switch 1660 operates to advance its wipers, step-by-step, under control of the contacts 881 of the pulse relay R880. Furthermore, the relay R870 completes a circuit, at its contacts 878, whereby a number of pulses are transmitted, at the contacts 882 of the pulse relay R880, to control the operation of the primary selector 500. The operation of the sender switch 1660 under control of the pulse relay R880 has been previously described and it should be understood that the digit stop relay R920 will operate, in order to terminate further transmission of pulses to the primary selector 500, when the wipers 1665 and 1666 engage the contacts in the associated contact banks which are marked in code form in accordance with the digit 0 registered in the first route digit register of the coder 1800. In this particular case digit stop relay R920 operates when the wipers 1665 and 1666 engage the contacts 12 in the associated contact banks because these contacts are both grounded. The contact 12 engaged by the wiper 1665 is grounded via the wiper 1658, the Z11 conductor in the cable C1844, the inner make contact of the Z11 relay R1804 and the grounded conductor C787. The contact 12 engaged by the wiper 1666 has ground potential connected directly thereto. In this manner the pulse relay R880 and the sender switch 1660 cooperate to transmit ten pulses to the primary selector 500 in order to control the last mentioned switch to raise its wipers to the tenth level of the associated contact banks. The primary selector then automatically rotates its wipers over the selected level to search for an idle trunk terminating in the "0" operator position.

The sender switch 1660 continues stepping its wipers either under the direct control of the pulse relay R880 or under control of a self-interrupting circuit, in the manner previously described, to return the wipers into engagement with the home contact positions. During this period of operation of the sender switch 1660, the send sequence switch 1650 will automatically operate, to skip over the contacts 2 to 13, inclusive, in the associated contact banks terminating the conductors individual to the second to sixth route digit registers in the coder 1800 and all of the code and numerical registers in the call register 1500.

It should be recalled at this time, that when the digit 0 was registered in the first code register 1520, the TD control relay R1875 in the coder 1800 was operated and locked in its operated position to the grounded conductor C787. At its contacts 1876 to 1879, inclusive, the relay R1875 connects the conductors C1840 to C1843, inclusive, to the skip conductor C1831. In the present example the TA and TB control relays R1899 and R1885 are in their unoperated positions and, consequently, the conductors C1837 to C1839, inclusive, are also connected via certain contacts of the above mentioned relays to the skip conductor C1831. Finally, since the second, third, fourth, fifth and sixth route digit register relays of the coder 1800 have not been operated, the conductors C1832 to C1836, inclusive, are respectively connected via the unoperated contacts of the above mentioned register relays to the skip conductor C1831. The skip conductor C1831 extends to Fig. 16 where it is connected via the self-interrupting contacts 1652 to the winding of the magnet RM1651. The conductors C1832 to C1843, inclusive, are respectively connected to the contacts 2 to 13, inclusive, accessible to the wiper 1654 of the send sequence switch 1650. From the foregoing, it will be seen that as the wiper 1654 is advanced, step-by-step, over its contacts 2 to 13, inclusive, it will selectively connect ground to the conductors C1832 to C1843, inclusive, and then by way of the skip conductor C1831 and the winding of the magnet RM1651, to battery. Each time the above mentioned circuit is completed the magnet RM1651 operates and restores to advance its wipers, step-by-step, over the above mentioned contacts.

At the present instant the wipers 1653 to 1658, inclusive, of the send sequence switch 1650 are in engagement with the contacts 1 and as soon as the digit space relay R860 operates under control of the digit stop relay R920, at its contacts 861, it removes ground potential from the conductor C894 extending to Fig. 16 thereby to interrupt the circuit for the magnet RM1651 and thus advance the wipers 1653 to 1658, inclusive, into engagement with the contacts 2 in the associated contact banks. In this position, the above traced stepping circuit for the magnet RM1651 is completed via the wiper 1654, the conductor C1832, the unoperated contacts of the WXYZ12 register relays R1805 to R1808, inclusive, the skip conductor C1831, the interrupter contacts 1652 and the winding of the magnet RM1651. The magnet operates and restores, thus advancing its wipers an additional step into engagement with the contacts 3 in the associated contact banks. In this position the wiper 1654 applies ground potential to the conductor C1833 whereby an additional operating circuit is completed for the magnet RM1651 to advance the wipers into engagement with the next set of contacts. Upon each advancement of the wipers of the send sequence switch 1650, the wiper 1654 successively applies ground potential to the remaining conductors C1833 to C1843, inclusive, thereby to self-interruptedly control the magnet RM1651 to advance its wipers over the contacts 2 to 13, inclusive, at a rapid rate whereby the wipers 1653 to 1658, inclusive, are ultimately positioned into engagement with the contacts 14. The advancement of the wipers over the contacts 2 to 13, inclusive, in the manner described above, controls the send sequence switch 1651 so that it skips the second to the sixth route digit registers in the coder 1800 and the seven registers in the call register 1500 and thereby prevents the sender switch 1660 from transmitting pulses corresponding to any one or more of the digits registered in these registers.

As soon as the wiper 1654 engages the contact 14, it applies ground potential via the conductor C887 extending to Fig. 8 and the winding of the director release relay R780, to battery. The director release relay R780 operates and locks itself, at its contacts 786, to ground at contacts 758. The operation of the director release relay R780 causes the primary selector 500 to connect the calling subscriber line at substation 401 to the "0" operator position and disconnect the associated director from the primary selector 500. Furthermore, the operation of the director release relay R780 causes all of the operated relays and switching apparatus in the director to be restored to normal, in the manner previously described.

From the above description of the mode of operation of the director, it will be understood that the director automatically translates the directory number 0 of the "0" operator position into an appropriate routing digit without calling the translator assigner 1000 and the translator 1300 into use. In the previously mentioned Ostline application, all "0" operator calls require the use of the translator assigner and the translator in order to complete the connections. Accordingly, with the present circuit arrangement of the director, the life expectancy of the translator assigner and the translator is greatly increased since this apparatus is by-passed on all "0" operator calls. However, if a subscriber should fail to dial any of the digits of a directory number within a predetermined elapsed time interval after the director is seized, the present director will automatically call in the translator assigner and translator and it will automatically connect the calling line to an intercepting operator position over a route selected by the translator.

*Failure to dial*

In order to describe the operation of the director in the event that a subscriber initiates a call but fails to dial any digits, it will be assumed that a calling subscriber in the FLorida 3 exchange has removed his receiver and thereby extended a connection to the director, in the manner previously described. The dial tone signal is automatically transmitted to the calling subscriber as a result of the association of the director with the calling line in order to indicate that the dialling of the called number should be started.

Referring now to the code switch 1100 (Fig. 11), it will be seen that the line relay R1140 operates over the loop circuit including the calling subscriber line and completes the circuit for operating the hold relay R1150. When the relay R1150 operates, at its contacts 1153, it connects the conductor C1135 via the wiper 1192, the engaged contact 1 and the winding of the minor switch stepping magnet RM1194, to battery. The conductor C1135 transmits ground pulses to the magnet RM1194 at the rate of twelve pulses per minute. Consequently, the rotary magnet RM1194 of the timer 1190 will operate and restore in response to each ground pulse transmitted over the conductor C1135. Each time the magnet RM1194 operates it advances its wipers 1191 and 1192 one step in a counterclockwise direction and at the end of approximately fifteen seconds, that is the third pulse, the wiper 1191 applies ground potential to the conductor C1194 extending to Fig. 6. Referring now to Fig. 6, it will be seen that the conductor C1196 is connected via the contacts 621 and 992 and the winding of the fault seizure relay R770, to battery. Since the calling subscriber has not dialled any digits into the director, the tone control relay R620 is in its normal position and does not disconnect the conductor C1196, at its contacts 621, from the fault seizure relay R770. The fault seizure relay R770 operates over the above traced circuit and locks itself, at its contacts 772 to ground at contacts 752 of the operated seizure relay R750. Furthermore, at its contacts 771, the relay R770 opens a point in the previously described circuit which is effective in response to the dialling of the single digit 0; at its contacts 773, it completes a circuit by way of the contacts 811, 783 and 662 for operating the assigner start relay R640; at its contacts 774 and 775, it disconnects the dial tone signal and it prepares a point in a circuit for transmitting a busy tone signal to the calling subscriber; and, at its contacts 776, it completes a circuit for illuminating the fault seizure lamp 666 whereby a signal is given to the exchange attendant that the director has been falsely seized.

In response to the operation of the assigner start relay R640, the translator assigner 1000 will automatically operate and associate the common translator 1300 with the calling director, in the manner previously described, thereby to prepare a circuit for operating one of the translator relays, such as the relays R1410, R1420 etc. Accordingly, a circuit is completed which may be traced from ground at contacts 1013 and then by way of the contacts 1031, the winding of the translator test relay R1050, the contacts 1063, the wiper 1003, the conductor C1073 extending to Fig. 6, contacts 644 of the operated assigner start relay R640 and the conductor C1070 extending to Fig. 15 in order to apply ground potential to the wiper 1527 of the first code register 1520. Inasmuch as the calling subscriber has failed to dial any digits, the wiper 1527 will be in engagement with its home contact position and the ground potential applied to the wiper 1527 will be further extended over the conductor C1234 to the terminal T1235B on the terminal block TB1240 (Fig. 12). This terminal will be jumpered to a terminal on the terminal block TB1250 and then by way of the contacts of one of the operated auxiliary relays R1310, R1320 or R1330 in order to complete an operating circuit for one of the translator relays in the translator 1300. This particular translator relay is permanently wired in substantially the same manner as has been previously explained so that it will transfer the routing digits 5 and 0 to the first and second route digit registers in the coder 1800. The manner in which the routing digits are registered in the coder 1800 has been previously explained.

The sender switch 1660 will thereafter automatically transmit pulses corresponding to the registered routing digits to set up a connection to the intercepting operator position. The trunks over which the connection is completed to the intercepting operator position may be divided into various groups so that the intercepting operator will be immediately informed as to the particular fault that has caused the call to be routed to her position. For example, one group of trunks, terminating at the intercepting operator position, may be assigned for use only in response to the interception of calls in which unassigned called office codes are dialled by the calling subscriber and another group of trunks may be assigned for use only in response to the interception of calls in which the calling subscriber has failed to dial any digits.

As soon as the translation has been completed and the routing digits have been registered in the coder 1800, the translation complete relay R810 is operated, in the manner previously explained, and, at its contacts 812, it transmits a busy tone signal to the calling subscriber to indicate that the connection should be released. If the calling subscriber fails to release the connection, the director continues its operation whereby the connection will be completed, in the manner noted above, to the intercepting operator position. After the director has extended the call to the intercepting operator position, it will automatically release, in the manner previously described, in response to the operation of the director release relay R780 and thereby complete the connection between the calling subscriber substation and the intercepting operator position.

From the above description of the mode of operation of the director in response to the failure of the calling subscriber to dial any digits after the director has been seized, it will be understood that the translator assigner 1000 and the translator 1300 will be called into use in order automatically to route the call to the intercepting operator position where it will be disposed of in a conventional manner. This arrangement for timing out the director and routing the call to an intercepting operator position, prevents a calling subscriber from holding a director out of service for more than approximately fifteen seconds, if the subscriber fails to dial.

It may be well to mention at this time, however, that if the calling subscriber dials at least three digits after the director has been seized but fails to dial one or more of the remaining digits of the called subscriber directory number, the translator assigner 1000 and the translator 1300 will be called into use in the normal manner as has been previously described. As a result of the association of the translator 1300 and the calling director, the translator translates the first three digits into appropriate routing digits and registers the routing digits in the coder 1800 before the translator is automatically disconnected from the director. In response to the first pulse of the first of the three digits dialled by the calling subscriber, the line relay R1140 restores and, at its contacts 1141, it completes a circuit including the contacts 1152 for operating the relay R1160. The relay R1160 upon operating, at its contacts 1161, completes a circuit including the conductor C1144 for operating the sequence control relay R830. The relay R830, at its contacts 832, completes a circuit for operating the tone control relay R620 and the last mentioned relay, at its contacts 621, disconnects the fifteen second conductor C1196 from the previously traced circuit for controlling the fault seizure relay R770. From the foregoing description, it will be understood that the fault seizure relay R770 cannot be operated over the fifteen second conductor C1196 by the timer 1190 in the event that one or more pulses of a digit have been transmitted to the director by the calling subscriber.

Since it has been assumed that the calling subscriber dials at least three digits of the called subscriber directory number, the translation operation will take place in the normal manner, as previously noted, and at the end thereof the translation complete relay R810 is operated. The operations which now take place are the same as those previously described in connection with the completion of a normal call in that the director will attempt to complete the connection by transmitting pulses, corresponding to the routing digits registered in the coder 1800, to the switching apparatus included in the telephone network. After the director has transmitted the registered routing digits and the other digits which have been registered in the call register 1500 by the calling subscriber, the director will hold up further transmission of the pulses until the additional digits of the called number are dialled by the calling subscriber.

If the remaining digits of the called subscriber directory number are dialled within thirty seconds after the seizure of the director, the circuit for controlling the fault seizure relay R770 will be interrupted at the contacts 992 of the fourth numerical send relay R990 and the timer 1190 will be rendered ineffective. However, if the calling subscriber fails to complete the dialling of all of the digits of the called subscriber directory number within thirty seconds, a circuit will be completed for the fault seizure relay R770. More specifically, at the end of thirty seconds the wiper 1191 of the timer 1190 connects ground potential via the conductor C1197, the contacts 992 of the unoperated relay R990 and the winding of the fault seizure relay R770, to battery. This circuit, it should be noted, bypasses the contact 621 of the operated tone control relay R620. The relay R770, upon operating, locks itself in its operated position to ground at contacts 752 and, at its contacts 774, it transmits the busy tone signal to the calling subscriber to indicate that the call cannot be completed. The calling subscriber now replaces his receiver upon the switchhook of his telephone instrument and thereby interrupts the previously described loop circuit for the line relay R1140. The relay R1140 now restores to normal and interrupts the circuit for the hold relay R1150. The relay R1150, at its contacts 1151, removes ground potential from the conductor C1137 and thereby interrupts the circuit for the seizure relay R750. The relay R750 now restores and, at its contacts 751' and 752', it completes the previously described circuits whereby the director is restored to normal.

The operation of the director and the associated apparatus, in the event the calling subscriber fails to dial all of the digits of a directory number; dials a nonexistent called office code; or dials any one of the special service numbers, is described and disclosed in detail in the copending Ostline application, Serial No. 75,985, filed February 12, 1949.

While one embodiment of the invention has been disclosed, it will be understood that various modifications may be made therein which are within the true spirit and scope of the invention.

What is claimed is:

1. In a telephone system having a plurality of register senders, a local translator and a route register included in each of said register senders, another translator common to all of said register senders, means for registering a called station directory number in one of said register senders, means controlled in accordance with the directory number registered in said one register sender for selecting either said local translator or said common translator and for selectively controlling said selected translator, means governed in accordance with the selective control of said selected translator for registering in said route register a translation of said directory number, and means in said one register sender for selecting a route over which a connection may be completed to the called station having the directory number registered in said one register sender in accordance with the translation registered in said route register.

2. In a telephone system having a plurality of register senders, a local translator and a route register included in each of said register senders, another translator common to all of said register senders, means for associating said common translator with any one of said register senders, a calling line, means controllable from said calling line for selecting an idle one of said register senders and for registering therein a desired called station directory number, means governed in accordance with the directory number registered in said register sender for selecting either said local translator or said common translator associating means, means controlled in the event said local translator is selectively controlled for registering in the associated route register a particular translation of said registered directory number, means controlled in the event said common translator associating means is selectively controlled for associating said common translator with said one register sender and for selectively controlling said common translator to register in said route register a translation of said registered directory number, and means in said one register sender operated in accordance with the translation registered in the associated route register for routing a call to a called station having the particular directory number registered in said one register sender.

3. In a telephone system having a plurality of register senders, means for operating any one of said register senders to register different called station directory numbers, switching apparatus, a route register included in said one register sender for registering one or more routing digits, means in said one register sender operated in the event that the directory number registered therein identifies a certain called station for controlling said route register to register a routing digit, a translator common to said register senders, means in said one register sender operated in the event that the directory number registered therein identifies another called station for associating said common translator with said one register sender, means in said common translator operated in accordance with certain of the digits in said directory number of said other called station for operating said route register to register a route digit, and means in said register sender for transmitting said registered route digit to said switching apparatus in order to select a particular route over which a connection may be completed to the called station identified by the directory number registered in said register sender.

4. In a telephone system having a plurality of register senders, means for operating any one of said register senders to register a called station directory number, means in said one register sender operated in response to the registration therein of a particular predetermined called station directory number for translating said registered particular predetermined called station number into at least one routing digit and for registering said routing digit in said one register sender, a translator common to said register senders, means in said one register sender operated in response to the registration therein of a different predetermined directory number for associating said translator with said one register sender, means for selectively operating said translator to translate predetermined ones of the digits in said last mentioned registered directory number into one or more routing digits and for registering said routing digit or digits in said one register sender, and means for setting up a connection to the called station identified by the directory number registered in said register sender over a route determined by said registered routing digit or digits.

5. In a telephone system having a plurality of register senders, means for operating any one of said register senders to register a called station directory number, means in said one register sender operated in response to the registration therein of a particular predetermined called station directory number for translating said registered particular predetermined called station number into at least one routing digit and for registering said routing digit in said one register sender, a translator common to said register senders, means in said one register sender operated in response to the registration therein of a different predetermined directory number for associating said translator with said one register sender, means for selectively operating said translator to translate predetermined ones of the digits in said last mentioned registered directory number into one or more routing digits and for registering said routing digit or digits in said one register sender, control means in said register sender selectively operated in a first manner in the event said translation is made in said register sender and selectively operated in a second manner in the event said translation is made in said common translator, and means in said register sender jointly controlled in accordance with said selective operation of said control means and said registered routing digit or digits for extending a connection from said register sender to the particular called station having the directory number registered in said register sender.

6. In a telephone system having a plurality of register senders, means for operating any one of said register senders to register a called station directory number, means in said one register sender operated in response to the registration therein of the directory number of a special service operator position for automatically translating said registered directory number into a routing digit and for registering said last mentioned routing digit in said one register sender, a translator common to said register senders, means in said one register sender operated in response to the registration therein of the directory number of a subscriber station for associating said common translator with said one register sender, means in said common translator operated responsive to said association for translating certain of the digits of said subscriber station directory number into one or more routing digits and for registering said routing digit or digits in said one register sender, switching apparatus, and means in said register sender for selectively controlling said switching apparatus in accordance with the routing digit or digits registered in said register sender in order to extend a connection in the direction of either said special service operator position or a subscriber substation.

7. In a telephone system including a calling station, first and second called stations having respectively first and second predetermined directory numbers, switching apparatus, a plurality of register senders, means operated responsive to a call originated at said calling station for selecting an idle one of said register senders and for connecting said calling station thereto, means controlled from said calling station for registering the directory number of either one of said called stations in said one register sender, a route register in said one register sender, means in said one register sender operated responsive to the registration therein of said first called station directory number for registering a predetermined translation thereof in said route register, a translator common to said register senders, means in said one register sender operated responsive to the registration therein of said second called station directory number for connecting said common translator to said one register sender and for selectively controlling said translator in accordance with certain of the digits in said last mentioned directory number, means in said translator governed in accordance with said selective control thereof for registering a predetermined translation of said certain digits in said route register, and means in said one register sender controlled responsive to the registration in said route register for disconnecting said translator in the event that it has been connected to said one register sender and for controlling said switching apparatus in accordance with the translation registered in said route register in order to extend a telephone connection from said calling station in the direction of the called station corresponding to the directory number registered in said register sender.

8. In a telephone system including a calling line, a first called line having a single digit directory number, second called lines having plural digit directory numbers, switching apparatus, a register sender operative to register the directory number of said first called line or the directory number of one of said second called lines transmitted thereto over said calling line, a route register in said register sender operative to register a translation of the particular directory number registered in said register sender, sending means in said register sender, means in said register sender operated responsive to the registration therein of the directory number of said first called line for selectively operating said route register to register a predetermined translation of said first called line directory number, a translator common to a plurality of said register senders, means in said register sender controlled responsive to the registration therein of the plural digit directory number of one of said second called lines for associating said common translator with said register sender and for selectively operating said translator in accordance with certain of the digits in said plural digit directory number, means controlled in accordance with said selective operation of said translator for operating said route register to register a predetermined translation of said certain digits in said plural digit directory number, and means controlled responsive to the operation of said route register for operating said sending means in said register sender to control said switching apparatus in accordance with the predetermined translation registered in said route register either by said register sender or by said common translator in order respectively to extend a connection from said calling line in the direction of said first called line or in the direction of one of said second called lines.

9. In a register sender for use in a telephone system to register telephone numbers of calls to be routed to either a first or a second destination and to retransmit a routing digit or digits corresponding to a translation of said registered telephone number in order to route the call to the appropriate destination, a route register in said register sender operative to register a routing digit or digits indicative of a route to said first or said second destination, means controlled each time a telephone number of a call to said first destination is registered in said register sender for operating said route register to register at least one digit corresponding to a predetermined translation of said registered first destination telephone number, a translator mechanism common to a plurality of such register senders, means for associating said translator mechanism with said register sender each time a telephone number of a call to said second destination is registered therein, means in said translator selectively operated in accordance with the value of each of the digits in said last mentioned telephone number for operating said route register to register one or more digits corresponding to a predetermined translation of said registered second destination telephone number, means in said register sender for retransmitting the translated digit or digits registered in said route register and means governed jointly in accordance with the particular translation registered in said route register and said register sender retransmitting means for routing a call to the destination corresponding to the registered telephone number.

10. In a telephone system having a plurality of register senders, means for operating any one of said register senders to register a called station directory number, means in said one register sender operated in response to the registration therein of a predetermined single digit called station directory number for automatically translating said registered single digit directory number into a routing digit and for registering said last mentioned routing digit in said one register sender, a translator common to said register senders, means in said one register sender operated in response to the registration therein of a plural digit called station directory number for associating said common translator with said one register sender, means in said common translator operated responsive to said association for translating certain of the digits of said plural digit called station directory number into one or more routing digits and for registering said routing digit or digits in said one register sender, switching apparatus, and means in said register sender for selectively controlling said switching apparatus in accordance with the routing digit or digits registered in said register sender in order to extend a connection via said switching apparatus to the called station corresponding to the directory number registered in said register sender.

11. In a telephone system having a plurality of register senders, means for operating any one of said register senders to register a single digit called station directory number or a plural digit called station directory number, means in said one register sender operated responsive to the registration therein of a single digit called station directory number for transmitting pulses corresponding to a predetermined translation of said single digit directory number, a translator common to said register senders, means in said one register sender operated responsive to the registration therein of a plural digit called station directory number for connecting said common translator with said one register sender and for selectively operating said translator in accordance with a predetermined number of the digits in said plural digit directory number, means in said translator governed in accordance with said selective operation for controlling said one register sender to transmit pulses corresponding to a predetermined translation of said predetermined number of digits, and switching apparatus controlled in accordance with the pulses transmitted by said one register sender for selecting the particular route over which a telephone connection may be established to the called station having the directory number registered in said one register sender.

12. In a telephone system having a plurality of register senders, means for operating any one of said register senders to register a single digit called station directory number or a plural digit called station directory number dialled from a calling station, switching apparatus, a route register included in said one register sender, means in said register sender operated in the event that the directory number registered therein constitutes a single digit for operating said route register to register a predetermined route digit, means in said register sender operated responsive to the registration of said predetermined route digit for transmitting said predetermined route digit to said switching apparatus in order to extend a connection in the direction of said called station having said single digit directory number, a translator common to said register senders, means in said register sender operated in the event that the directory number registered therein constitutes a plural digit directory number for associating said common translator with said register sender, means for selectively controlling said common translator to translate a predetermined number of the digits in said plural digit directory number into one or more routing digits, means controlled in accordance with the said selective control of said common translator for operating said route register to register said routing digit or digits translated by said translator, and means in said register sender for transmitting to said switching apparatus the digit or digits registered in said route register in order to extend a connection in the direction of the called station having said plural digit directory number.

13. In a telephone system having a plurality of register senders, means for operating any one of said register senders to register a single digit called station directory number or a plural digit called station directory number, switching apparatus, means in said one register sender operated responsive to the registration therein of a single digit called station directory number for translating said single digit into a first route designation and for transmitting pulses corresponding to said first route designation to said switching apparatus, a translator common to said register senders, means operated responsive to the registration of a plural digit called station directory number in said one register sender for connecting said translator with said one register sender and for selectively operating said translator in accordance with a predetermined number of the digits in said plural digit called station directory number, means in said translator governed in accordance with said selective operation for translating said predetermined number of digits into a second route designation and for controlling said register sender to transmit pulses corresponding to said second route designation to said switching apparatus, and means in said switching apparatus governed in accordance with the pulses of said first route designation or said second route designation transmitted by said one register sender for respectively selecting a first route over which a connection may be established to the called station having said single digit directory number or a second route over which a connection may be established to the called station having said plural digit directory number.

14. In a telephone system having a plurality of register senders, means for operating any one of said register senders to register a single digit "0" identifying a particular operator position or a plural digit number identifying a particular called exchange, a route register included in said one register sender, said route register comprising a plurality of groups of code storage relays, each of said code storage relays being operative to register in code form any one of a plurality of different digits, means in said one register sender operated responsive to the registration therein of said single digit "0" identifying said particular operator position for selectively operating at least one of said groups of code storage relays in said route register to register in code form a predetermined route digit, a translator common to said register senders, means in said one register sender operated responsive to the registration therein of said plural digit number identifying said particular called exchange for connecting said common translator with said one register sender and for selectively operating said translator in accordance with each of said digits in said plural digit number, means in said common translator governed in accordance with the selective operation thereof for selectively operating at least one of said groups of code storage relays in said route register to register in code form a different predetermined route digit, switching apparatus, and means in said one register sender controlled in accordance with the particular route digit registered in code form in said one group of code storage relays in said route register for transmitting numerical pulses corresponding to the registered route digit to said switching apparatus in order to select the particular route over which a telephone connection may be established to said particular operator position or to select another particular route over which a connection may be established to said particular called exchange.

15. In a telephone system having a plurality of register senders, means for operating any one of said register senders to register different called station directory numbers, switching apparatus, a route register included in said one register sender, said route register including a plurality of groups of code storage relays, each of said groups of said code storage relays being operative to register any one of a plurality of different digits, means in said one register sender operated in the event that the directory number registered therein identifies a certain called station for selectively operating at least one of said groups of code storage relays in said route register to register a predetermined route digit, a translator common to said register senders, means in said one register sender operated in the event that the directory number registered therein identifies another called station for associating said common translator with said one register sender, means in said common translator operated in accordance with certain of the digits in the directory number of said other called station for selectively operating at least one of said groups of code storage relays in said route register to register a different predetermined route digit, and means in said register sender controlled in accordance with the particular route digit registered in said one group of code storage relays in said route register for transmitting numerical pulses corresponding to the registered route digit to said switching apparatus in order to select a particular route over which a connection may be completed to the called station identified by the particular directory number registered in said register sender.

16. In a telephone system having a plurality of register senders, a route register included in each of said register senders, a first route over which connections may be established having a first route designation, a second route over which connections may be established having a second route designation, a translator common to said plurality of register senders, means for registering a first called station directory number or a second called station directory number in one of said register senders, means included in said one register sender operated in the event said first called station directory number is registered therein for registering said first route designation in the associated route register, means operated in the event said second called station directory number is registered in said one register sender for associating said common translator with said one register sender and for selectively controlling said common translator to register said second route designation in said route register, and means controlled by said one register sender for extending a connection over said first route toward said first called station in response to the registration of said first route designation in said route register or for extending a connection over said second route toward said second called station in response to the registration of said second route designation in said route register.

17. In combination with a register sender for use in a telephone system, a translator common to a plurality of said register senders, a route register in said register sender, means in said register sender operated responsive to the registration therein of a single digit of predetermined value for registering a digit of predetermined value in said route register, means in said register sender operated responsive to the registration therein of a plural digit number for associating said common translator with said register sender, means in said common translator selectively controlled in accordance with the value of each of the digits in said registered predetermined plural digit number for registering a plurality of digits of predetermined values in said route register, and means in said register sender for transmitting pulses corresponding to the digit or digits registered in said route register in order to extend a connection over a particular route.

THOMAS G. WALSH.

No references cited.